US011298636B2

(12) United States Patent
Rauch et al.

(10) Patent No.: US 11,298,636 B2
(45) Date of Patent: Apr. 12, 2022

(54) OIL MONITORING SYSTEM

(71) Applicants: Mark S. Rauch, Houston, TX (US); Ronald Kleineke, Wintersville, OH (US)

(72) Inventors: Mark S. Rauch, Houston, TX (US); Ronald Kleineke, Wintersville, OH (US)

(*) Notice: Subject to any disclaimer, the term of this patent is extended or adjusted under 35 U.S.C. 154(b) by 117 days.

(21) Appl. No.: 16/566,173

(22) Filed: Sep. 10, 2019

(65) Prior Publication Data

US 2020/0078713 A1 Mar. 12, 2020

Related U.S. Application Data

(60) Provisional application No. 62/729,002, filed on Sep. 10, 2018.

(51) Int. Cl.
*B01D 29/52* (2006.01)
*B01D 29/60* (2006.01)
*C10G 31/09* (2006.01)
*B01D 29/90* (2006.01)
*B01D 35/157* (2006.01)

(52) U.S. Cl.
CPC ........... *B01D 29/52* (2013.01); *B01D 29/605* (2013.01); *B01D 29/90* (2013.01); *B01D 35/1573* (2013.01); *C10G 31/09* (2013.01)

(58) Field of Classification Search
CPC ...... B01D 29/05; B01D 29/52; B01D 29/605; B01D 29/90; B01D 29/902; B01D 35/1435; B01D 35/1573; B01D 17/0211; B01D 17/0214; B01D 17/0202; C10G 31/09; C02F 2101/32

USPC ... 210/170.03, 253, 255, 254, 259, 262, 924
See application file for complete search history.

(56) References Cited

U.S. PATENT DOCUMENTS

| 4,425,239 | A | * | 1/1984 | Jacocks | B01D 17/0208 210/787 |
|---|---|---|---|---|---|
| 5,626,748 | A | * | 5/1997 | Rose | B01D 17/00 210/241 |
| 7,297,181 | B2 | | 11/2007 | Zhou et al. | |
| 7,645,329 | B2 | | 1/2010 | Niakan et al. | |
| 7,688,428 | B2 | | 3/2010 | Pearlman | |
| 8,221,632 | B2 | * | 7/2012 | McInnis | E03F 5/0404 210/747.3 |
| 9,656,894 | B2 | | 5/2017 | Snydmiller et al. | |

FOREIGN PATENT DOCUMENTS

DE 202011100486 U1 * 7/2011 ......... B01D 21/0012

* cited by examiner

*Primary Examiner* — Terry K Cecil
(74) *Attorney, Agent, or Firm* — BakerHostetler

(57) ABSTRACT

A filter system has a chamber body, an inlet that extends through the chamber body, and an outlet that extends through the chamber body at a location downstream of the inlet. The filter system has a plurality of fluid flow paths that extend between the inlet and the outlet. The plurality of fluid flow paths including first and second subsets, each including at least a respective one of the fluid flow paths. A plurality of hydrocarbon filters is disposed in the chamber body such that each hydrocarbon filter is disposed in a fluid flow path. The filter system directs the fluid to the first subset, and once each hydrocarbon filter of the first subset becomes saturated with hydrocarbons, the filter systems diverts the fluid to flow to the second subset.

19 Claims, 22 Drawing Sheets

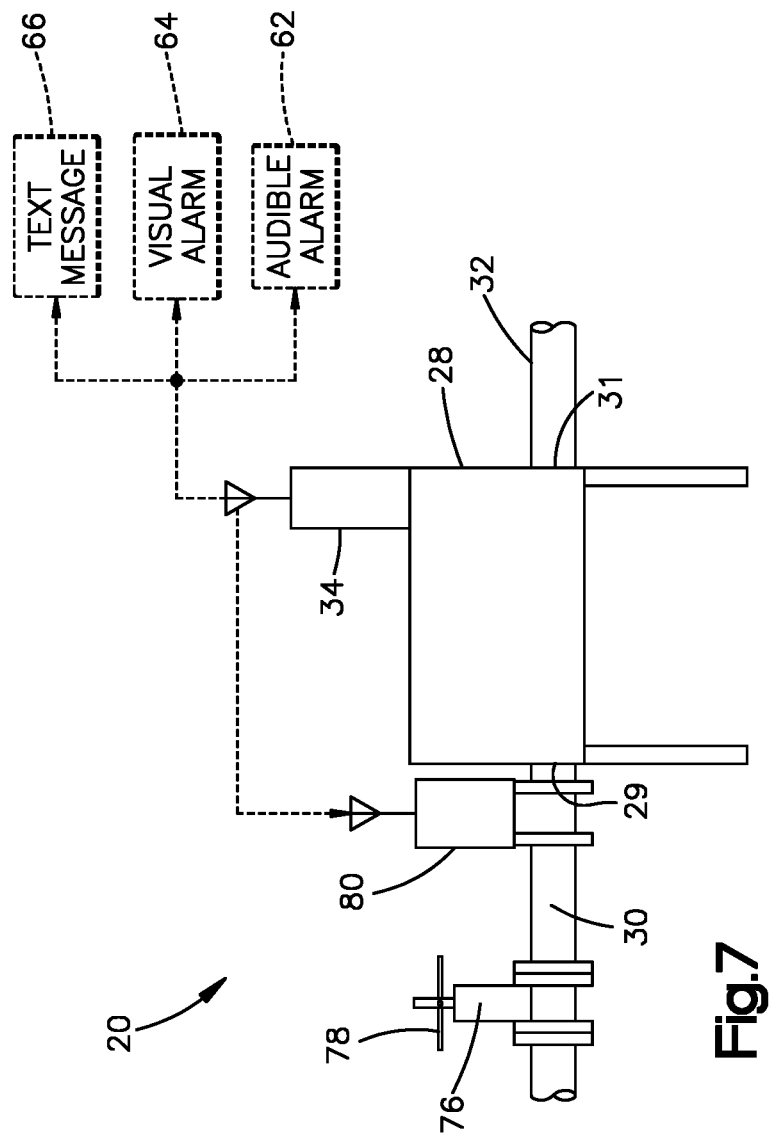

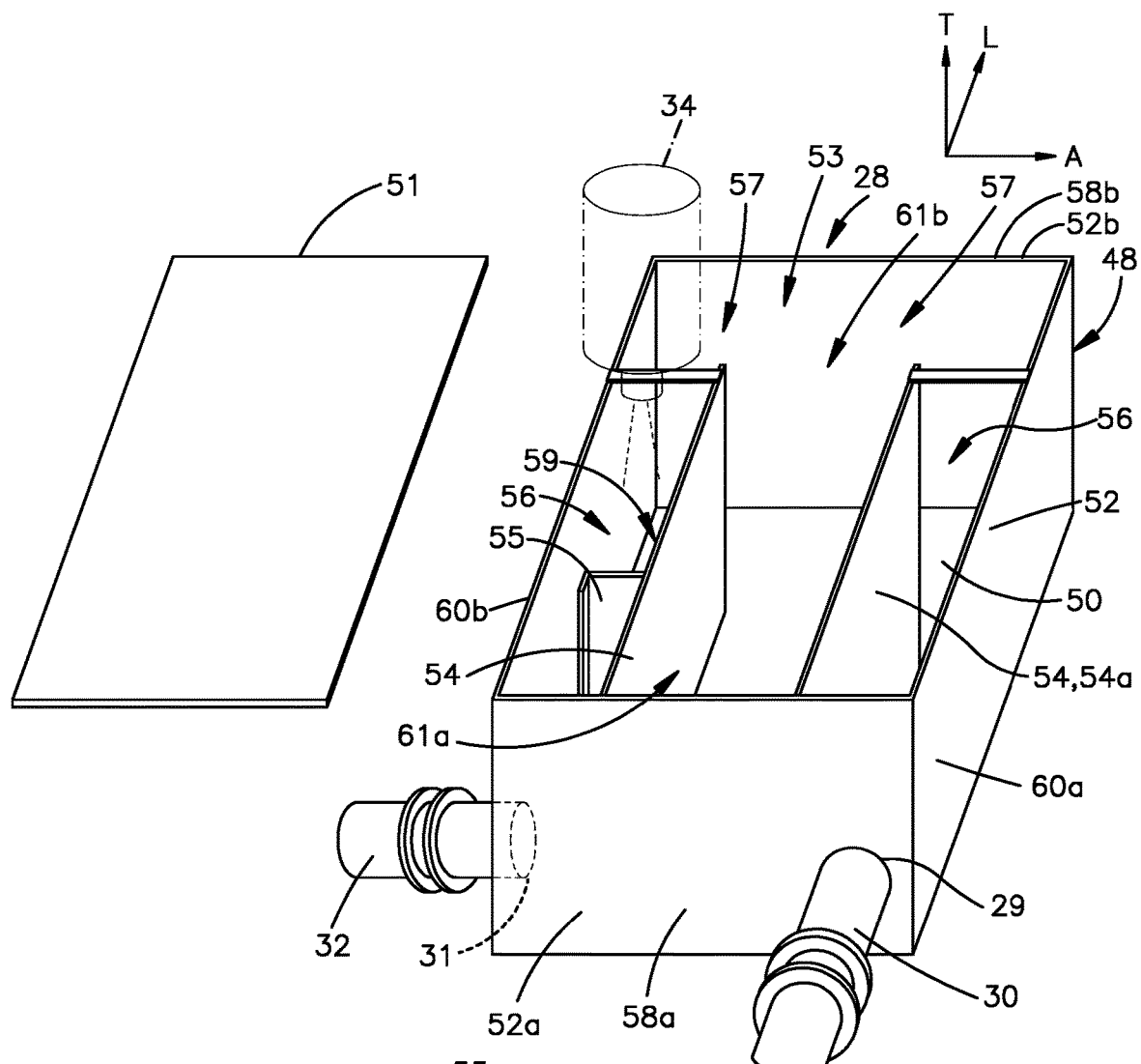
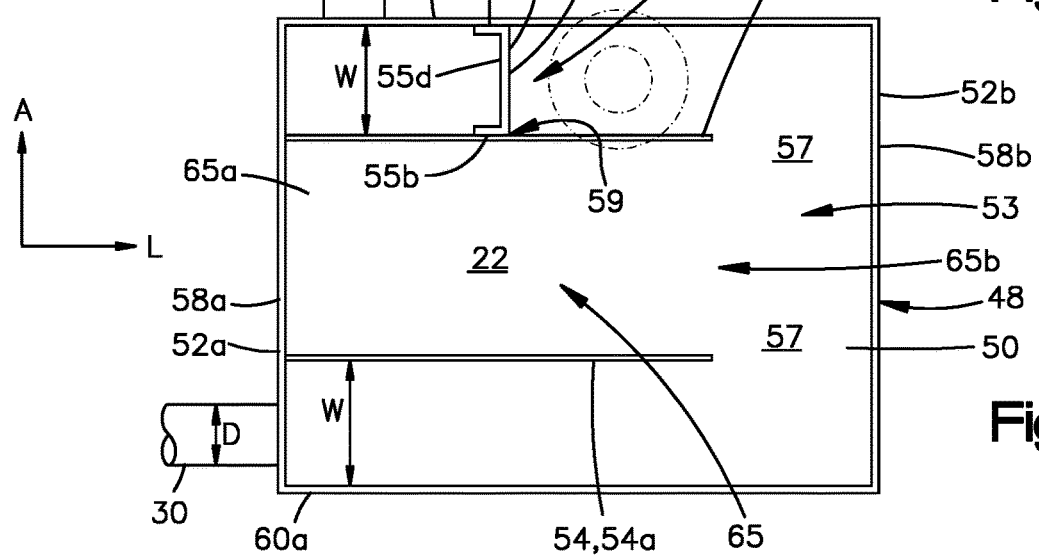

OIL MONITORING SYSTEM

CROSS-REFERENCE TO RELATED APPLICATIONS

This application claims priority to U.S. provisional patent application No. 62/729,002, filed Sep. 10, 2018, the teachings of which are hereby incorporated by reference as if set forth in its entirety herein. This application is related to U.S. non-provisional patent application Ser. No. 15/135,897, filed Apr. 11, 2016, U.S. non-provisional patent application Ser. No. 15/792,163, filed Oct. 24, 2017, U.S. provisional patent application No. 62/151,194, filed Nov. 25, 2015, and U.S. provisional patent application No. 62/412,067, filed Oct. 24, 2016, the teachings of each of which are hereby incorporated by reference as if set forth in their entirety herein.

BACKGROUND

Referring to FIGS. 1A-1C, oil handling facilities 10, such as petroleum storage facilities 12, petroleum processing facilities 14 such as oil refineries 15, and oil mining facilities 19 such as oil wells 17, and the like, are typically disposed in containment areas 16 that are designed to contain liquids that become contaminated with hydrocarbons. For instance, oil handling facilities can be susceptible to storm water, either in the form of run off or accumulation on the storage tanks. The storm water that runs off from oil handling facilities can become contaminated with hydrocarbons. The containment areas 16 are designed to contain the storm water run off, thereby preventing the possibility of contaminants in the run off from entering the ambient environment outside the containment area 16. Alternatively or additionally, oil handling facilities 10 can also include run off retention ponds that are configured to receive and store storm water run off.

Further, petroleum storage tanks are available with floating roofs that rest atop the petroleum stored in the tank, and thus rises and falls with increasing and decreasing levels of petroleum. Floating roofs are conventionally employed as a way to safely store the contained petroleum with minimal escape of petroleum vapors into the environment. The floating roof is sealed with respect to the outer tank wall, such that as the volume of stored petroleum changes, the floating roof slides along the side wall of the tank without allowing leakage at the interface of the floating roof and the side wall of the tank. It is recognized that the floating roof and the portion of the side wall of the tank that resides above the floating roof can cooperate to define a basin that collects storm water. If the collected storm water is allowed to remain, the volume of storm water can collect in an amount sufficient to compromise the structural integrity of the roof.

Whether it is desired to discharge the storm water that is present in the form of run off in a retention pond, or present in the form of storm water collected by the roofs of petroleum storage tanks, it is desirable to discharge the storm water to a remote location outside the oil handling facility, where it can enter the environment outside the containment area 16. However, it is desirable to ensure that environmentally harmful oil has not contaminated the storm water prior to discharging the storm water into the environment.

SUMMARY

The following Summary is provided to introduce a selection of concepts in a simplified form that are further described below in the Detailed Description. This Summary is not intended to identify key features or essential features of the invention, nor is it intended to be used to limit the scope of the invention. Reference is made to the claims for that purpose.

In one aspect of the present disclosure, a filter system comprises a filter chamber body having a chamber base, and at least one chamber wall that extends up from the chamber base. A chamber inlet extends through the filter chamber body. The filter chamber body is configured to receive the fluid through the chamber inlet. A chamber outlet extends through the filter chamber body at a location downstream of the chamber inlet with respect to a direction of fluid flow through the filter chamber body. The filter chamber body is configured to expel the fluid through the chamber outlet. A plurality of fluid flow paths extend between the chamber inlet and the chamber outlet. The plurality of fluid flow paths include first and second subsets, each including at least a respective one of the fluid flow paths. A plurality of hydrocarbon filters are disposed in the filter chamber body such that each hydrocarbon filter is disposed in a fluid flow path. Each hydrocarbon filter is configured to remove and retain hydrocarbons from the fluid. The filter system is configured to direct the fluid to the first subset, and once each hydrocarbon filter of the first subset becomes saturated with hydrocarbons, the filter system diverts the fluid to flow to the second subset.

In another aspect, a method comprises a step of directing a fluid to flow to a chamber inlet of a filter system and through the chamber inlet into a filter chamber body of the filter system. The method comprises a step of causing the fluid to flow along a first subset of a plurality of fluid flow paths to a chamber outlet of the filter system. The first subset includes at least one respective fluid flow path, and each fluid flow path of the first subset includes a respective hydrocarbon filter configured to remove and retain hydrocarbons from the fluid. The method comprises a step of diverting, once each hydrocarbon filter of the first subset becomes saturated with hydrocarbons, the fluid flow to a second subset of the plurality of fluid flow paths. The second subset includes at least one respective fluid flow path, and each fluid flow path of the second subset includes a respective hydrocarbon filter configured to remove and retain hydrocarbons from the fluid.

BRIEF DESCRIPTION OF THE DRAWINGS

The foregoing summary, as well as the following detailed description, is better understood when read in conjunction with the appended drawings. There is shown in the drawings example embodiments, in which like reference numerals correspond to like reference numerals throughout. The present invention is not intended to be limited to the specific embodiments and methods disclosed, and reference is made to the claims for that purpose.

FIG. 7 is a schematic diagram illustrating communications operations of the monitoring system illustrated in FIG. 4;

FIG. 14A is an exploded perspective view of a fluid flow separation chamber of the monitoring system illustrated in FIG. 4, constructed in accordance with yet another embodiment;

FIG. 14B is a top plan view of the fluid flow separation chamber illustrated in FIG. 14A;

DETAILED DESCRIPTION

Figure 1A:
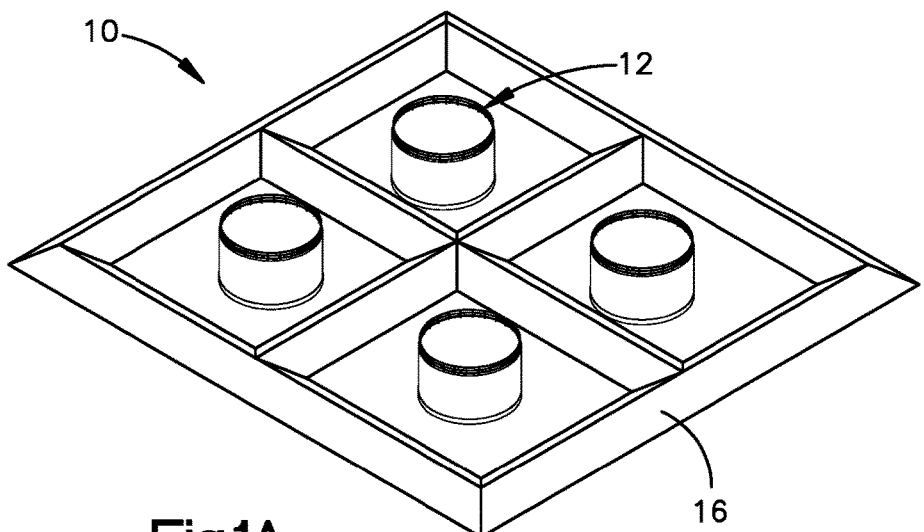
FIG. 1A is a schematic perspective view of a conventional petroleum storage facility.
Figure 1B:
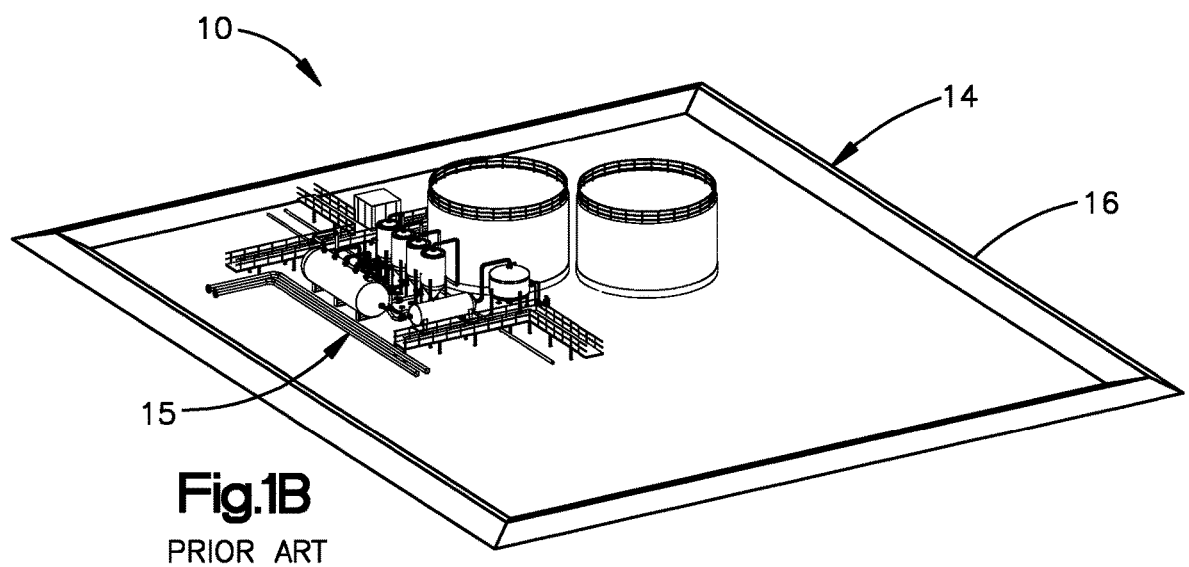
FIG. 1B is a schematic perspective view of a conventional petroleum processing facility.
Figure 1C:
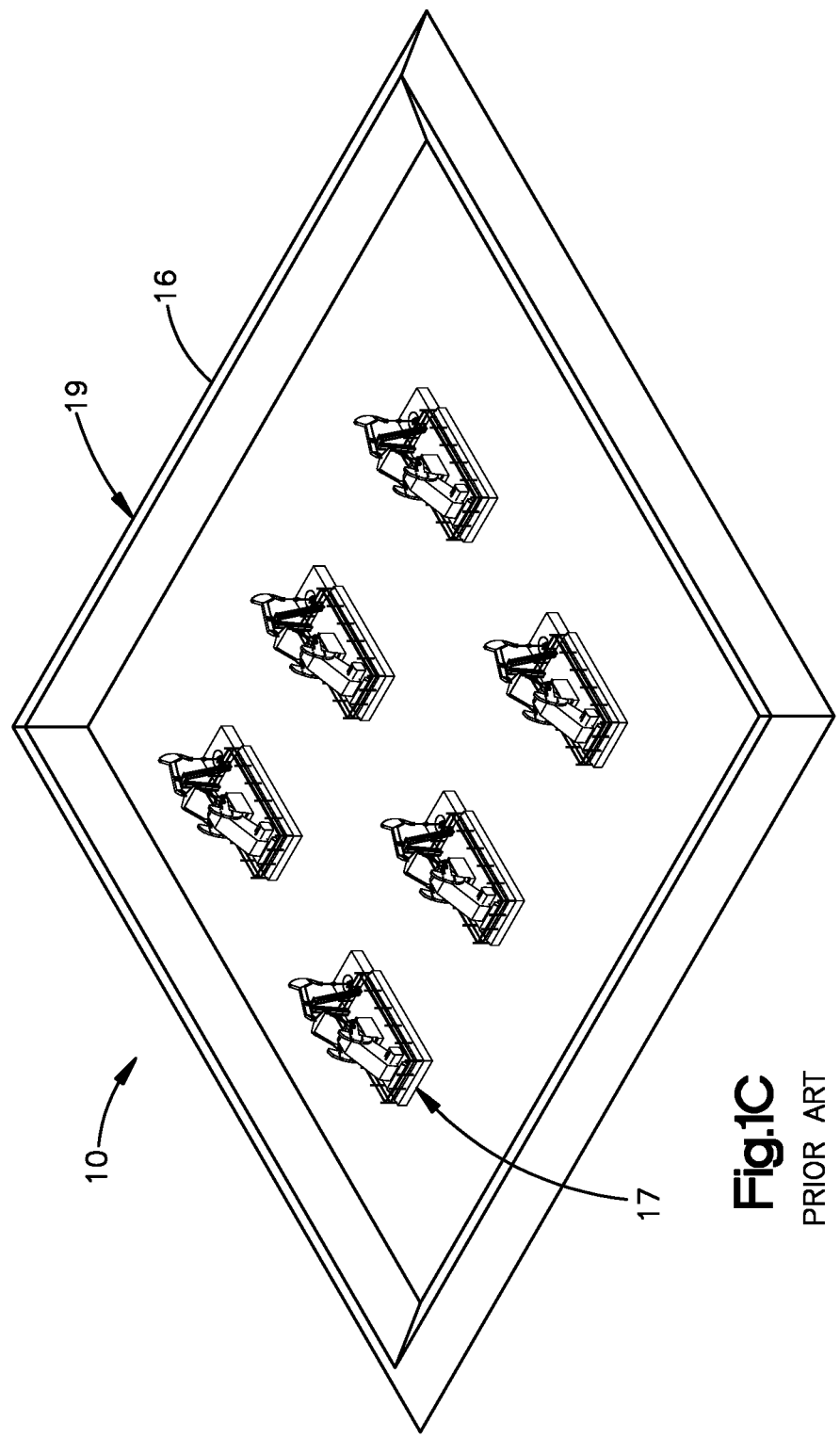
FIG. 1C is a schematic perspective view of a conventional oil mining facility.
Figure 2:
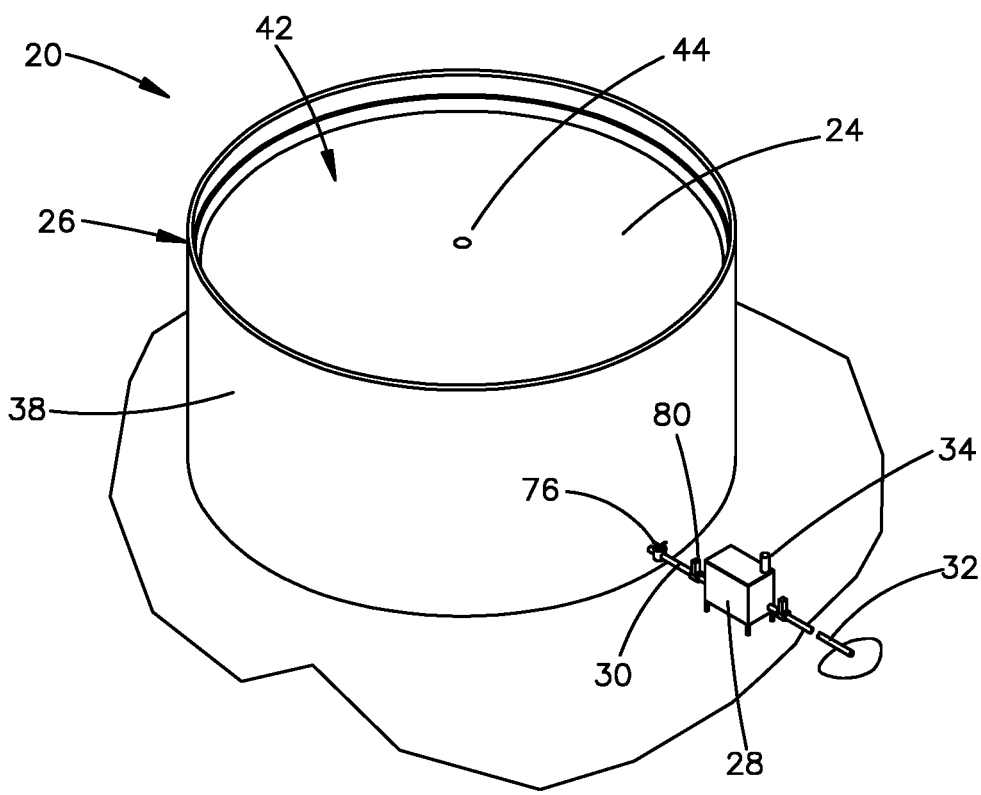
FIG. 2 is a perspective view of a monitored petroleum storage assembly including a petroleum storage tank and a monitoring system.
Figure 3A:
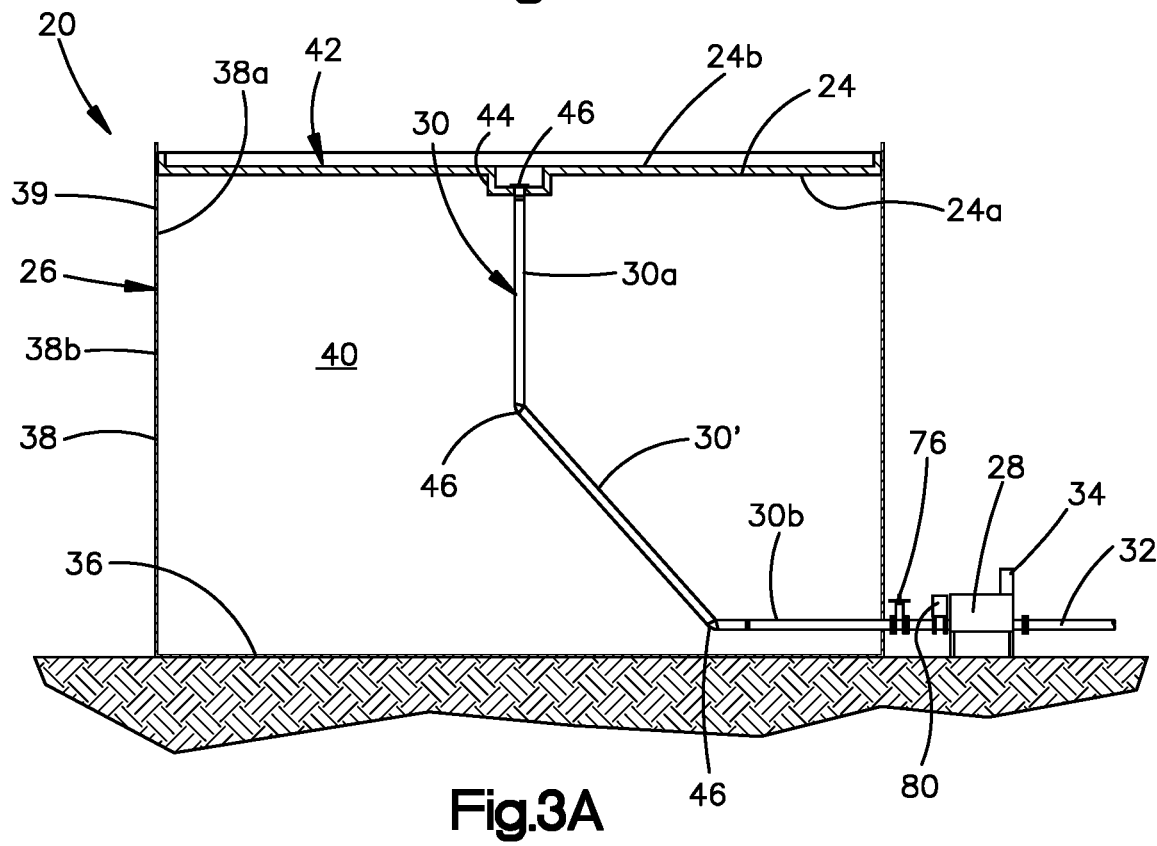
FIG. 3A is a side elevation view of the monitored petroleum storage assembly illustrated in FIG. 2, showing an interior of the petroleum storage tank having a floating roof at a first elevation.
Figure 3B:
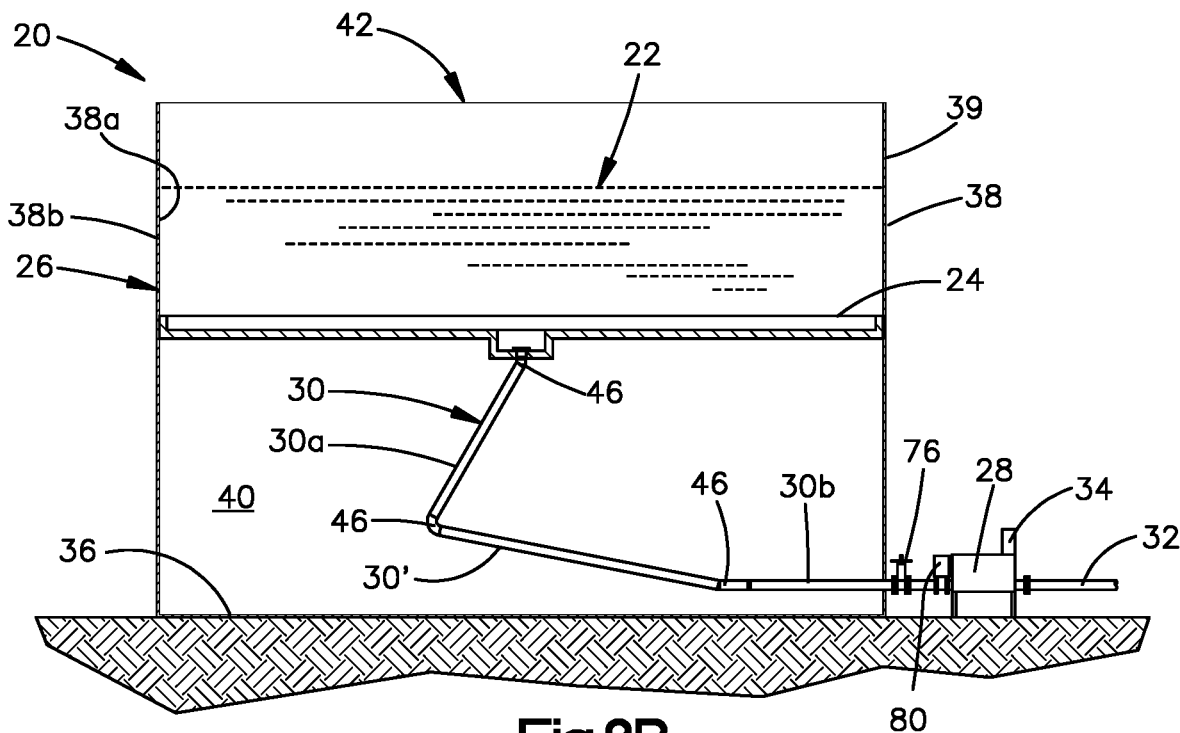
FIG. 3B is a side elevation view of the monitored petroleum storage assembly illustrated in FIG. 3A, but showing the floating roof at a second elevation different than the first elevation.
Figure 4:
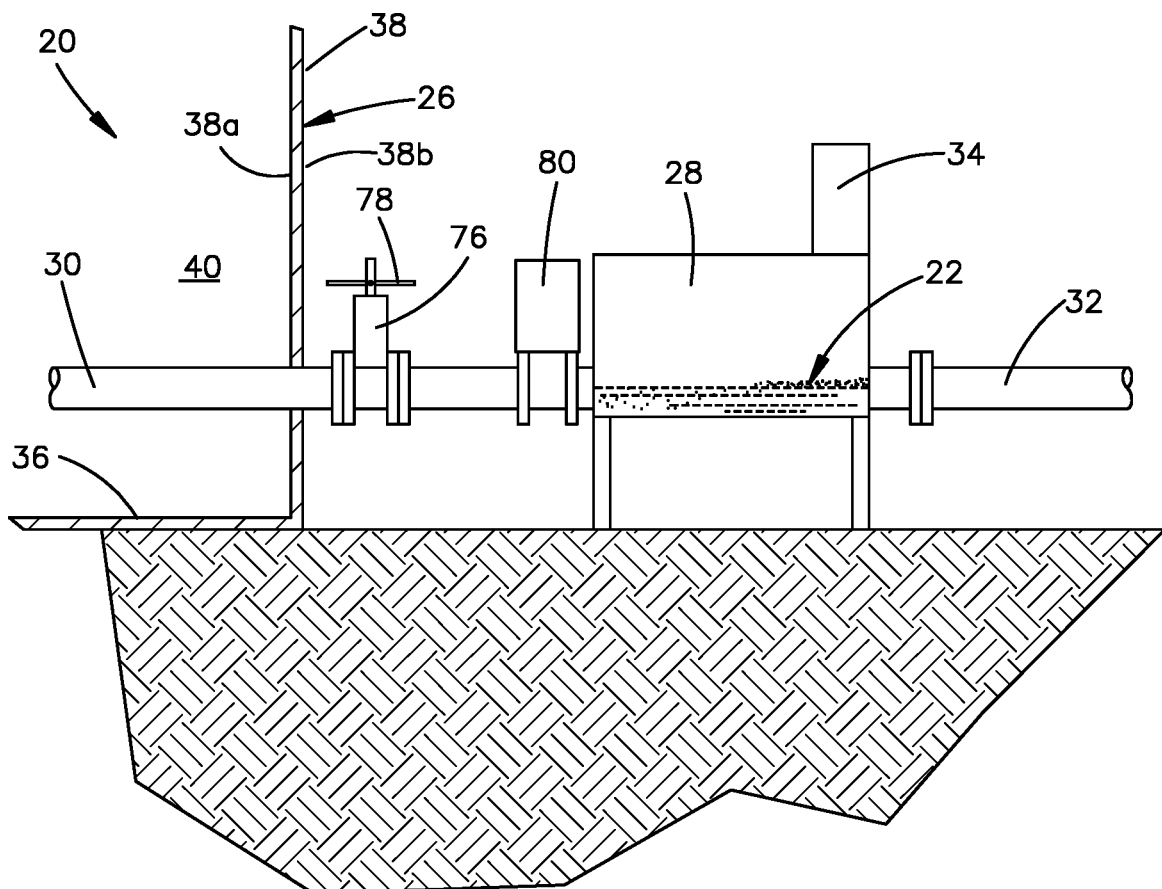
FIG. 4 is a schematic side view of the monitoring system illustrated in FIG. 2, shown constructed in accordance with one embodiment.

Referring to FIGS. 2-4, a monitoring system 20 is configured to detect the presence of a selected group of hydrocarbons in a fluid 22 to be discharged from a location of an oil handling facility. The selected group of hydrocarbons can include, but is not necessarily limited to, diesel/fuel oil, lube oil, motor oil, hydraulic oil, jet fuel, mineral oil, and crude oil. Thus, reference herein to hydrocarbons refers to the selected group of hydrocarbons unless otherwise indicated. The oil handling facility can be in the form of a petroleum storage facility 23 (see FIG. 11A), an oil processing facility 25 (see FIG. 11B), or an oil mining facility 33 (see FIG. 11C). Thus, the location of the oil handling facility can be a floating roof of a petroleum storage tank, or a retention pond of an oil processing facility or oil mining facility. While the monitoring system will now be described in conjunction with a petroleum storage facility, it will be appreciated from the description below that the monitoring system can be used in conjunction with an oil processing facility or an oil mining facility.

The petroleum storage facility 23 includes at least one petroleum storage tank 26 such as a plurality of petroleum storage tanks 26 that each has a floating roof 24. Thus, the discharged fluid 22 to be monitored can be drained from a floating roof 24 and out the petroleum storage tank 26. The petroleum storage tank 26 can be dimensioned to store any suitable volume of petroleum as desired, from several hundred thousands of gallons of petroleum to several million gallons of petroleum. The fluid 22 can be a storm water-based fluid.

The monitoring system 20 can include one or more up to all of the oil handling facility, a fluid flow separation chamber 28, a first or an inlet conduit 30 that extends from the oil handling facility to an inlet 29 (see FIGS. 5A, 13A, 14A, and 15A) of the fluid flow separation chamber 28, and a hydrocarbon sensor 34 that is configured to be supported by the fluid flow separation chamber 28. When the oil handling facility includes the petroleum storage tank 26, the inlet conduit 30 extends from the petroleum storage tank 26 to the inlet 29, and is configured to deliver fluid 22 that is discharged from the petroleum storage tank 26 to the fluid flow separation chamber 28. The monitoring system 20 can further include a heater 81 that is configured to deliver heat to the inlet conduit 30, thereby preventing the fluid from freezing in the inlet conduit 30 during periods of cold weather.

The monitoring system 20 can further include a second or outlet conduit 32 having a first end attached to an outlet 31 (see FIGS. 5A, 13A, 14A, and 15A) of the fluid flow separation chamber 28, and a second end configured to deliver the fluid 22 to a location in the environment, such as the earth. The outlet conduit 32 can define an inner cross-sectional area that is greater than that of the inlet conduit 30. Thus, the outlet conduit 32 can define an inner diameter that is greater than that of the inlet conduit 30. In one example, the outlet conduit 32 can have an inner diameter of five inches or greater (such as between 5 inches and 10 inches), and the inlet conduit 30 can have an inner diameter of less than five inches (such as between 2 inches and 5 inches), though it should be appreciated that the inner diameters of the inlet conduit 30 and the outlet conduit 32 can be alternatively dimensioned as desired. It should be further appreciated that the size of the separation chamber 28 and conduits can be scaled up or down depending on the volume of fluid 22 that is expected to be received by the fluid flow separation chamber 28 in a given application.

It is recognized that seals can wear, and other conditions can allow quantities of petroleum of the storage tank 26 to enter the inlet conduit 30. In order to prevent the delivery of the fluid 22 to the ambient environment outside the containment area when the fluid 22 contains a predetermined threshold amount of petroleum, the monitoring system 20 can include a hydrocarbon sensor 34 that is configured to detect the threshold amount of hydrocarbons in the fluid 22 at a location inside the fluid flow separation chamber 28. When the oil handling facility is configured as a petroleum storage facility, the hydrocarbons can, for instance, be present in petroleum that has entered the fluid 22 from the storage tank 26. In this regard, the hydrocarbon sensor 34 can be referred to as a petroleum sensor, and the monitoring system 20 can be referred to as a petroleum monitoring system. As will be described in more detail below, the fluid flow separation chamber 28 is configured to cause hydrocarbons present in the fluid 22 to rise to the upper surface of the fluid 22 to create a sheen, such that it can be reliably detected by the hydrocarbon sensor 34. For example, the fluid flow separation chamber 28 can be configured to disrupt the flow of the fluid 22 from the inlet 29 to the outlet 31 so as to cause hydrocarbons present in the fluid 22 to rise to the upper surface of the fluid 22. Thus, the fluid flow separation chamber 28 can include one or more features that disrupt the flow of the fluid between the inlet 29 to the outlet 31. Further, as described in more detail below, the monitoring system 20 can prevent the delivery of the fluid 22 into the environment when the hydrocarbon sensor 34 detects the predetermined threshold amount of petroleum in the fluid 22. The threshold amount can be any amount of petroleum in the fluid 22 that is greater than zero. For instance, the threshold amount can be any amount of petroleum that produces a sheen on an upper surface of the fluid 22. The hydrocarbon sensor 34 can be constructed as described in U.S. Pat. No. 7,688,428, the disclosure of which is hereby incorporated by reference as if set forth in its entirety herein. It should be appreciated, of course, that the hydrocarbon sensor 34 can be constructed in accordance with any alternative embodiment as desired, suitable to detect petroleum present in a fluid.

As illustrated in FIGS. 2-3B, the petroleum storage tank 26 can include a base 36, and at least one side wall 38 that extends up from the base 36. The side wall 38 can define an inner surface 38a and an outer surface 38b opposite the inner surface. The inner surface 38a can at least partially define an interior 40 of the storage tank 26 that is configured to house a quantity of petroleum. For instance, the base 36, the side wall 38, and the floating roof 24 can cooperate so as to define the interior 40 of the storage tank 26. The at least one side wall 38 can be configured as a cylindrical wall, or can define any suitable alternative shape as desired.

The floating roof 24 defines a lower surface 24a and an upper surface 24b opposite the lower surface 24a. The lower surface 24a is configured to face the interior 40 of the storage tank 26. As the volume of petroleum stored in the interior 40 of the storage tank 26 increases, the floating roof 24 rises with respect to the at least one side wall 38. Similarly, as the volume of petroleum stored in the interior 40 of the storage tank 26 decreases, the floating roof 24 falls with respect to the at least one side wall 38. For instance, the floating roof 24 can ride along the inner surface 38a of the at least one side wall 38 as the floating roof 24 rises and falls. The floating roof 24 can be sealed against the inner surface 38a of the side wall 38 so as to prevent the leakage of petroleum through the interface between the floating roof 24 and the inner surface 38a of the side wall 38, and into the environment. Further the sealed interface between the floating roof 24 and the inner surface 38a of the side wall 38 can prevent environmental contaminants from entering the interior 40 of the petroleum storage tank 26. In the event that water were to enter the interior 40 of the storage tank 26, the water is typically drained through a sump in the base 36 of the storage tank 26, and removed from the stored petroleum.

In one example, the lower surface 24a of the floating roof 24 is configured to ride along the upper surface of the petroleum stored in the interior 40 of the storage tank 26. As a result, the floating roof 24 is configured to ride along the upper surface of the petroleum contained in the interior 40 of the storage tank 26 as the volume of petroleum contained in the interior increases and decreases. It should be appreciated that the volume of petroleum in the interior 40 of the storage tank 26 can cause the floating roof 24 to be positioned at a location such that the upper surface 24b of the floating roof 24 is disposed below an upper end of the at least one side wall 38. Accordingly, the upper surface 24b of the floating roof 24 and the inner surface 38a of the side wall 38 at an upper portion 39 of the side wall 38 that is disposed above the floating roof 24 can define a basin 42 that can be configured to collect the fluid 22, which can be provided as storm water during periods of rain.

In order to allow for the discharge of the fluid 22 from the basin 42, the storage tank 26 can include a drain 44 that extends through the floating roof 24 from the upper surface 24b to the lower surface 24a. The inlet conduit 30 can extend from the floating roof 24, and in particular from the drain 44, through the interior 40 of the petroleum storage tank 26, and out the petroleum storage tank 26 to the inlet 29 of the fluid flow separation chamber 28. Thus, the inlet conduit 30 places the drain 44 in fluid communication with the fluid flow separation chamber 28. The inlet conduit 30 can have any dimension as desired, such as a cross-sectional dimension between one inch and ten inches. The inlet conduit 30 can include a butterfly valve or any suitable alternative actuated valve as desired configured to regulate the flow of the fluid 22 through the inlet conduit. The inlet conduit 30 includes a first conduit segment 30a that extends from the drain 44 in the floating roof 24. In particular, the first conduit segment 30a can be coupled to the lower surface 24a of the floating roof 24 inside the interior 40 of the petroleum storage tank 26, and in fluid communication with the drain 44. The first conduit segment 30a can, for instance be coupled to the lower surface 24a of the floating roof 24 via a flexible or otherwise movable joint 46.

The inlet conduit 30 can further include a second inlet conduit segment 30b that extends between the first inlet conduit segment 30a and the inlet 29 of the fluid flow separation chamber 28. The second inlet conduit segment 30b can be movably coupled with respect to the first inlet conduit segment 30a. In one example, the second conduit segment 30b can attach at a first end to the inlet 29 of the fluid flow separation chamber 28. Further, the second conduit segment 30b can attach at a second end, opposite the first end, to the first conduit segment 30a. In another example, the inlet conduit 30 can include at least one intermediate conduit segment 30' coupled from the second end of the second conduit segment 30b to the first conduit segment 30a. The conduit segments can be attached to each other via a flexible or otherwise movable joint 46 as described above. Further, the first end of the second conduit segment 30b can be attached to the inlet 29 of the fluid flow separation chamber 28 via the movable joint 46. Alternatively, because the orientation of the second conduit 30b can remain constant as the floating roof 24 is raised and lowered with respect to the at least one side wall 38 due to the inclusion of the at least one intermediate conduit segment, the first end of the second conduit 30b can be fixedly attached to the inlet 29 of the fluid flow separation chamber 28. It should therefore be appreciated that the inlet conduit 30 can place the drain 44 in fluid communication with the inlet 29 of the fluid flow separation chamber both when the floating roof 24 is at a first vertical position with respect to the at least one side wall 38, and when the floating roof 24 is at a second vertical position with respect to the at least one side wall 38 that is different than the first position.

The conduit segments 30a, 30b, and 30' can be attached to each other via the movable joint 46. Accordingly, as the floating roof 24 rises and lowers with respect to the at least one side wall 38, the movable joint 46 allows the conduit segments to change in orientation and position with respect to the floating roof 24 without compromising the sealed interface between the first conduit segment 30a and the floating roof 24. Alternatively or additionally, one or more of the conduit segments 30a, 30b, and 30' can be flexible conduits.

Referring now generally to the embodiments of FIGS. 5A-5B, 13A-13B, 14A-14B, and 15A-15B, in each embodiment, the fluid flow separation chamber 28 defines a chamber body 48, such that the inlet 29 and the outlet 31 extend through the chamber body 48. The outlet 31 is positioned downstream from the inlet 29 with respect to the direction of the flow of fluid 22 through the chamber 28. The chamber body 48 can include a base 50 and at least one outer wall 52 that extends up from the base 50. For instance, the outer wall 52 can extend up from the base 50 along a transverse direction T. The transverse direction T can be oriented in a vertical direction during use. The base 50 and the outer wall 52 each defines a respective inner surface that cooperate with each other to define an interior 53 of the fluid flow separation chamber 28. The fluid flow separation chamber 28 can further include a heater that is configured to deliver heat to the chamber body 48, for instance the base 50, so as to prevent fluid 22 disposed in the interior 53 of the separation chamber 28 from freezing.

The chamber body 48, and thus the fluid flow separation chamber 28, further includes a plurality of baffles 54 that extend up from the base 50. For instance, the baffles 54 can extend up from the base 50 along the transverse direction T. The baffles 54 can be disposed adjacent each other along a lateral direction A that is perpendicular to the transverse direction T. The lateral direction A can thus be oriented in a horizontal direction during use. The chamber body 48, including the base 50, the baffles 54, and the outer wall 52, can be made of any suitable material as desired. In one example, the chamber body 48 can be metallic.

The fluid flow separation chamber 28 defines a plurality of fluid flow channels 56 that are configured to deliver the fluid from the inlet 29 to the outlet 31. The fluid flow channels 56 can be defined between adjacent ones of the baffles 54. The fluid flow channels 56 can further be defined between outermost ones of the baffles 54 and the at least one outer wall 52. The fluid flow channels 56 can be sequentially arranged with respect to the direction of fluid flow from the inlet 29 to the outlet 31 of the fluid flow separation chamber 28. Thus, the fluid 22 travels from the floating roof 24, through the inlet conduit 30 and the inlet 29, through the fluid flow channels 56, and out the outlet 31. The baffles 54 and corresponding channels 56 direct the fluid 22 to flow in different directions sequentially at least once as it flows from the inlet 29 to the outlet 31. For instance, the different directions can be opposite directions. The separation chamber 28 can further include an upper wall 51 that is supported by the upper end of the outer wall 52, and can cover the outer wall 52 and the baffles 54. Further, the upper wall 51 can seal against the outer wall 52 and the baffles 54, thereby closing the upper ends of the fluid flow channels 56. The upper wall 51 can be configured as a cover that can be removable (for removed instance in its entirety or hinged to the chamber body 48) from the upper ends of the outer wall 52 and the baffles 54, and subsequently reattached to the chamber body 48.

The fluid flow channels 56 can have a constant width W throughout the separation chamber 28. Alternatively, the fluid flow channels 56 can have different widths W. For instance, one or more channels 56 disposed downstream of one or more upstream channels 56 can have a respective width W greater than that of the upstream channels 56. The width W can be measured along the lateral direction A between adjacent ones of the baffles 54, or with respect to outermost channels 56 between the outermost ones of the baffles 54 and the outer wall 52. Thus, it should be appreciated that the fluid flow channels 56 can define a constant cross-sectional area. Alternatively, one or more of the channels can have a greater cross-sectional area than one or more others of the fluid flow channels 56. For instance, the one or more channels having the greater cross-sectional area can be disposed downstream of the one or more others of the fluid flow channels 56. The cross-sectional area of the fluid flow channels 56 can, for instance, be measured along a plane that is oriented along a direction normal to the direction of fluid flow through the fluid flow channels 56. In one example, the plane can be defined by the transverse direction T and the lateral direction A.

In one example, each of the plurality of baffles 54 defines a first end and a second end opposite the first end with respect to a longitudinal direction L that is perpendicular to each of the transverse direction T and the lateral direction A. The longitudinal direction L can be oriented along a horizontal direction during use. At least one of the first and second ends of each of the baffles 54 can be spaced from the outer wall 52. Therefore, the fluid flow separation chamber 28 defines a plurality of gaps 57 that allow the fluid 22 to flow from a respective one of the fluid flow channels 56 sequentially into an adjacent one of the fluid flow channels 56 until the fluid 22 flows out the outlet 31.

In one example, the gaps 57 can be defined by each of the baffles 54 and the outer wall 52. Thus, the gaps 57 can be at least partially defined by the baffles 54, and in particular by the second ends of the baffles 54. It should be appreciated that the gaps 57 can be defined in any suitable alternative manner as desired. For instance the baffles 54 can define openings therethrough that define the respective gaps 57 suitable to allow the fluid 22 to flow from the fluid flow channels 56 into an adjacent one of the fluid flow channels 56. The gaps 57 can be aligned with each other along a horizontal plane that can be defined by the lateral direction A and the longitudinal direction L. Further, the plane can extend parallel to the base 50. Accordingly, the fluid 22 can flow along a flow path from the inlet 29 to the outlet 31 that is defined by the longitudinal direction L and the lateral direction A. The flow path is thus defined between the base 50 and the upper wall 51. It should be appreciated that the plane can be oriented normal to the transverse direction T, as the fluid 22 flows from each of the fluid flow channels 56 into an adjacent one of the fluid flow channels 56 from the inlet 29 to the outlet 31.

The plurality of baffles 54 can include a first group of at least one baffle 54a and a second group of at least one baffle 54b. In one example, adjacent ones of the baffles 54 can be spaced from each other along the lateral direction A. Thus, the baffles 54 can be oriented along respective planes that are defined by the transverse direction T and the longitudinal direction L. Accordingly, at least a pair of the baffles 54 can be oriented parallel to each other. For instance, all of the baffles can be oriented parallel to each other.

The outer wall 52 can include a first end 52a, and a second end 52b spaced from the first end 52a along the longitudinal direction L. The outer wall 52 can define any suitable size and shape as desired. For instance, the outer wall 52 can be cylindrical, otherwise round, angled, or a combination of the above. In one example, the outer wall 52 can be rectangular in a plane that is defined by the longitudinal direction L and the lateral direction A between the base 50 and the upper wall 51. For instance, the outer wall 52 can include a first end wall 58a and a second end wall 58b opposite the first end wall 58a. For instance, the first and second end walls 58a and 58b can be opposite each other along the longitudinal direction L. The first end second ends walls 58a and 58b can extend up from the base 50. For instance, the first end second ends walls 58a and 58b can extend up from the base 50 along the transverse direction T. The first end of the outer wall 52 can be defined by the first end wall 58a, and the second end of the outer wall 52 can be defined by the second end wall 58b.

The outer wall 52 can further include a first side wall 60a and a second side wall 60b opposite the first side wall 60a. For instance, the first and second side walls 60a and 60b can be spaced from each other along the lateral direction A. Each of the first and second side walls 60a and 60b can be connected between the first and second end walls 58a and 58b. For instance, the first and second side walls 60a and 60b can each extend from the first end wall 58a to the second end wall 58b. In one example, the base 40, the outer wall 52, and the baffles 54 can define one single monolithic component. Alternatively, any one or more up to all of the base 40, the outer wall 52, and the baffles 54 can be attached to any one or more of the base 40, the outer wall 52, and the baffles 54 in any manner as desired.

The inlet 29 defines an opening that extends through the outer wall 52 of the chamber body 48. For instance, the inlet 29 can extend through the first end 52a of the outer wall 52. In one example, the inlet 29 can extend through the first end wall 58a of the outer wall 52. The inlet 29 is open to and in fluid communication with a first one of the channels 56, which can be referred to as an upstream-most channel 56. Thus, the inlet 29 can be open to an upstream-most channel 56 such that the fluid 22 flows from the inlet 29 directly to the upstream-most channel 56. In an alternative example, the inlet 29 can extend through the first sidewall 60a of the outer wall 52, such as at a location that is proximate to the first end 52a of the outer wall 52. For instance, the inlet 29 can extend through the first sidewall 60a of the outer wall 52 at a location that is closer to the first end wall 58a than the second end wall 58b. It should be appreciated that the terms "upstream" and "downstream" and derivatives thereof are used herein with respect to the direction that the fluid 22 travels from the floating roof 24 to the second end of the outlet conduit 32, and thus from the inlet 29 to the outlet 31 of the fluid flow separation chamber 28.

Figure 5A:
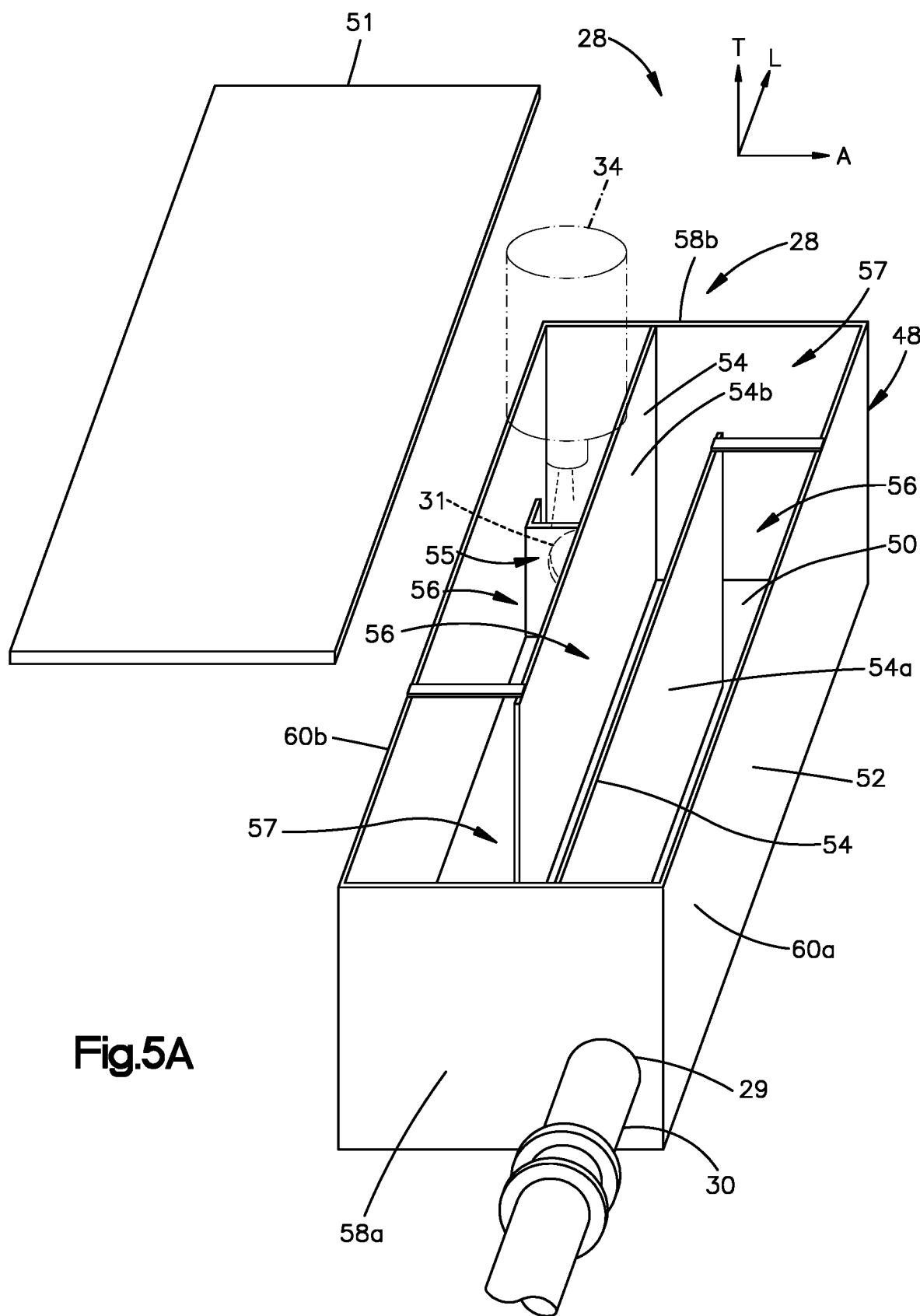
FIG. 5A is an exploded perspective view of a fluid flow separation chamber of the monitoring system illustrated in FIG. 4, constructed in accordance with one embodiment.
Figure 5B:
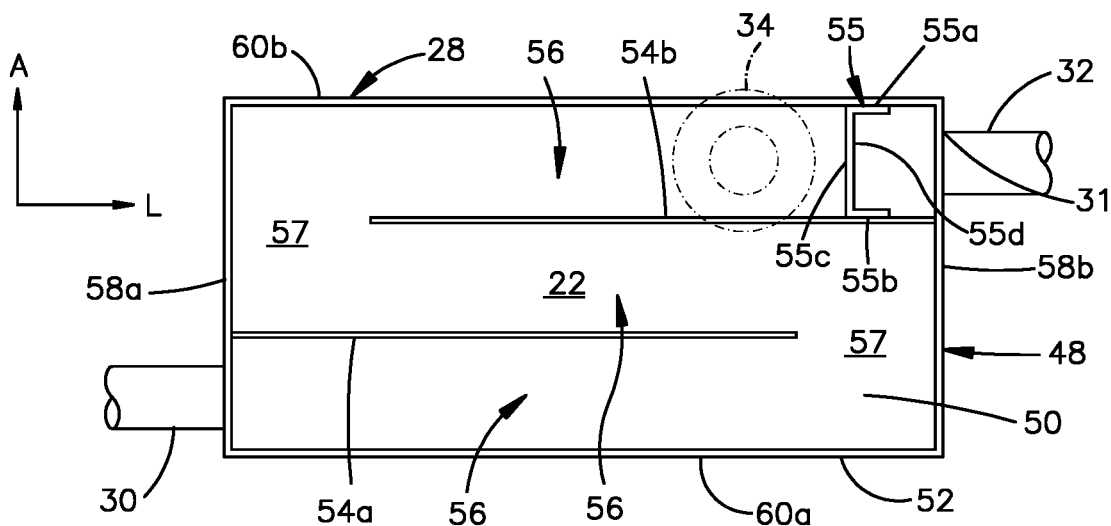
FIG. 5B is a top plan view of the fluid flow separation chamber illustrated in FIG. 5A.
Figure 13A:
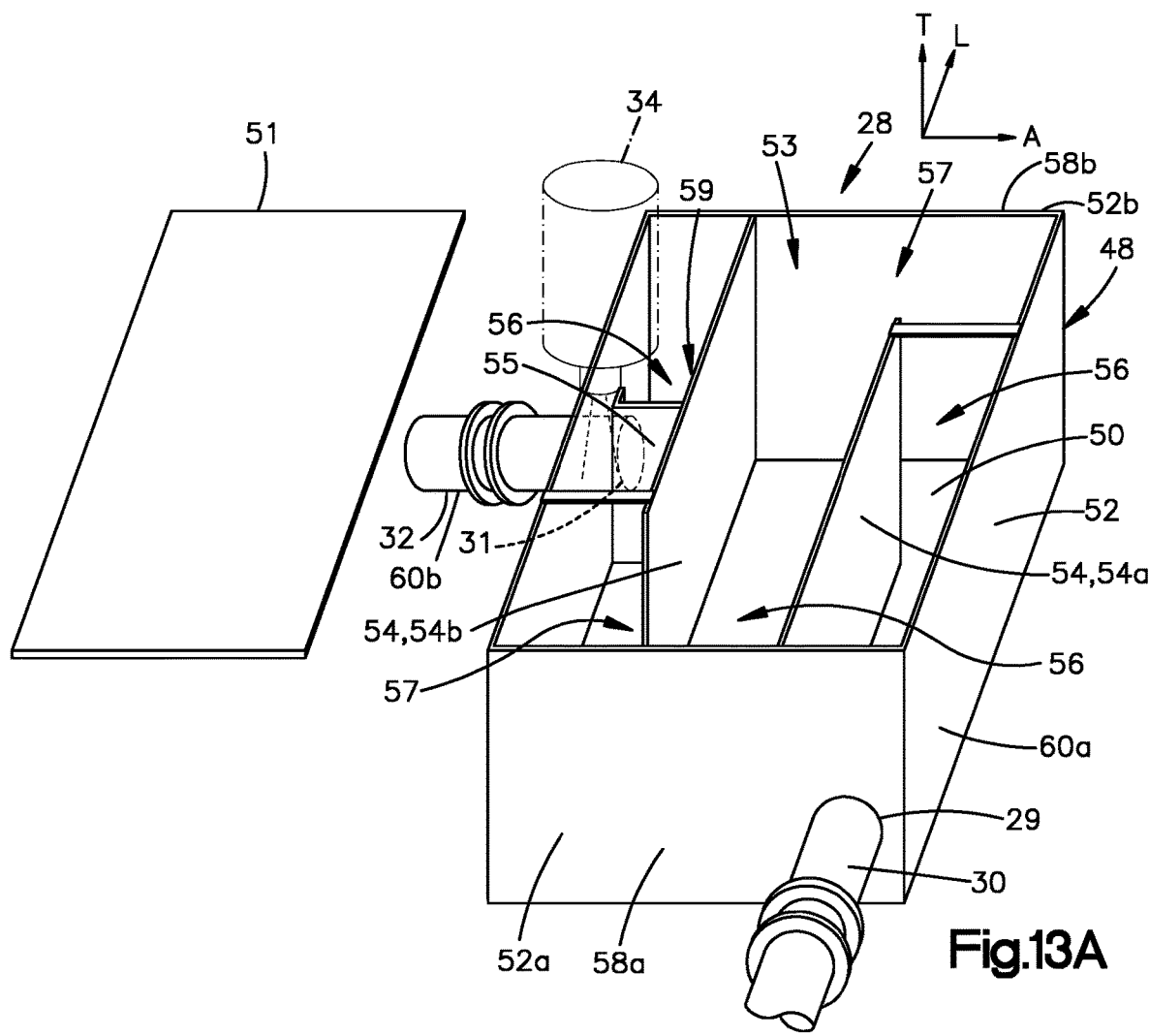
FIG. 13A is an exploded perspective view of a fluid flow separation chamber of the monitoring system illustrated in FIG. 4, constructed in accordance with another embodiment.
Figure 13B:
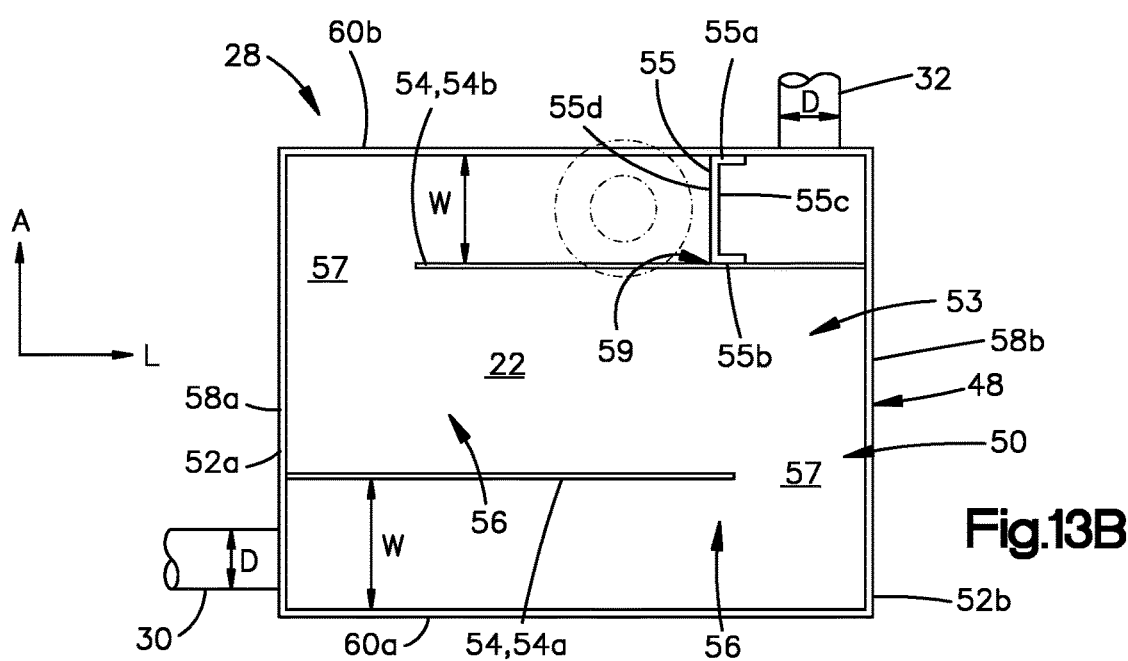
FIG. 13B is a top plan view of the fluid flow separation chamber illustrated in FIG. 13A.

The inlet 29 can have a cross-section D in a plane that is perpendicular to the direction of the flow of the fluid 22 through the inlet 29. The cross-sectional dimension D can extend along a horizontal direction during use. For instance, the cross-sectional dimension D can be aligned with the lateral direction A when the inlet 29 extends through the first end wall 52a. Alternatively, the cross-sectional dimension D of the inlet 29 can be aligned with the longitudinal direction L when the inlet 29 extends through the first side wall 60a. In one example, the cross-sectional dimension D of the inlet 29 can be oriented such that it is parallel to the width W of the upstream-most channel 56 as shown in FIGS. 5B, 13B, and 14B. In such a case, the cross-sectional dimension D of the inlet 29 can be less than the width W of the upstream-most channel 56 adjacent the inlet 29. Thus, the inlet 29 can be open to only the upstream-most channel 56 of the channels 56, and an entirety of the flow of the fluid 22 can pass through the inlet 29 to the upstream-most channel 56.

In another example, the cross-sectional dimension D of the inlet 29 can be oriented such that the cross-sectional dimension D of the inlet 29 is angularly offset from the width W of the upstream-most channel 56. For example, as shown in FIG. 15B, the cross-sectional dimension D of the inlet 29 can be oriented such that it is perpendicular to the width W of the upstream-most channel 56. In such a case, the cross-sectional dimension D of the inlet 29 is not dependent upon the width W of the upstream-most channel 56. Thus, the cross-sectional dimension D of the inlet 29 can be less than, greater than, or equal to the width W of the upstream-most channel 56.

Similarly, the outlet 31 defines an opening that extends through the outer wall 52 of the chamber body 48. For instance, the outlet 31 can extend through the second end 52b of the outer wall 52. In one example, the outlet 31 can extend through the second end wall 58b of the outer wall 52 as shown in FIGS. 5A-5B. The outlet 31 is open to and in fluid communication with a second one of the channels 56, which can be referred to as a downstream-most channel 56. Thus, the outlet 31 can be open to the downstream-most channel 56 such that the fluid 22 flows from the outlet 31 directly to the downstream-most channel 56. In an alternative example, the outlet 31 can extend through the second sidewall 60b of the outer wall 52 as shown in FIGS. 13A-15B. For instance, the outlet 31 can extend through the second sidewall 60b of the outer wall 52 at a location that is between the first end wall 58a than the second end wall 58b.

The outlet 31 can have a cross-section in a plane that is perpendicular to the direction of the flow of the fluid 22 through the outlet 31. Further, the outlet 31 has a cross-sectional dimension D in the plane that is along a horizontal direction during use. For instance, the cross-sectional dimension D of the outlet 31 can be aligned with the lateral direction A when the outlet 31 extends through the second end wall 52b. Alternatively, the cross-sectional dimension D of the outlet 31 can be aligned with the longitudinal direction L when the outlet 31 extends through the second side wall 60b. In one example, the cross-sectional dimension D of the outlet 31 can be oriented such that it is parallel to the width W of the downstream-most channel 56 as shown in FIG. 5B. In such a case, the cross-sectional dimension D of the outlet 31 can be less than the width W of the downstream-most channel 56 adjacent the outlet 31. Thus, the outlet 31 is open to only the downstream-most channel 56 of the channels 56.

In another example, the cross-sectional dimension D of the outlet 31 can be oriented such that it is angularly offset from the width W of the downstream-most channel 56. For example, as shown in FIGS. 13A-15B, the cross-sectional dimension D of the outlet 31 can be oriented such that it is perpendicular to the width W of the downstream-most channel 56. In such a case, the cross-sectional dimension D of the outlet 31 is not dependent upon the width W of the downstream-most channel 56. Thus, orienting the cross-section of the outlet 31 such that the cross-sectional dimension D of the outlet 31 is perpendicular to the width W of the downstream-most channel 56 allows the outlet 31 to have a cross-sectional dimension D that is greater than the width W of the downstream-most channel 56. It will be noted, however, that the cross-sectional dimension D of the outlet 31 can be less than, greater than, or equal to the width W of the downstream-most channel 56.

In some examples, as shown in FIGS. 5A, 5B, and 13A-15B, the chamber body 48, and thus the fluid flow separation chamber 28, can include at least one flow-restricting wall 55. It will be understood that, in some examples, the fluid flow separation chamber 28 can include a plurality of flow-restricting walls, and that at least a portion of the following description can pertain to each of the flow-restricting walls. The flow-restricting wall 55 can extend into one of the channels 56. For example, the flow-restricting wall 55 can extend into the downstream-most channel 56 as shown. Alternatively, the flow-restricting wall 55 can extend into a channel 56 that is upstream of the downstream-most channel 56.

The flow-restricting wall 55 can be disposed between the outer wall 52 and an outermost one of the baffles 54, or can be disposed between adjacent ones of the baffles 54. Further, the flow-restricting wall 55 can be angularly offset with respect to the direction of the flow of the fluid 22 through its respective channel 56. Thus, the flow-restricting wall 55 can limit the flow of the fluid 22 through the respective channel 56 so as to disrupt the flow of the fluid 22 through the channel 56. For example, the flow-restricting wall 55 can obstruct a first portion of the flow of the fluid 22 through its respective channel 56, while permitting a second portion of the flow of the fluid 22 to pass through the respective channel 56 to the outlet 31. In one example, the flow-restricting wall 55 can be perpendicular to the direction of the flow of the fluid 22 through its respective channel 56. The flow-restricting wall 55 can be made of any suitable material as desired. In one example, the flow-restricting wall 55 can be metallic.

The flow-restricting wall 55 can define a first end 55a and a second end 55b offset from the first end 55a. The first end 55a can be adjacent to one of (i) a respective baffle 54 that defines the channel 56 in which the flow-restricting wall 55 is disposed and (ii) the outer wall 52. For example, the first end 55a can be attached to the one of the respective baffle 54 and the outer wall 52. The second end can be adjacent to a respective baffle 54 that defines the channel 56 in which the flow-restricting wall 55 is disposed. In one example as shown, the first end 55a is attached to the outer wall 52 and the second end 55b is attached to the baffle 54b by welding or other suitable fastener. The fastening can be such that at least one, such as both, of the interfaces between the flow-restricting wall 55 and the outer wall 52 and between the flow-restricting wall 55 and the baffle 54b is porous so as to allow water to seep through the at least one interface. Thus, it can be said that at least of the interfaces defines a gap 59. Alternatively, the welding can be such that at least one, such as both, of the interfaces between the flow-restricting wall 55 and the outer wall 52 and between the flow-restricting wall 55 and the baffle 54b is water tight so as to prevent water from seep through the at least one interface. In an alternative embodiment, at least one of the first and second ends 55a and 55b can be spaced from both the respective baffle 54 that defines the channel 56 in which the flow-restricting wall 55 is disposed and from the outer wall 52. In other words, least one of the first and the second ends 55a and 55b of the flow-restricting wall 55 can be a free end that is not attached to any baffle 54 or the outer wall 52.

The flow-restricting wall 55 can have a upstream-most surface 55c, and a downstream-most surface 55d spaced from the upstream-most surface 55c along the direction of the fluid flow. The upstream-most surface 55c can oppose the direction of the fluid flow, and the downstream-most surface 55d can face the direction of the fluid flow. Thus, the upstream-most surface 55c can be angularly offset from the direction of the fluid flow. In one example, the upstream-most surface 55c can be normal to the direction of the fluid flow. The upstream-most and downstream-most surfaces 55c and 55d can extend between the first end 55a and the second end 55b. In one example, the flow-restricting wall 55 can have a thickness from the upstream-most surface 55c to the downstream-most surface 55d that is less than a width from the first end 55a to the second end 55b.

When implemented in the downstream-most channel 56, the flow-restricting wall 55 can be spaced from the outlet 31 along a horizontal direction. For example, the flow-restricting wall 55 can be spaced from the outlet 31 along the longitudinal direction L so as to define a gap between the flow-restricting wall 55 and the outlet 31. Further, the fluid flow separation chamber 28 can be configured to support the sensor 34 at a sensor location, and the flow-restricting wall 55 can be spaced between the sensor location and the outlet 31 with respect to the direction of fluid flow. In some embodiments, the fluid flow separation chamber 28 include the sensor 34, and the flow-restricting wall 55 can be spaced between the sensor 34 and the outlet 31 with respect to the direction of fluid flow. It will be understood that the fluid flow separation chamber 28 can be distributed together with, or separately from, the sensor 34.

The flow-restricting wall 55 can have a width along a horizontal direction that is less than or substantially equal to a width of the channel 56 in which the flow-restricting wall 55 is disposed. In some embodiments, the fluid flow separation chamber 28 can define a gap 59 between the flow-restricting wall 55 and one of (i) a respective baffle 54 that defines the channel 56 in which the flow-restricting wall 55 is disposed and (ii) the outer wall 52. The gap 59 can allow the fluid 22 to flow through a respective one of the fluid flow channels 56 from the upstream-most side 55c of the flow-restricting wall 55 to the downstream-most side 55d of the flow-restricting wall 55. The flow-restricting wall 55 can have a height along the transverse direction T. In one example, the height of the flow-restricting wall 55 can be less than a height of the outer wall 52 along the transverse direction T. Further, the height can be greater than a height from the base 50 to a top of the outlet 31 such that the flow-restricting wall 55 extends higher than the outlet 31. Thus, the flow-restricting wall 55 can allow the fluid to flow over the flow-restricting wall 55 to the outlet 31. In another example, the height of the flow-restricting wall 55 can be equal to a height of the outer wall 52 along the transverse direction T. Thus, the flow-restricting wall 55 can limit flow of the fluid over the flow-restricting wall 55. In addition or alternatively, the flow-restricting wall 55 can be spaced from the base 50 along the transverse direction T so as to allow fluid to flow under the flow-restricting wall 55.

In one example, the gap 59 can at least partially be defined by a respective flow-restricting wall 55. For example, the gap 59 can be defined by the second end of the flow-restricting wall 55. The gap 59 can be defined between flow-restricting wall 55 and one of a baffle 54 and the outer wall 52. It should be appreciated that the gap 59 can be defined in any suitable alternative manner as desired. For instance, the flow-restricting wall 55 can define an opening therethrough that defines a respective gap 59 suitable to allow the fluid 22 to flow from the upstream-most side 55c of the flow-restricting wall 55 to the downstream-most side 55d of the flow-restricting wall 55. The gap 59 can be aligned with the gaps 57 along a plane that can be defined by the lateral direction A and the longitudinal direction L. Thus, the flow-restricting wall 55 can have a cross-sectional area in a first vertical plane, the channel 56 into which the flow-restricting wall 55 extends can have a cross-sectional area in a second vertical plane that is parallel to the first vertical plane, and the cross-sectional area of the channel 56 can be greater than the cross-sectional area of the flow-restricting wall 55. In one example, the first and second vertical planes can be defined in the lateral direction A and the transverse direction T.

In one example, as shown in FIGS. 5A, 5B, and 13A-15B, a first flow-restricting wall 55 can be disposed in the downstream-most channel 56. The flow-restricting wall 55 can extend from the outer wall 52 into the downstream-most channel 56. Further, the second end 55b of the flow-restricting wall 55 can be spaced from the baffle 54 that defines the downstream-most channel 56. Thus, a gap 59 can be at least partially defined between the flow-restricting wall 55 and the baffle 54 that defines the downstream-most channel 56, and in particular between the second end of the flow-restricting wall 55 and the baffle 54. It will be noted that, in alternative examples, the flow-restricting wall 55 can be disposed in a channel other than the downstream-most channel 56, or a plurality of flow-restricting walls 55 can be disposed in a plurality of channels 56. Additionally, more than one flow-restricting wall 55 can be disposed within the same channel 56.

Referring more specifically to the embodiments in FIGS. 5A-5B and 13A-13B, the first group of at least one baffle 54a and the second group of at least one baffle 54b can be alternatingly arranged with each other. Thus, the at least one baffle 54 of the first group of at least one baffle 54a can be alternatingly arranged with the at least one baffle 54 of the second group of the at least one baffle 54b. Further, the first ends of the first group of at least one baffle 54a can be disposed opposite the first ends of the second group of the at least one baffle 54b, for instance with respect to the longitudinal direction L. The second ends of the first group of at least one baffle 54a can be disposed opposite the second ends of the second group of the at least one baffle 54b, for instance with respect to the longitudinal direction L. Thus, adjacent ones of the gaps 57 that are adjacent each other with respect to the direction of the flow of the fluid 22 through the separation chamber 28 are spaced from each other along the longitudinal direction L, and are further offset from each other with respect to the lateral direction.

The at least one first end of the first group of at least one baffle 54a can extend from the first end 52a of the outer wall 52. The at least one gap 57 defined by the first group of at least one baffle 54a can be disposed proximate the second end 52b of the outer wall 52 that is opposite the first end 52a of the outer wall 52, for instance with respect to the longitudinal direction L. Thus, the at least one gap 57 defined by the first group of at least one baffle 54a can be disposed closer to the second end 52b of the outer wall 52 than the first end 52a of the outer wall 52. The at least one first end of the second group of at least one baffle 54b can extend from the second end 52b of the outer wall 52. Thus, the at least one gap 57 defined by the second group of at least one baffle 54b can be disposed proximate the first end 52a of the outer wall 52. Thus, the at least one gap 57 defined by the second group of at least one baffle 54b can be disposed closer to the first end 52a of the outer wall 52 than the second end 52b of the outer wall 52. It should be appreciated that the gaps 57 defined by the first and second groups of at least one baffle 54a and 54b can define a horizontally oriented serpentine flow path for the fluid 22 traveling from the inlet 29 to the outlet 31.

In one example, the at least one first end of each of the first group of at least one baffle 54a extends from the first end wall 58a. The at least one second end of each of the first group of at least one baffle 54b can be spaced from the second end wall 58b so as to define the respective at least one gap 57. The first end of each of the second group of at least one baffle 54b extends from the second end wall 58b. The second end of each of the second group of at least one baffle 54b can be spaced from the first end wall 58a so as to define the respective at least one gap 57.

The first group of at least one baffle 54a can extend from their respective first ends to their respective second ends in a first direction. The first direction can be oriented along the longitudinal direction L. The first end of each of the first group of the at least one baffle 54a extends from the outer wall 52. For instance, the first end of each of the first group of the at least one baffle 54a extends from the first end 52a of the outer wall 52. The second end of the first group of at least one baffle 54a can define the gap 57 as described above. Thus, in one example, the second end of the first group of at least one baffle 54a can be spaced from the outer wall 52. Each of the second group of at least one baffle 54b can extend from its respective first end to its respective second end along a second direction that is angularly offset from the first direction. For instance, the second direction can be opposite the first direction. Thus, the second direction can be oriented along the longitudinal direction L. The first end of each of the second group of at least one baffle 54b extends from the outer wall. For instance, the first end of each of the second group of the at least one baffle 54b extends from the second end 52b of the outer wall 52. The second end of each of the second group of at least one baffle 54b can define a respective gap 57 as described above. Thus, in one example, the second end of each of the second group of at least one baffle 54b can be spaced from the outer wall 52.

The first side wall 60a can cooperate with a first laterally outermost one of the baffles 54 so as to define a respective first one of the fluid flow channels 56. The first one of the fluid flow channels 56 can be an upstream-most one of the fluid flow channels 56 with respect to the flow of the fluid 22 through the separation chamber 28. Similarly, the second side wall 60b can cooperate with a second laterally outermost one of the baffles 54 so as to define a respective second one of the fluid flow channels 56. The second one of the fluid flow channels 56 can be a downstream-most one of the fluid flow channels 56 with respect to the flow of the fluid 22 through the separation chamber 28. The baffles 54 can cooperate with one another so as to define one or more fluid flow channels 56 between the upstream-most one of the fluid flow channels 56 and the downstream-most one of the fluid flow channels 56 with respect to the flow of the fluid 22 through the separation chamber 28. The fluid flow channels 56 defined between the upstream-most one of the fluid flow channels 56 and the downstream-most one of the fluid flow channels 56 can be referred to as inner fluid flow channels 56.

During operation, the fluid 22 enters the inlet 29 of the fluid flow separation chamber 28. The fluid 22 then travels sequentially through the upstream-most one of the fluid flow channels 56, the inner fluid flow channels, and the downstream-most one of the fluid flow channels 56 along a serpentine flow path between the inlet 29 and the outlet 31. For instance, the fluid 22 can travel alternatingly in the first direction through respective first ones of the fluid flow channels 56, and in the second direction through respective second ones of the fluid flow channels 56. In one example, the fluid 22 can travel in the first direction through the upstream-most channel 56, in the second direction through the inner channel 56, and in the first direction through the downstream-most channel 56. The first and second directions can be oriented substantially along the longitudinal direction L, taking into account variations in the fluid flow through the fluid flow channels 56.

The fluid 22 can travel along the lateral direction A through the gaps 57 between the adjacent fluid flow channels 56. Further, the flow of the fluid 22 through the downstream-most channel 56 can be restricted by the flow-restricting wall 55. The fluid 22 then exits the fluid flow separation chamber 28 out the outlet 31. The fluid flow separation chamber 28 is configured to cause the fluid 22 to flow through the fluid flow channels 56 at a flow rate that is less than the flow rate through the inlet conduit 30. For instance, adjacent ones of the baffles 54 can be spaced a first distance along the lateral direction A, and the inlet 29 defines a cross-sectional dimension D along the lateral direction A, such that the first distance is greater than the cross-sectional dimension D. Further, the outlet 31 can define a cross-sectional area that is greater than or substantially equal to the cross-sectional area of the inlet 29. Designing the cross-sectional area of the outlet 31 to be greater than the cross-sectional area of the inlet 29 can reduce the risk of the fluid flow separation chamber 28 overflowing. Alternatively or additionally, the height of the baffles 54 from the base 50 to the upper ends of the baffles 54 can be spaced a distance that is greater than the cross-sectional dimension of the inlet 29. Accordingly, a cross-sectional area of the fluid 22 along a plane defined by the transverse direction T and the lateral direction A in the fluid flow channels 56 is greater than the cross-sectional area of the fluid 22 in the inlet conduit 30.

Referring now more specifically to the embodiment in FIGS. 14A-14B, the first group of at least one baffle 54a and the second group of at least one baffle 54b can be aligned with each other along the lateral direction A. Thus, the at least one baffle 54 of the first group of at least one baffle 54a can be aligned with the at least one baffle 54 of the second group of at least one baffle 54b. For example, the first ends of each of the first group of at least one baffle 54a can be aligned with the first ends of the second group of the at least one baffle 54b, for instance with respect to the lateral direction A. Further, the second ends of the first group of at least one baffle 54a can be aligned with the second ends of the second group of the at least one baffle 54b, for instance with respect to the lateral direction A. Note that, in alternative examples, the second ends of the first group of at least one baffle 54a may be out of alignment with the second ends of the second group of the at least one baffle 54b, for instance with respect to the lateral direction A.

The first end each baffle 54a of the first group can extend from the first end 52a of the outer wall 52. Each baffle 54a of the first group can define at least one gap 57 that is disposed proximate the second end 52b of the outer wall 52 that is opposite the first end 52a of the outer wall 52, for instance with respect to the longitudinal direction L. Thus, each gap 57 defined by the first group of at least one baffle 54a can be disposed closer to the second end 52b of the outer wall 52 than the first end 52a of the outer wall 52. Similarly, the first end of each baffle 54b of the second group can extend from the first end 52a of the outer wall 52. Each baffle 54b of the second group can define at least one gap 57 that is disposed proximate the second end 52b of the outer wall 52. Thus, each gap 57 defined by the second group of at least one baffle 54b can be disposed closer to the second end 52b of the outer wall 52 than the first end 52a of the outer wall 52. As shown, adjacent ones of the gaps 57 can be aligned with each other along the lateral direction A. It should be appreciated that the gaps 57 defined by the first and second groups of at least one baffle 54a and 54b can define a horizontally oriented flow path for the fluid 22 traveling from the inlet 29 to the outlet 31.

In one example as shown in FIGS. 14A-14B, the first end of each baffle 54a of the first group can extend from the first end wall 58a. Further, the at least one second end of each baffle 54a of the first group can be spaced from the second end wall 58b so as to define the respective at least one gap 57. Similarly, the first end of each baffle 54b of the second group can extend from the first end wall 58a, and the second end of each baffle 54b of the second group can be spaced from the second end wall 58b so as to define the respective at least one gap 57. Each baffle 54a of the first group can extend from their respective first ends to their respective second ends in a first direction. The first direction can be oriented along the longitudinal direction L. Similarly, each baffle 54b of the second group can extend from its respective first end to its respective second end along the first direction.

The first side wall 60a can cooperate with a first laterally outermost one of the baffles 54 so as to define a respective first one of the fluid flow channels 56. The first one of the fluid flow channels 56 can be an upstream-most one of the fluid flow channels 56 with respect to the flow of the fluid 22 through the separation chamber 28. Similarly, the second side wall 60b can cooperate with a second laterally outermost one of the baffles 54 so as to define a respective second one of the fluid flow channels 56. The second one of the fluid flow channels 56 can be a downstream-most one of the fluid flow channels 56 with respect to the flow of the fluid 22 through the separation chamber 28.

The baffles 54 can cooperate with one another so as to define at least one flow-settling compartment 65. It will be understood that, in some examples, the fluid flow separation chamber 28 can define a plurality of flow-settling compartments, and that at least a portion of the following description can pertain to each of the flow-settling compartments. For example, the flow-settling compartment 65 can be disposed between the baffle or baffles 54a of the first group and the baffle or baffles 54b of the second group. The flow-settling compartment 65 can be defined between the upstream-most one of the fluid flow channels 56 and the downstream-most one of the fluid flow channels 56. The flow-settling compartment 65 is at least partially defined between adjacent ones of the fluid flow channels 56 and the outer wall 52. For example, the flow-settling compartment 65 can be at least partially defined between adjacent ones of the fluid flow channels 56 and the first end 52a of outer wall 52, such as by the first end wall 58a. The flow-settling compartment 65 has a first end 65a, and a second end 65b offset from the first end 65a along the longitudinal direction L. The first end 65a is closed at the first end 52 of the outer wall 52. Further, the second end 65b is open to the fluid flow channels 56 at a location that is closer to the second end 52b of the outer wall 52 than the first end 52a of the outer wall 52. Thus, the second end 65b of the flow-settling compartment 65 is open to and in fluid communication with the fluid flow channels 56. As such, the fluid 22 can flow into and out of the flow-settling compartment 65 through the same end or opening of the flow-settling compartment 65.

During operation, the fluid 22 enters the inlet 29 of the fluid flow separation chamber 28. The fluid 22 then travels through the upstream-most one of the fluid flow channels 56 towards the flow-settling compartment 65 and the downstream-most one of the fluid flow channels 56. The cross-sectional area of the flow-settling compartment 65 is greater than that of the inlet 29. As a result, the flow of the fluid 22 can slow as the flow-settling compartment 65 fills with the fluid 22. Further, as the flow-settling compartment 65 fills with the fluid 22, the fluid 22 in the flow-settling compartment 65 slows the flow of the fluid 22 from the upstream-most one of the fluid flow channels 56 to the downstream-most one of the fluid flow channels 56. In one example, the fluid 22 can travel in the first direction through the upstream-most channel 56, in the second direction into the flow-settling compartment 65, in the first direction out of the flow-settling compartment 65, and in the second direction through the downstream-most channel 56. The first and second directions can be oriented substantially along the longitudinal direction L, taking into account variations in the fluid flow through the fluid flow channels 56.

The fluid 22 can travel along the lateral direction A through the gaps 57 between the adjacent fluid flow channels 56. Further, the fluid 22 can also travel along the lateral direction A from the upstream-most channel 56 to the downstream-most channel 56. In such a case, the fluid 22 in the flow-settling compartment 65 can slow the flow of the fluid 22 from the upstream-most channel 56 to the downstream-most channel 56. As described above, the flow of the fluid 22 through the downstream-most channel 56 can be restricted by the flow-restricting wall 55. The fluid 22 then exits the fluid flow separation chamber 28 out the outlet 31.

The fluid flow separation chamber 28 is configured to cause the fluid 22 to flow through the fluid flow channels 56 at a flow rate that is less than the flow rate through the inlet conduit 30. For instance, adjacent ones of the baffles 54 can be spaced a first distance along the lateral direction A, and the inlet 29 defines a cross-sectional dimension D along the lateral direction A, such that the first distance is greater than the cross-sectional dimension D. Further, the outlet 31 can define a cross-sectional area that is greater than or substantially equal to the cross-sectional area of the inlet 29. Alternatively or additionally, the height of the baffles 54 from the base 50 to the upper ends of the baffles 54 can be spaced a distance that is greater than the cross-sectional dimension of the inlet 29. Accordingly, a cross-sectional area of the fluid 22 along a plane defined by the transverse direction T and the lateral direction A in the fluid flow channels 56 is greater than the cross-sectional area of the fluid 22 in the inlet conduit 30.

Figure 15A:
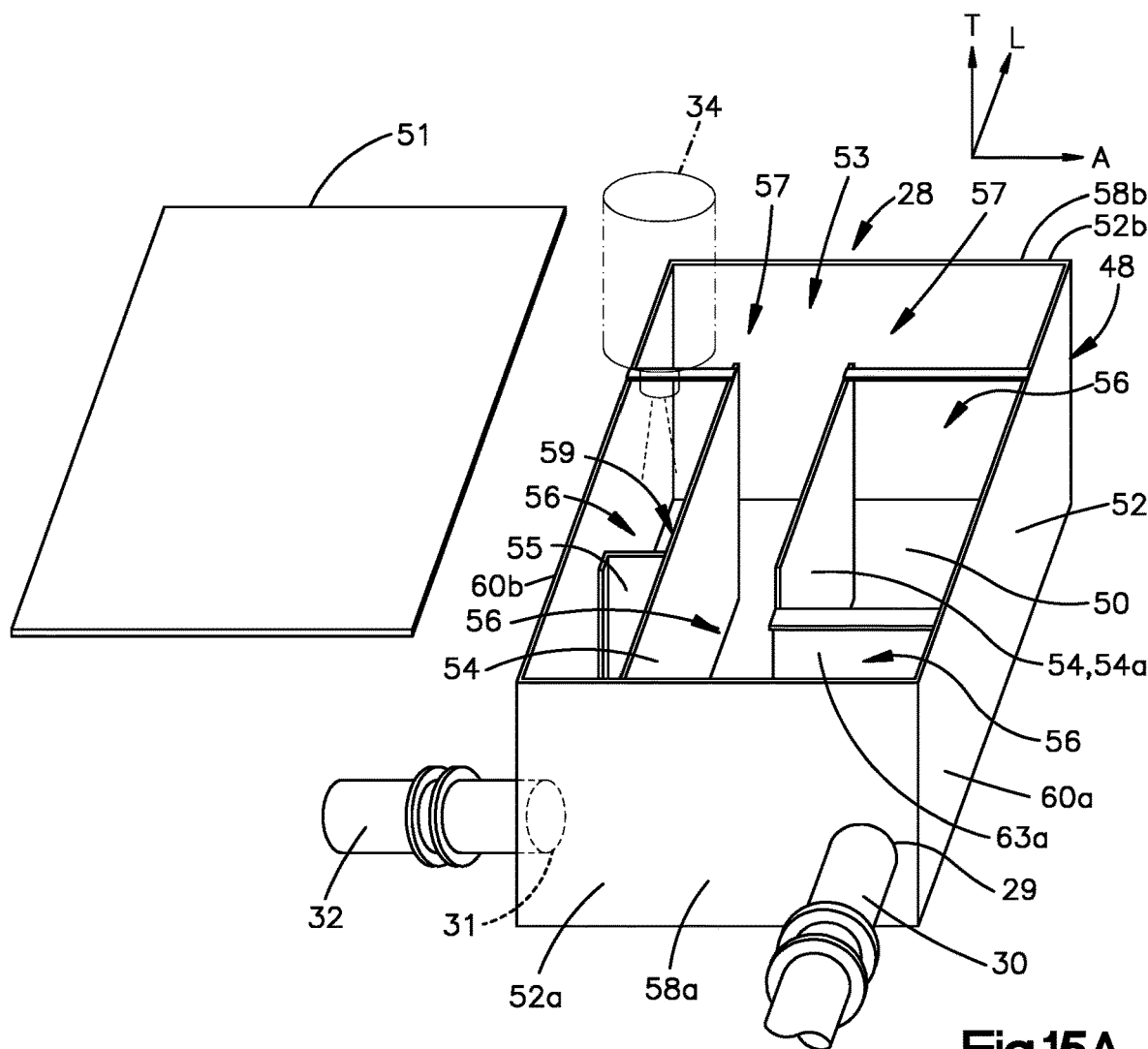
FIG. 15A is an exploded perspective view of a fluid flow separation chamber of the monitoring system illustrated in FIG. 4, constructed in accordance with yet still another embodiment.
Figure 15B:
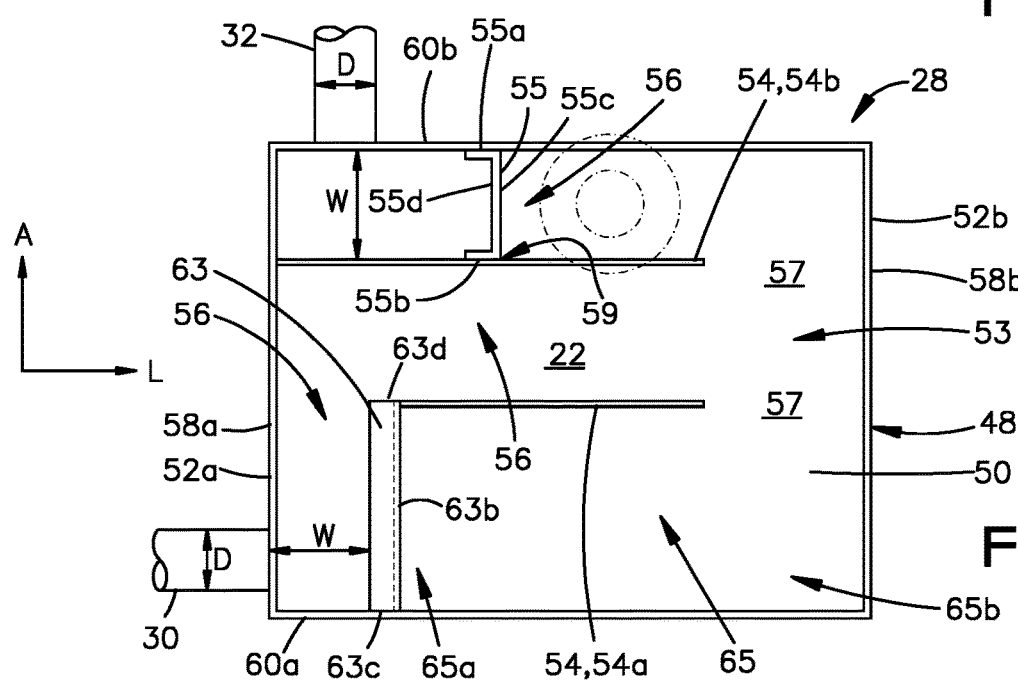
FIG. 15B is a top plan view of the fluid flow separation chamber illustrated in FIG. 15A.
Figure 16:
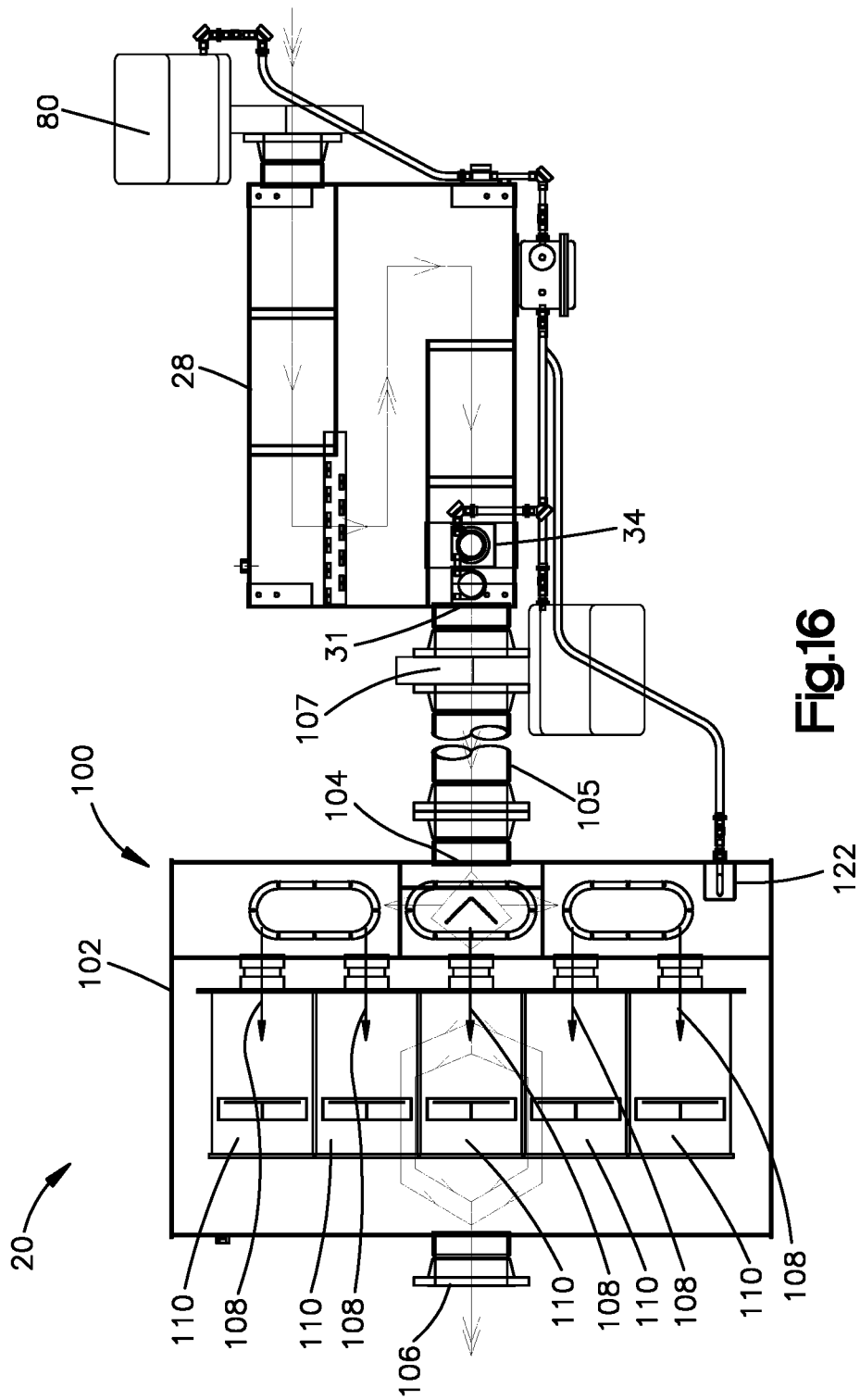
FIG. 16 is a top plan view of a monitoring system constructed in accordance with one example.

Referring now more specifically to the embodiment in FIGS. 15A-15B, the chamber body 48, and thus the fluid flow separation chamber 28, can include at least one flow-diverting wall 63. It will be understood that, in some examples, the fluid flow separation chamber 28 can include a plurality of flow-diverting walls, and that at least a portion of the following description can pertain to each of the flow-diverting walls. The flow-diverting wall 63 can receive the flow of the fluid 22 along one direction, and divert the flow along a different direction. Further, the flow-diverting wall 63 can slow the flow of the fluid into at least one of the channels 56. The flow-diverting wall 63 can extend up from the base 50. For instance, the flow-diverting wall 63 can extend up from the base 50 along the transverse direction T. The flow-diverting wall 63 can have a height along the transverse direction that is less than or equal to a height of the outer wall 52.

The flow-diverting wall 63 can be opposite the inlet 29, and can thus be considered to be an inlet flow-diverting wall 63. For example, the flow-diverting wall 63 can include a first side 63a, and a second side 63b opposite the first side 63a. The first side 63a can face the inlet 29. The first side 63a can be angularly offset with respect to the direction of the flow of the fluid 22 through the inlet 29. For example, the first side 63a can be perpendicular to the direction of the flow of the fluid 22 through the inlet 29. Further, in at least one example, the first side 63a can be parallel to the cross-section of the inlet 29. In one example, the flow-diverting wall 63 can also include a portion at its upper end that extends from the first side 63a along the longitudinal direction L, such as towards the inlet 29. The portion can face the base 50 and can limit the flow of the fluid 22 passing over the flow-diverting wall 63. The flow-diverting wall 63 can be made of any suitable material as desired. In one example, the flow-diverting wall 63 can be metallic.

The flow-diverting wall 63 can define a first end 63c and a second end 63d offset from the first end 63c. The first end 63c of the flow-diverting wall 63 can extend from one of a baffle 54 and the outer wall 52. Thus, the first end 63c of the flow-diverting wall 63 can be attached to the one of the baffle 54 and the outer wall 52 so as to prevent the fluid 22 from passing between the first end 63c and the one of the baffle 54 and the outer wall 52. Similarly, the second end 63d of each flow-diverting wall 63 can extend from one of a baffle 54 and the outer wall 52, different from the one of the baffle 54 and the outer wall 52 from which the first end extends. Thus, the second end 63d of the flow-diverting wall 63 can be attached to the one of the baffle 54 and the outer wall 52 so as to prevent the fluid 22 from passing between the second end 63d and the one of the baffle 54 and the outer wall 52. In one example as shown in FIGS. 15A-15B, the first end 63c of the flow-diverting wall 63 extends from the outer wall 52, such as from the first side wall 60a. Further, the second end 63d of the flow-diverting wall 63 extends from one of the baffles 54.

The flow-diverting wall 63 cooperates with the outer wall 52 so as to define a respective first fluid flow channel 56. In particular, the flow-diverting wall 63 is spaced from the outer wall 52 to define the first fluid flow channel 56 between the flow-diverting wall 63 and the outer wall 52. For example, the flow-diverting wall 63 can be spaced from the first end 52a of the outer wall 52, and more particularly, from the first end wall 58a of the outer wall 52. The first fluid flow channel 56 can be an upstream-most one of the fluid flow channels 56 with respect to the flow of the fluid 22 through the separation chamber 28. The flow-diverting wall 63 and the outer wall 52 direct the flow of the fluid 22 along the lateral direction A.

The first end of each baffle 54a of the first group of at least one baffle can extend from the second end of the flow-diverting wall 63. Each baffle 54a of the first group can define at least one gap 57 that is disposed proximate the second end 52b of the outer wall 52 that is opposite the first end 52a of the outer wall 52, for instance with respect to the longitudinal direction L. Thus, each gap 57 defined by the first group of at least one baffle 54a can be disposed closer to the second end 52b of the outer wall 52 than the first end 52a of the outer wall 52. Further, the first end of each baffle 54b of the second group can extend from the first end 52a of the outer wall 52. Similarly, each baffle 54b of the second group can define at least one gap 57 that is disposed proximate the second end 52b of the outer wall 52. Thus, each gap 57 defined by the second group of at least one baffle 54b can be disposed closer to the second end 52b of the outer wall 52 than the first end 52a of the outer wall 52. As shown, adjacent ones of the gaps 57 can be aligned with each other along the lateral direction A. It should be appreciated that the gaps 57 defined by the first and second groups of at least one baffle 54a and 54b can define a horizontally oriented flow path for the fluid 22 traveling from the inlet 29 to the outlet 31.

In one example as shown in FIGS. 15A-15B, the at least one second end of each baffle 54a of the first group can be spaced from the second end wall 58b so as to define the respective at least one gap 57. Similarly, the second end of each baffle 54b of the second group can be spaced from the second end wall 58b so as to define the respective at least one gap 57. Each baffle 54a of the first group can extend from their respective first ends to their respective second ends in a first direction. The first direction can be oriented along the longitudinal direction L. Similarly, each baffle 54b of the second group can extend from its respective first end to its respective second end along the first direction.

The outer wall 52 can cooperate with the baffles 54 so as to define a flow-settling compartment 65. Thus, the outer wall 52 and the baffles 54 can at least partially define the flow-settling compartment 65. For example, the first side wall 60a of the outer wall 52 can cooperate with a first laterally outermost one of the baffles 54 so as to define the flow-settling compartment 65 between the outermost one of the baffles 54 and first side wall 60a. Further, the outer wall 52 can cooperate with the flow-diverting wall 63 so as to define the flow-settling compartment 65. Thus, the outer wall 52 and the flow-diverting wall 63 can at least partially define the flow-settling compartment. For example, the second end wall 58b of the outer wall 52 can cooperate with the flow-diverting wall 63 so as to define the flow-settling compartment 65 between the second end wall 58b and the flow-diverting wall 63.

The flow-settling compartment 65 has a first end 65a, and a second end 65b offset from the first end 65a along the longitudinal direction L. The first end 65a is closed at the flow-diverting wall 63. Further, the second end 65b is open to the fluid flow channels 56 at a location that is closer to the second end 52b of the outer wall 52 than the first end 52a of the outer wall 52. Thus, the second end 65b of the flow-settling compartment 65 is open to and in fluid communication with the fluid flow channels 56. As such, the fluid 22 can flow into and out of the flow-settling compartment 65 through the same end or opening of the flow-settling compartment 65.

The second side wall 60b can cooperate with a second laterally outermost one of the baffles 54 so as to define a respective second one of the fluid flow channels 56. The second one of the fluid flow channels 56 can be a downstream-most one of the fluid flow channels 56 with respect to the flow of the fluid 22 through the separation chamber 28. The baffles 54 can cooperate with one another so as to define one or more fluid flow channels 56 between the upstream-most one of the fluid flow channels 56 and the downstream-most one of the fluid flow channels 56 with respect to the flow of the fluid 22 through the separation chamber 28. The fluid flow channels 56 defined between the upstream-most one of the fluid flow channels 56 and the downstream-most one of the fluid flow channels 56 can be referred to as inner fluid flow channels 56.

During operation, the fluid 22 enters the inlet 29 of the fluid flow separation chamber 28. The fluid 22 then travels sequentially through the upstream-most one of the fluid flow channels 56, the inner fluid flow channels 56, and the downstream-most one of the fluid flow channels 56 along a flow path between the inlet 29 and the outlet 31. In addition, the fluid 22 can also travel along the lateral direction A through the gap 57 between the inner fluid flow channel 56 and the flow-settling compartment 65 and through the gap 57 between the inner fluid flow channel 56 and the downstream-most fluid flow channel 56. The first and second directions can be oriented substantially along the longitudinal direction L, taking into account variations in the fluid flow through the fluid flow channels 56.

In one example, the fluid 22 enters the inlet 29 of the fluid flow separation chamber 28 along the first direction. The flow-diverting wall 60 diverts the flow from the first direction to the lateral direction A. The fluid 22 travels in the lateral direction A through the upstream-most channel 56 to the inner channel 56. The fluid 22 then travels in the first direction through the inner channel 56. Next, portions of the fluid 22 can travel in the lateral direction A through the gaps 57 to both the downstream-most channel 56 and the flow-settling compartment 65. In the flow-settling compartment 65, the fluid 22 can travel in the second direction into the flow-settling compartment 65, and in the first direction out of the flow-settling compartment 65. The first and second directions can be oriented substantially along the longitudinal direction L, taking into account variations in the fluid flow through the fluid flow channels 56.

The cross-sectional area of the flow-settling compartment 65 can be greater than that of the inlet 29. As a result, the flow of the fluid 22 can slow as the flow-settling compartment 65 fills with the fluid 22. Further, as the flow-settling compartment 65 fills with the fluid 22, the fluid 22 in the flow-settling compartment 65 causes the flow of the fluid 22 from the inner fluid flow channel 56 to the downstream-most one of the fluid flow channels 56 to slow. In the downstream-most channel 56, the fluid 22 travels in the second direction to the outlet 31. The fluid 22 then exits the fluid flow separation chamber 28 out the outlet 31. As described above, the flow of the fluid 22 through the downstream-most channel 56 can be restricted by the flow-restricting wall 55.

The fluid flow separation chamber 28 is configured to cause the fluid 22 to flow through the fluid flow channels 56 at a flow rate that is less than the flow rate through the inlet conduit 30. For instance, each channel 56 defines a width W along a horizontal direction that is perpendicular to the direction of flow through the channel, and the inlet 29 defines a cross-sectional dimension D along the lateral direction A, such that each width W is greater than the cross-sectional dimension D. Further, the outlet 31 can define a cross-sectional area that is greater than or substantially equal to the cross-sectional area of the inlet 29. Alternatively or additionally, the height of the baffles 54 from the base 50 to the upper ends of the baffles 54 can be spaced a distance that is greater than the cross-sectional dimension of the inlet 29. Accordingly, a cross-sectional area of the fluid 22 along a plane that is perpendicular to the direction of fluid flow through the fluid flow channels 56 is greater than the cross-sectional area of the fluid 22 in the inlet conduit 30.

Referring again generally to FIGS. 5A-5B and 13A-15B, the separation chamber 28 includes one or more flow-restricting features that can cause the flow rate of the fluid 22 to decrease with respect to the flow rate of the fluid 22 through the inlet conduit 30, such that separation chamber 28 causes the flow of the fluid 22 to become laminar. As a result, hydrocarbons present in the fluid 22 will rise to the upper surface of the fluid 22 in the chamber 28 between the inlet 29 and the outlet 31. Accordingly, the hydrocarbon sensor 34 can reliably detect the hydrocarbons in the fluid 22.

The one or more flow-restricting features can include a plurality of channels 56 that cooperate with one another to disrupt the flow rate of the fluid 22 received at the inlet 29 by changing the direction of the flow of the fluid 22 within the chamber 28. The one or more flow-restricting features can additionally or alternatively include at least one channel 56 having a cross-sectional area that is greater than a cross-sectional area of the inlet 29, where the cross-sectional area of each channel 56 is perpendicular to the flow of the fluid 22 in the respective channel and the cross-sectional area of the inlet 29 is perpendicular to the flow of the fluid through the inlet 29. The one or more flow-restricting features can additionally or alternatively include at least one flow-restricting wall 55 that limits the flow of the fluid 22 through a respective channel 56 so as to slow the flow of the fluid 22 through the channel 56. The one or more flow-restricting features can additionally or alternatively include at least one flow-diverting wall 63 that can receive the flow of the fluid 22 along one direction, and divert an entirety of the flow along a different direction so as to slow the flow of the fluid into at least one of the channels 56. The one or more flow-restricting features can additionally or alternatively include at least one flow-settling compartment 65 that fills with the fluid 22 and slows the flow of the fluid 22 between the fluid flow channels 56.

In one example, the hydrocarbon sensor 34 is configured to output a signal in response to a detection of the threshold amount of hydrocarbons in the fluid 22 that travels through the fluid flow separation chamber 28 along a direction from the inlet 29 to the outlet 31. The sensor 34 can be supported by the separation chamber 28 or alternative suitable structure, such that the sensor 34 is positioned to detect a threshold amount of hydrocarbons in the fluid 22 at a location adjacent the outlet 31 of the separation chamber 28. The threshold amount can be an amount sufficient to cause a sheen at the upper surface of the fluid 22. Thus, the sensor 34 can be configured to detect hydrocarbons at the upper surface of the fluid 22. For instance, the sensor 45 can be positioned such that it detects hydrocarbons at the upper surface of the fluid 22 while the fluid is in the separation chamber 28. Thus, in one example, the location adjacent the outlet 31 is inside the fluid flow separation chamber 28. It should be appreciated that the sensor 34 can be configured to detect petroleum at any suitable location of the separation chamber 28 where it is expected that the hydrocarbons will be present at the upper surface of the fluid 22. The sensor 34 can be mounted to the chamber body 48, such as the outer wall 52. It should be appreciated, of course, that the hydrocarbon sensor 34 can be mounted to any suitable alternative structure such that the sensor 34 is in operable communication with the fluid 22 so as to sense the threshold amount of petroleum in the fluid 22. For instance, it is envisioned that in certain examples the sensor can be positioned so as to detect the presence of hydrocarbons in the fluid 22 at a location downstream from the outlet 31.

As described above, and referring to FIG. 7, the hydrocarbon sensor 34 is configured to output a signal in response to a detection of the threshold amount of hydrocarbons in the fluid 22. The signal can be transmitted over a hard wire, or wirelessly as desired. The signal can be received by a processor, or the hydrocarbon sensor 34 can include a processor, that receives the signal and, in response to the signal, sends command signals to one or more peripheral devices, for instance to close a valve that halts the flow of the fluid 22 through the separation chamber 28 as described in more detail below. The command signals can be communicated over a hard wire, or wirelessly as desired. Alternatively, the peripheral devices can include a processor that receives the signal directly from the hydrocarbon sensor 34 and, in response to the signal, activates an alarm condition. For instance, the peripheral devices can include at least one audio alarm 62, at least one visual alarm 64, and at least one remote transmitter 66 configured to transmit a remote alarm. The audio alarm 62 can be disposed local to the separation chamber 28. Alternatively, the audio alarm 62 can be located remote from the separation chamber 28, for instance in a control room.

The audio alarm 62 is configured to emit an audible signal in response to the detection of the threshold amount of petroleum as sensed by the hydrocarbon sensor 34. Similarly, the visual alarm 64 can be disposed local to the separation chamber 28. Alternatively, the visual alarm 64 can be located remote from the separation chamber 28, for instance in the control room. The visual alarm 64 is configured to emit a visible alarm in response to the detection of the threshold amount of petroleum as sensed by the hydrocarbon sensor 34. The at least one remote transmitter 66 can likewise be disposed local to the separation chamber 28. Alternatively, the at least one remote transmitter 66 can be located remote from the separation chamber 28, for instance in a control room. The remote transmitter 66 can be configured to send an alarm signal to a remote location. For instance, the remote transmitter 66 can initiate and send a message, such as a text message, email, phone call, or the like, to a user indicating the alarm condition. Alternatively or additionally, the remote transmitter 66 can update a webpage or other communications medium for detection by a user. Alternatively, the system 20 can include a web-browser application that allows a remote user to monitor the status of one or more separation chambers 28 disposed at various locations, and operate the system 20 remotely as desired.

It is further recognized that diagnostic output can be sent to the remote user advising the user of the status of the sensor 34. For instance, when the sensor 34 outputs a first signal having a first value, such as a first range of millivolts, a diagnostic unit coupled to the sensor 34 can conclude that the sensor 34 is in a fault condition, and needs to be serviced. When the sensor 34 outputs a first signal having a second value different than the first value, such as a second range of millivolts, the diagnostic unit concludes that the sensor 34 is operating normally without sensing hydrocarbons. When the sensor 34 outputs a third signal having a third value different than both the first and second values, such as a third range of millivolts, the diagnostic unit concludes that the sensor 34 is operating normally and has sensed the presence of hydrocarbons. The second value can be greater than the first value, and the third value can be greater than each of the first and second values.

Figure 6A:
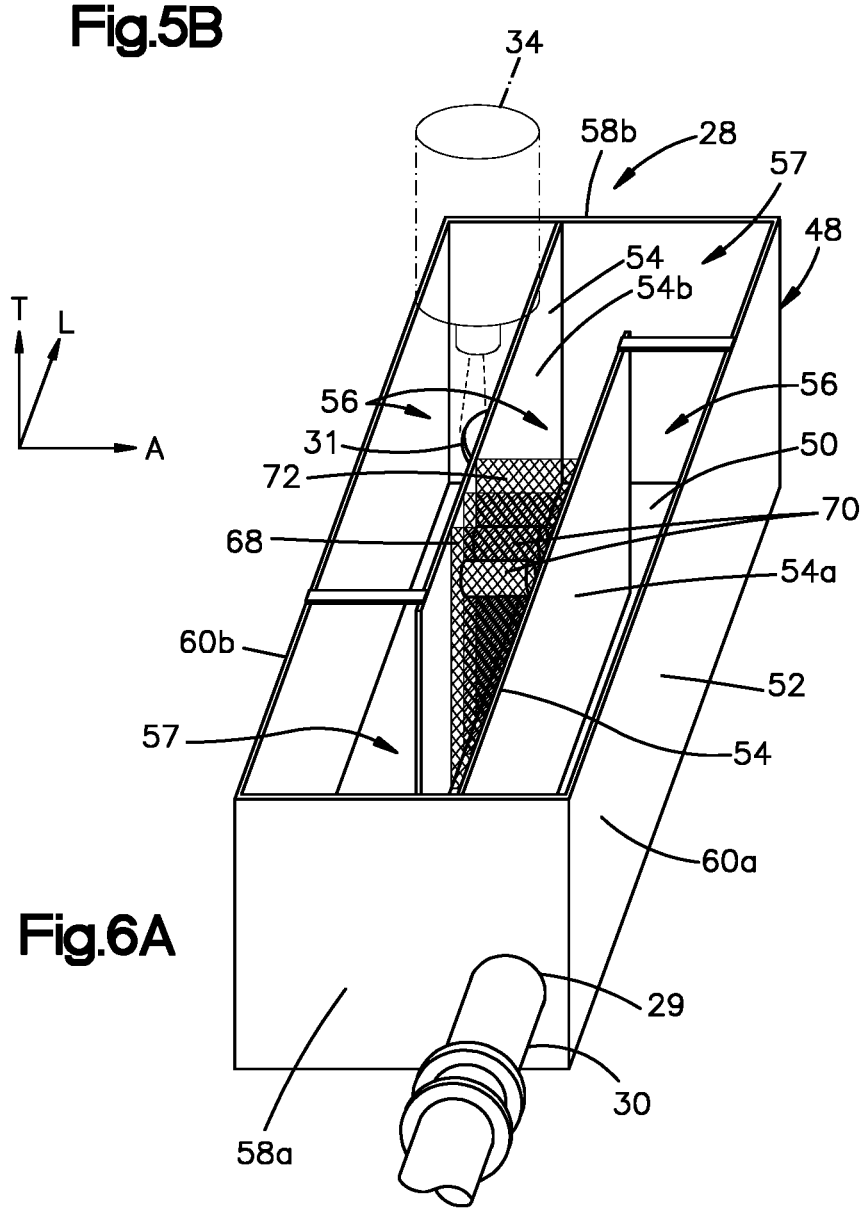
FIG. 6A is a perspective view of a fluid flow separation chamber similar to the fluid flow separation chamber illustrated in FIG. 5A, but including an absorbent member in accordance with an alternative embodiment.

Referring now to FIG. 6A, it is envisioned that in some situations during use, the petroleum storage tank 26 may allow petroleum to enter the fluid 22 at a minimal rate, such that only a trace amount of hydrocarbons are present in the fluid 22. Accordingly, the monitoring system 20 can include at least one oil-absorbent media 68 that is positioned in at least one of the fluid flow channels 56, such that at least a portion of the fluid 22 passes through the oil-absorbent media 68. It will be noted that each of the embodiments of FIGS. 5A-5B and 13A-15B can include the at least one oil-absorbent media 68 that is positioned in at least one of the fluid flow channels 56 and configured as provided herein. If the fluid 22 passing through the oil-absorbent media 68 contains petroleum or other hydrocarbons, the oil-absorbent media 68 can absorb some up to all of the hydrocarbons in the fluid 22 prior to the fluid 22 traveling past the sensor 34. Accordingly, hydrocarbons that may have been present in the fluid 22 in a sufficient quantity to cause the sensor 34 to detect an alarm condition can be absorbed by the media 68 in sufficient quantity that allows the fluid 22 to flow past the sensor 22 without detection of hydrocarbons in sufficient quantity that causes the alarm condition.

In one example, the separation chamber 28 can include at least one or more absorptive members 70 that comprises the absorptive media 68. It will be noted that each of the embodiments of FIGS. 5A-5B and 13A-15B can include the at least one or more absorptive member 70 that is positioned and configured as provided herein. In particular, the oil-absorbent media can be supported in at least one of the fluid flow channels 56. For instance, the oil-absorbent media 68 can be supported by at least one of the base 50, the outer wall 52, and at least one of the baffles 54. The oil-absorbent media 68 can be disposed at a location such that the oil-absorbent media 68 is positioned to remove the petroleum from the fluid 22. In one example, the oil-absorbent media 68 can be hydrophobic. For instance, the oil-absorbent media 68 be configured as any suitable material commercially available from Miller Waste Mills, Inc. having a place of business in Winona, Minn. Alternatively, the oil-absorbent media 68 can be commercially available from Phase III, Inc., having a principle place of business in Chandler, Ariz. Alternatively still, the oil-absorbent media 68 can be commercially available from Universal Remediation, Inc., having a place of business in Pittsburgh, Pa. Visual inspection of the oil-absorbent media 68 can allow a user to assess whether petroleum is being introduced into the fluid 22 even though the sensor 34 is not detecting the threshold amount of petroleum in the fluid 22 sufficient to indicate an alarm condition. Thus, the user can replace or clean the oil-absorbent media 68, and can proactively take steps to address the source of petroleum ingress into the fluid 22.

As described above, it is recognized that the separation chamber 28 can be configured to cause hydrocarbons in the fluid 22 to rise to the upper surface of the fluid 22 to create a sheen as the fluid 22 travels through the separation chamber 28. Accordingly, the oil-absorbent media 68 can be positioned such that the upper surface of the fluid 22 flowing through the separation chamber 28 is aligned with a portion of the absorptive media 68. Thus, the oil-absorbent media 68 can define at least a location that is spaced up from the base 50. For instance, the oil-absorbent media 68 can be movably supported at an upper end of the chamber body 48 in one of the fluid flow channels 56 such that the flow of the fluid 22 through the one of the fluid flow channels 56 can cause the oil-absorbent media 68 to rise to the upper surface of the fluid 22 as the fluid 22 travels past the oil-absorbent media 68. For instance, the monitoring system 20 can include at least one cage 72 that each contains at least one the oil-absorbent member 70 that is made of the oil-absorbent media 68. The oil-absorbent member 70 can be cylindrical in shape or can define any alternative suitable shape as desired. The petroleum absorbent member 70 can, for instance, be positioned so as to extend between and from adjacent ones of the baffles 54, or an outermost one of the baffles 54 and the outer wall 52. The cage 72 is fluid-permeable, such that the cage 72 allows the fluid 22 to flow therethrough between the inlet 29 and the outlet 31 of the separation chamber 28. The cage 72 can be pivotally attached to the chamber body 48 or the upper wall 51, such that the cage 72, and thus the contained oil-absorbent media 68, rides along the upper surface of the fluid 22 as the fluid 22 travels through the separation chamber 28. The separation chamber 28 can include a plurality (e.g., more than one) cage 72, disposed in series with respect to the flow of the fluid 22 through the separation chamber 28. Thus, one of the oil-absorbent members 70 can be disposed downstream of another one of the oil-absorbent members. When the absorbent members 70 have become saturated with petroleum, the saturated absorbent members 70 can be replaced with new absorbent members 70. For instance, the cage 72 can be opened, the saturated absorbent members 70 can be removed, new absorbent members 70 can be inserted into the cage 72, and the cage 72 can be closed.

Figure 6B:
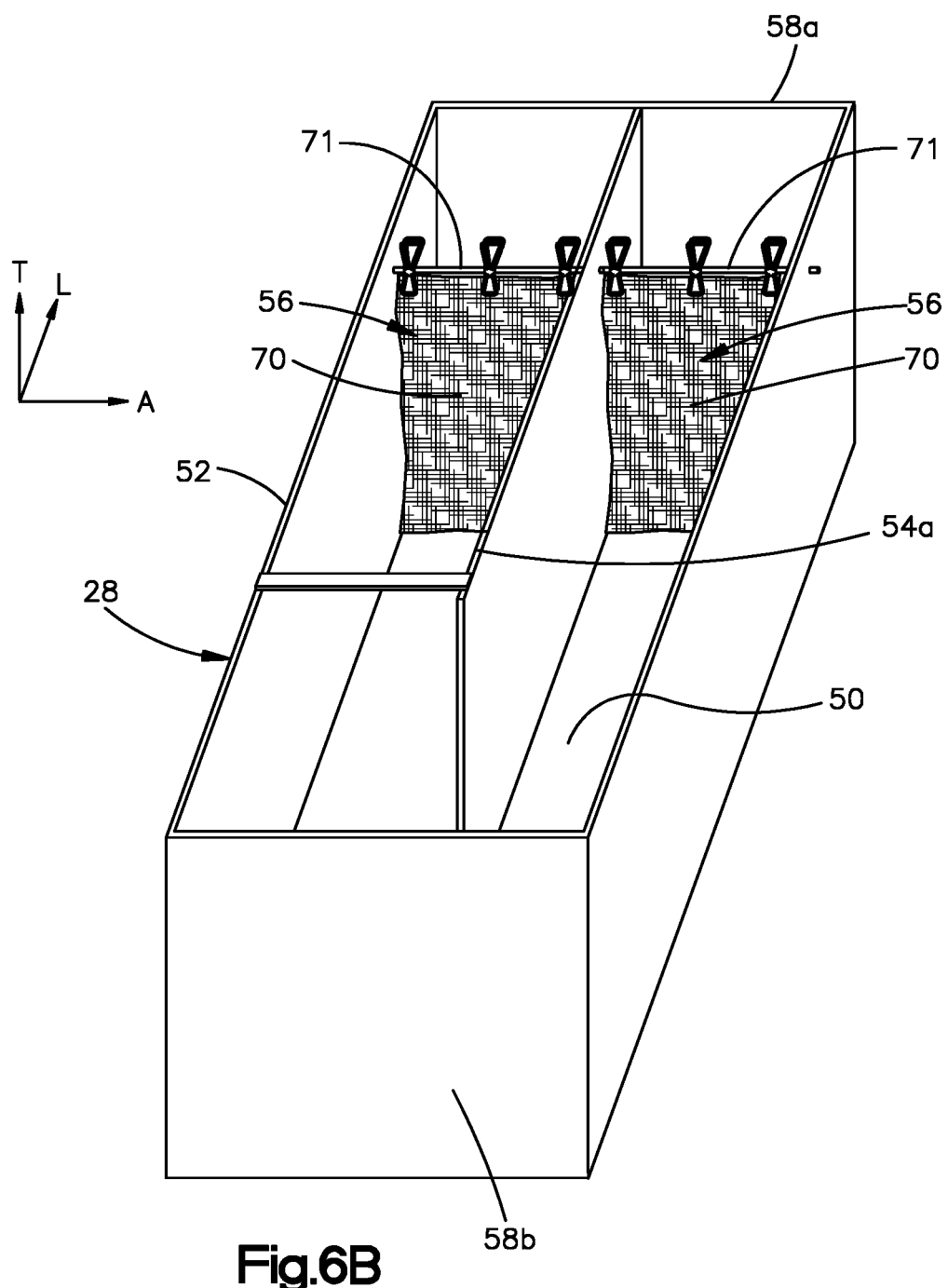
FIG. 6B is a perspective view of a fluid flow separation chamber similar to the fluid flow separation chamber illustrated in FIG. 6A, but including an absorbent member in accordance with another alternative embodiment.

Alternatively, as illustrated in FIG. 6B, which illustrates a portion of the fluid flow separation chamber 28, the petroleum absorbent member 70 can be pivotally attached to a pivot member 71 that is in turn pivotally attached to the chamber body 48. For instance, the pivot member 71 can be a rod that extends through apertures in the separation chamber walls, and thus is rotatably in the walls. The petroleum absorbent member 70 can be attached to the pivot member at its upper end, such that the petroleum absorbent member 70 is configured to ride along the upper surface of the fluid in the manner described above with respect to FIG. 6A.

Figure 8A:
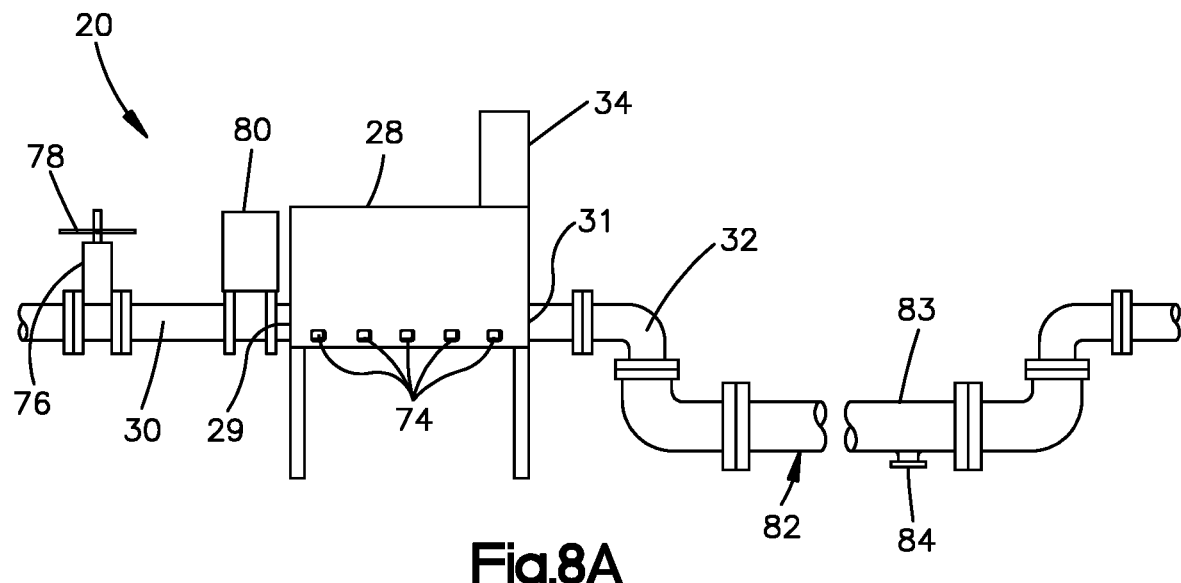
FIG. 8A is a schematic side elevation view of a monitoring system constructed in accordance with an alternative embodiment.
Figure 8B:
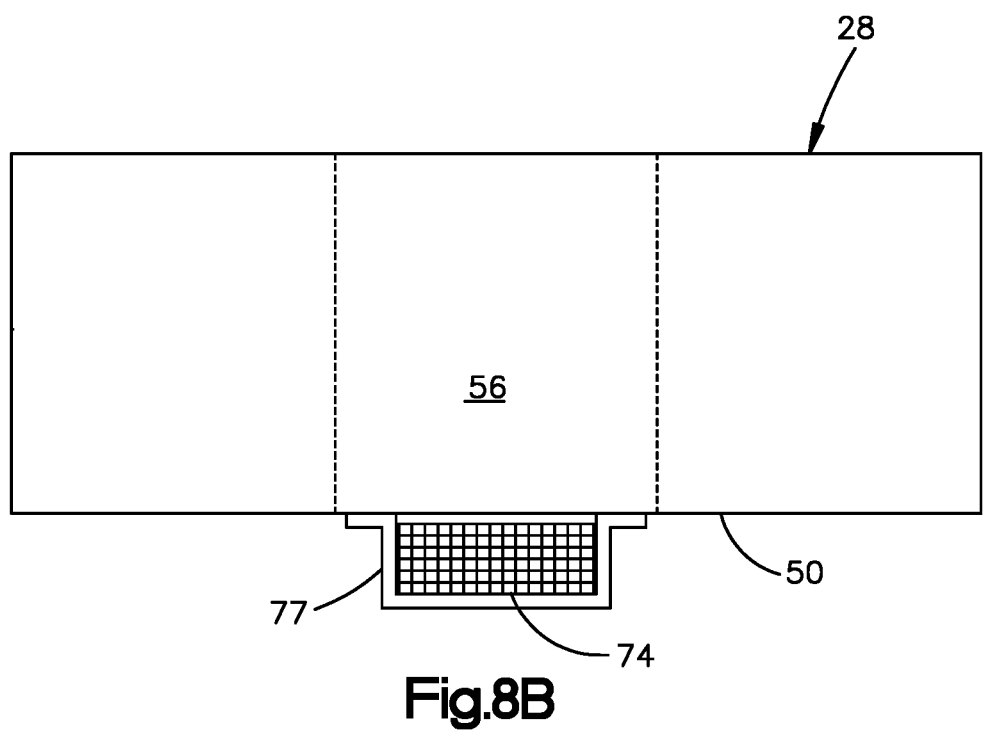
FIG. 8B is a schematic side elevation view of a fluid flow separation chamber constructed in accordance with an alternative embodiment.

Referring now to FIGS. 8A-8B, the separation chamber 28 can further include at least one magnet 74 such as a plurality of magnets 74 that are mounted to any suitable location of the chamber body 48 in at least one or more up to all of the fluid flow channels 56, such as the base 50, the outer wall 52, and one or more of the baffles 54. For example, the magnets 74 can be mounted to at least one of the inner surfaces of the base 50 and the outer wall 52. The chamber body 48 can be made of a ferrous material, such that the at least one magnet 74 is magnetically fastened to the chamber body 48. Because the at least one magnet 74 is positioned in the flow of the fluid 22, the at least one magnet 74 can attract and attach, directly or indirectly, to ferrous particulates disposed in the fluid 22.

It has been discovered that, particularly in a floating roof storage tank, as the roof 24 translates up and down, the corresponding seals bear against the inner surface of the tank 26. Continuous usage can cause the inner surface of the outer wall of the tank 26 to wear and scale, thereby generating particulates that sit atop the floating roof 24. Consequently, rainwater can direct the particulates through the drain 44 and ultimately into the separation chamber 28. As the particulates flow through the separation chamber 28, they become attached to the magnets 74, and are prevented from flowing through the outlet 31. In one example, the particulates can be rusted or otherwise corroded steel from the inner surface of the side wall of the storage tank 26. The magnetic field of the magnets 74 attracts the particulates to the magnets 74, such that the particulates attach to the magnets and are prevented from exiting the separation chamber 28 through the outlet 31.

It has been further discovered that the inlet conduit 30 can be susceptible to corrosion, particularly when used in environments with high salt concentrations in the air, for instance, near an ocean. As the inner surface of the inlet conduit 30 corrodes, particles from the inner surface of the inlet conduit 30 are produced that are visually distinguishable from the particles from the inner surface of the outer wall of the tank. For instance, the particles from the inlet conduit 30 are typically substantially larger than the particles from the outer wall of the tank. Further, while the scaling from the inner surface of the outer wall of the tank 26 can be observed through visual inspection of the outer wall of the tank 26, corrosion of the inner surface of the inlet conduit 30, on the contrary, is not easily detected by visual inspection as the inlet conduit 30 resides in the interior of the tank 26. The particles from the inlet conduit 30 travel with the fluid 22 into the separation chamber 28 where they attach to the one or more magnets 74.

Visual inspection of the particles attached to the magnet 74, for instance based on size and/or shape, can indicate to the user where the particulates originated. For instance, the size of plurality of the particles from the inlet conduit 30 are typically greater than the size of plurality of the particles of the outer wall of the tank 26. In particular, the presence of a grouping of larger particles attached to the one or more magnets 74 can indicate that structural integrity of the inlet conduit 30 is being compromised. Thus, the user can further investigate or determine that one or more segments of the inlet conduit 30 should be repaired or replaced. Accordingly, a method can include the steps of generating the particles from the outer wall of the tank and the inlet conduit, attaching the particles to the at least one magnet 74, and visually inspecting the particles to identify an identifying characteristic that distinguishes the particles from the outer wall of the storage tank 26 and the particles from the inlet conduit 30. The identifying characteristic can be a size.

In order to facilitate the easy removal of the particulates from the magnets 74, the magnets 74 can be disposed in a physical barrier, such as a film. It is desirable for the physical barrier to be usable in the fluid 22 that is received in the separation chamber 28. In one example, each of the magnets can be disposed in its own barrier. Alternatively, more than up of the magnets 74 can be disposed in a common barrier. The film can be porous with respect to magnetic field, such that the magnetic field of the magnets 74 travels through the film and causes the particles in the fluid 22 to attach to the magnets 74. To remove the particulates from the magnets 74, the magnets 74 can be removed from the barrier. The barrier can then be cleaned and reused. Alternatively, the barrier can be disposable and discarded, and a new barrier can be placed about the magnet 74. It can be said that the particulates attach to the magnets whether or not the magnets are disposed in the barrier. The barrier can, for instance, be made of any film material, such as rubber, for instance nitrile, neoprene, or latex. The film can define an interior within which the magnets 74 are disposed. Alternatively, the film can be wrapped around the magnets 74.

In another example illustrated in FIG. 8B, the at least one magnet 74 can be mounted onto an exterior surface of the fluid flow separation chamber 28 that is opposite the interior 53. The at least one magnet 74 can be operatively aligned with a respective at least one of the fluid flow channels 56, such that the at least one magnet 74 directs a magnetic force into the at least one of the fluid flow channels 56 sufficient to entrap ferrous particulates that are traveling with the fluid through the separation chamber 28. In one example, the at least one magnet 74 can be disposed beneath the base 50, such that the base 50 is disposed between the interior 53 of the fluid flow separation chamber 28 and the magnets 74. The at least one magnet 74 can include a plurality of magnets that are each aligned with a respective one or more up to all of the fluid flow channels. As ferrous particulates disposed in the fluid travels through the fluid flow separation chamber 38, they become attached to the base 50 at a location of the base 50 that is operably aligned with the magnets 74. Thus, the magnets 74 are configured to entrap the ferrous particulates, either through direct attachment (for instance when the magnets 74 are disposed in the interior 53 of the separation chamber) or through indirect entrapment (for instance, when the magnets 74 are disposed in a barrier or are mounted to the exterior of the separation chamber 28). The magnets 74 can be housed in any suitable containment apparatus 77 such as a drawer. The drawer can be moved between a closed position whereby the magnets are operatively aligned with the fluid flow channels 56, and an open position that allows the magnets 74 to be removed. Thus, when the fluid flow separation chamber 28 is disconnected from incoming fluid, the magnets 74 can be removed from the separation chamber 28, and the base 50 can be cleaned of accumulated ferrous particulates.

Referring now to FIG. 8A, the monitoring system 20 can include one or more valves that are configured to move between an open position and a closed position. When in the open position, the valves permit the fluid 22 to flow therethrough, and when in the closed position, the valves prevent the fluid 22 from flowing therethrough. For instance, the monitoring system 20 can include a manual valve 76 disposed upstream of the separation chamber 28 with respect to the direction of the fluid flow. For instance, the manual valve 76 can be disposed in the inlet conduit 30 at a location between the petroleum storage tank 26 and the inlet 29 of the separation chamber 28. The manual valve 76 can include a manual actuator 78 that can be moved between a first position that places the manual valve 76 in the open position, and a second position that places the manual valve 76 in the closed position. When the manual valve 76 is in the open position, the manual valve 76 does not prevent the flow of the fluid 22 from the petroleum storage tank 26 to the separation chamber 28. When the manual valve 76 is in the closed position, the manual valve 76 prevents the fluid from flowing from the petroleum storage tank 26 to the separation chamber 28. Thus, the manual valve 76 is configured to prevent the fluid 22 from flowing from the petroleum storage tank 26 to the separation chamber 28 even when the hydrocarbon sensor 34 does not detect an alarm condition.

The monitoring system 20 can further include at least one automatic valve that is configured to move between the open position and the closed position depending on the sensed condition of the hydrocarbon sensor 34. In particular, as described above, the hydrocarbon sensor 34 is configured to output a signal in response to a detection of the threshold amount of hydrocarbons in the fluid 22. The signal can be received by a processor, or the hydrocarbon sensor 34 can include a processor, that receives the signal and, in response to the signal, send command signals to one or more peripheral devices. Alternatively, the peripheral devices can include a processor that receives the signal directly from the hydrocarbon sensor 34 and, in response to the signal, activates an alarm condition. The peripheral devices can include the at least one automatic valve. The at least one automatic valve can be in the open position when the hydrocarbon sensor 34 does not detect the threshold amount of hydrocarbons in the fluid 22. When the hydrocarbon sensor 34 outputs the signal in response to a detection of the threshold amount of hydrocarbons in the fluid 22, the at least one automatic valve in response moves from the open position to the closed position. When the hydrocarbon sensor 34 does not detect the threshold amount of hydrocarbons in the fluid 22, the at least one automatic valve can operate in the open position. Thus, the at least one automatic valve can be referred to as a normally open valve.

The at least one automatic valve can include an automatic inlet valve 80 that can be disposed in the inlet conduit 30. The inlet valve 80 can be disposed between the inlet 29 of the separation chamber 28 and the manual valve 76. Alternatively, the manual valve 76 can be disposed between the automatic inlet valve 80 and the inlet 29 of the separation chamber 28. It should be appreciated that the second end of the inlet conduit 30 can be defined by either the manual valve 76 or the inlet valve 80. Alternatively, both the manual valve 76 and the inlet valve 80 can be disposed between the first and second ends of the inlet conduit 30. During operation, when the hydrocarbon sensor 34 does not detect the threshold amount of hydrocarbons in the fluid 22, the automatic inlet valve 80 does not prevent the fluid 22 from flowing from the floating roof 24 to the separation chamber 28. Accordingly, when both the manual valve 76 and the automatic inlet valve 80 are in the open position, the fluid 22 is able to flow from the floating roof 24 through the inlet conduit 30 and into the separation chamber 28. When either of the manual valve 76 and the automatic inlet valve 80 is in the closed position, the fluid 22 upstream of the closed one of the manual valve 76 and the automatic inlet valve 80 is prevented from flowing to the separation chamber 28. The fluid 22 upstream of the closed one of the manual valve 76 includes the fluid 22 disposed on the floating roof 24 and in the inlet conduit 30 at a location of the inlet conduit 30 that is upstream of the closed one of the manual valve and the automatic inlet valve 80.

It is recognized that when the threshold amount of hydrocarbons is present in the fluid 22 and the automatic inlet valve 80 is therefore moved to the closed position, the fluid 22 in the separation chamber 28 may contain hydrocarbons in a quantity such that it is undesirable to deliver the fluid 22 into the environment. Accordingly, the outlet conduit 32 can include a region 82 that is sized and configured to retain the fluid 22 disposed in the separation chamber 28 after one or both of the manual valve 76 and the automatic inlet valve 80 has been moved to the closed position. In particular, the region 82 can define a P-trap 83. For instance, the region 82 can extend down and then up so as to define a substantial U-shape. The volume of the region 82 of the outlet conduit 32 can be at least equal to the volume of the separation chamber 28. For instance, the volume of the region 82 of the outlet conduit can be at least equal to the volume of the separation chamber 28 in addition to the length of the inlet conduit 30 that is disposed downstream of one or both of the valves 76 and 80. Accordingly, once the threshold amount of hydrocarbons is sensed in the fluid 22, the fluid 22 that is disposed upstream from the sensed fluid is prevented from flowing into the ambient environment. Further, the outlet conduit 32 can define a drain 84 in the region 82 that can be opened so as to direct the fluid 22 disposed in the region through a drainage tube and into any suitable containment apparatus where the fluid 22 can be analyzed, and the hydrocarbons can be removed prior to delivering the fluid 22 to the ambient environment. Thus, the hydrocarbon laden fluid 22 in the separation chamber 28 can be safely removed without delivering the hydrocarbon into the ambient environment.

Figure 9:
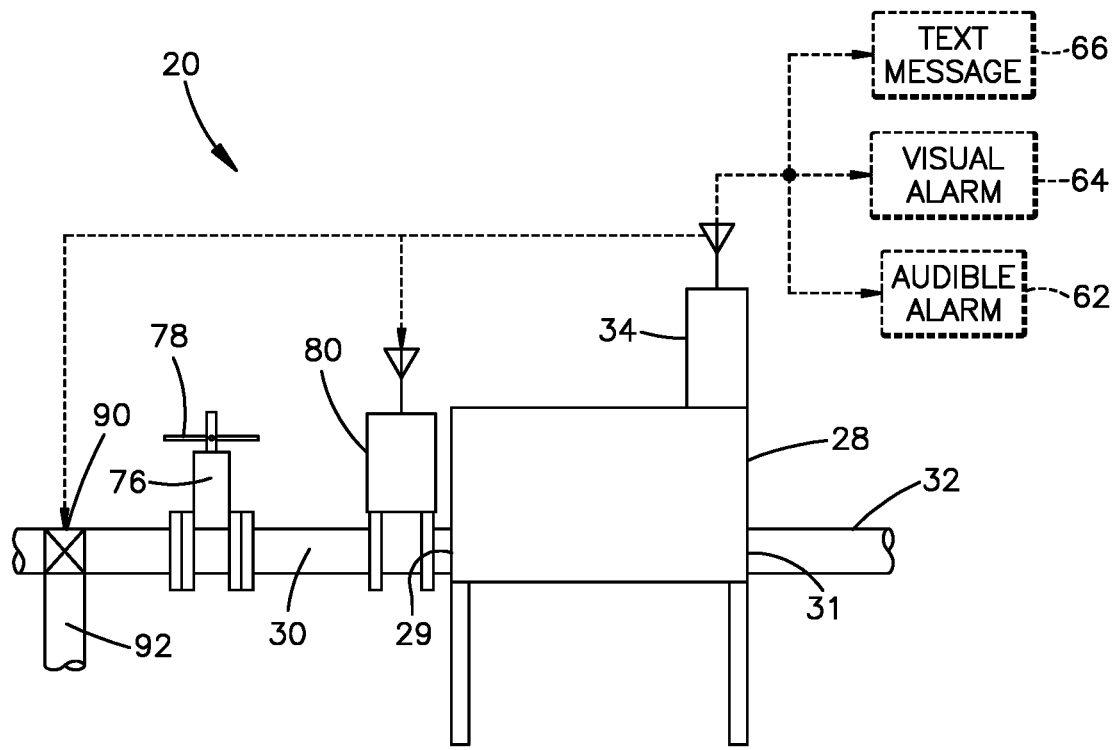
FIG. 9 is a schematic side elevation view of a monitoring system constructed in accordance with yet another alternative embodiment.
Figure 10:
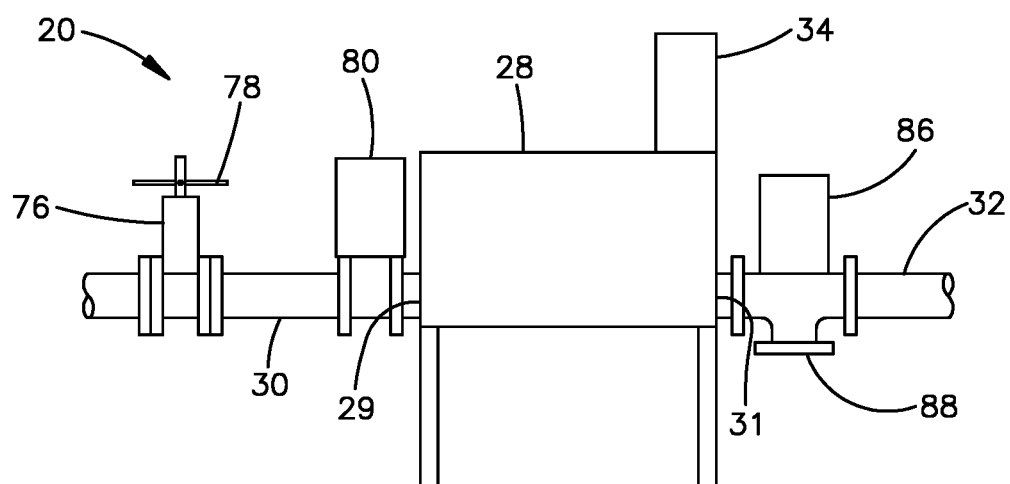
FIG. 10 is a schematic side elevation view of a monitoring system constructed in accordance with still another alternative embodiment.

Alternatively or additionally, referring now to FIGS. 9-10, the at least one automatic valve can include an automatic outlet valve 86 that can be disposed in the outlet conduit 32. The first end of the outlet conduit 32 can be defined by the outlet valve 86. Alternatively, the outlet valve 86 can be disposed between the first and second ends of the outlet conduit 32. During operation, when the hydrocarbon sensor 34 does not detect the threshold amount of hydrocarbon in the fluid 22, the automatic outlet valve 86 is in the open position, and thus does not prevent the fluid 22 from flowing from the separation chamber 28 out the second end of the outlet conduit 32 and into the ambient environment. When the hydrocarbon sensor 34 detects the predetermined threshold amount in the fluid 22, the automatic outlet valve 86 moves to the closed position in response to the signal, and thus prevents the fluid 22 disposed in the separation chamber 28 from flowing through the outlet conduit 32 and into the ambient environment.

Further, referring now to FIG. 10, the monitoring system 20 can further include an outlet drain 88 that is configured to drain the fluid captured between the closed outlet valve 86 and the closed manual valve 76 or automatic inlet valve 80. The outlet drain 88 can be disposed between the outlet valve 86 and the downstream-most one of the manual valve 76 and the automatic inlet valve 80. In one example, the outlet drain 88 can be disposed between the outlet 31 of the separation chamber 28 and the outlet valve 86. Alternatively, the outlet drain 88 can be defined by the outlet valve 86. The outlet drain 88 is configured to be opened after the outlet valve 86 has been closed, so as to direct the fluid 22 disposed between the inlet valve 80 and the outlet valve 86 into any suitable containment apparatus where the fluid 22 can be analyzed, and the hydrocarbons can be removed prior to delivering the fluid 22 to the ambient environment. Thus, the hydrocarbon laden fluid 22 in the separation chamber 28 can be safely removed without delivering the hydrocarbon into the ambient environment. The base 50 can be sloped downward along a direction from the inlet 29 toward the outlet drain 88, so as to assist in directing the flow of fluid 22 from the inlet 29 toward the outlet drain 88. In one example, the automatic outlet valve 86 can prevent fluid from flowing from the outlet 31 to the outlet conduit 32.

It is appreciated that it is desirable to ensure that once the valve or vales are closed in response to the sensed threshold amount of hydrocarbons, the closed valve or valves do not reopen while petroleum remains present. Accordingly, in one example, it can be desirable to ensure that a quantity of fluid 22 is disposed in the separation chamber 28. So long as fluid 22 is disposed within the chamber, the sensor will detect the presence of the threshold amount of hydrocarbons when present. If, on the other hand, fluid 22 is entirely removed from the separation chamber 28, the sensor 22 would not detect hydrocarbons, and thus would cause the inlet and outlet valves to open, even though a condition exists that is allowing hydrocarbons to enter the fluid 22. Accordingly, it may be desirable to space the outlet drain 88 above the base of the separation chamber 28. Alternatively, the region 82 of the outlet conduit 32 can be located slightly above the outlet 88 of the separation chamber 28. Alternatively still, the fluid 22 can be removed in its entirety from the separation chamber 28, and the monitoring system 20 can operate such that the closed valve or valves are not allowed to open until a user causes them to open. As a result, the system will not allow hydrocarbon-laden fluid to enter and potentially exit the separation chamber 28 unless a user manually inspects the monitoring system 20.

Referring again to FIG. 9, it is recognized that when the threshold amount of hydrocarbons is sensed in the fluid 22 and the automatic inlet valve 80 is moved to the closed position, a substantial volume of fluid 22 may remain on the floating roof 24, and the volume of fluid 22 can continue to accumulate during periods of rain. Accordingly, in order to remove the fluid 22 from the petroleum storage tank 26 after the threshold amount of hydrocarbons is sensed in the fluid 22, the monitoring system 20 can include a bypass valve 90 in the inlet conduit 30, and a bypass conduit 92 that extends from the inlet conduit 30. The bypass valve 90 can be moved between an open position and a closed position. When the bypass valve 90 is in the closed position, the bypass valve 90 prevents the fluid 22 from flowing from the inlet conduit 30 to the bypass conduit 92. When the bypass valve 90 is in the open position, the bypass valve 90 allows the fluid 22 to flow from the inlet conduit 30 to the bypass conduit 92. In one example, when the bypass valve 90 is in the open position, the bypass valve can cause the fluid 22 to flow from the inlet conduit to the bypass conduit 92. The bypass conduit 92 can direct the fluid 22 into any suitable containment apparatus that allows the fluid 22 to drain from the floating roof 24 of the storage tank.

The bypass valve 90 can be disposed upstream of the automatic inlet valve 80. The bypass valve 90 can further be positioned upstream of the manual valve 76. Similarly, the bypass conduit 92 can be disposed upstream of the automatic inlet valve 80. The bypass conduit 92 can further be positioned upstream of the manual valve 76. The bypass conduit 92 can extend from the inlet conduit 30 to the containment apparatus that is configured to receive the fluid 22 from the storage tank, thereby allowing the fluid 22 to drain from the floating roof 24. During operation, the bypass valve 90 is in the closed position while the hydrocarbon sensor 34 does not detect the threshold amount of hydrocarbons in the fluid at the threshold amount. When the hydrocarbon sensor 34 detects the threshold amount of hydrocarbons in the fluid 22, the bypass valve 90 can be moved from the closed position to the open position. For instance, the bypass valve 90 can be moved from the closed position to the open position by a user. Alternatively, the bypass valve 90 can be manually moved from the closed position to the open position upon generation of the signal from the hydrocarbon sensor 34 that the threshold amount of hydrocarbons has been detected in the fluid 22. Thus, the bypass valve 90 can be included in the peripheral devices that are configured to automatically actuate in response to the detection of the threshold amount of hydrocarbons in the fluid 22. Because the inlet valve 80 is in the closed position when the threshold amount of hydrocarbons has been detected in the fluid 22, the fluid 22 disposed upstream of the bypass valve 90 flows through the bypass conduit 92. The fluid 22 can be analyzed at the containment apparatus, and any hydrocarbons disposed in the fluid 22 can be removed from the fluid 22, such that the fluid 22 can then be released into the ambient environment.

Figure 11A:
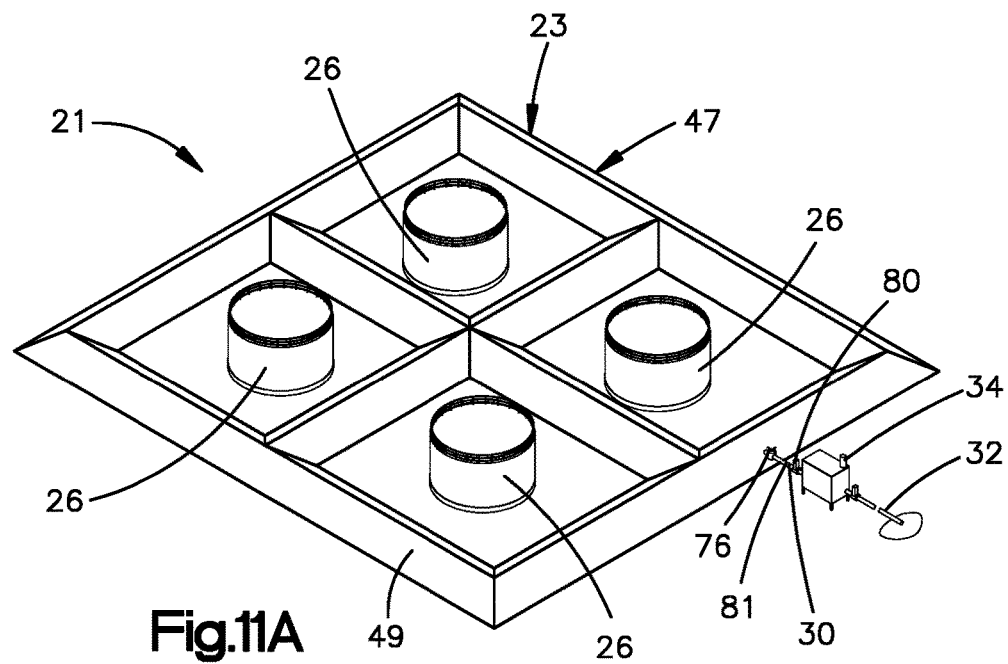
FIG. 11A is a schematic perspective view of a petroleum storage facility including a containment area and a run off retention pond, showing the monitoring system operatively coupled to the containment area.
Figure 11B:
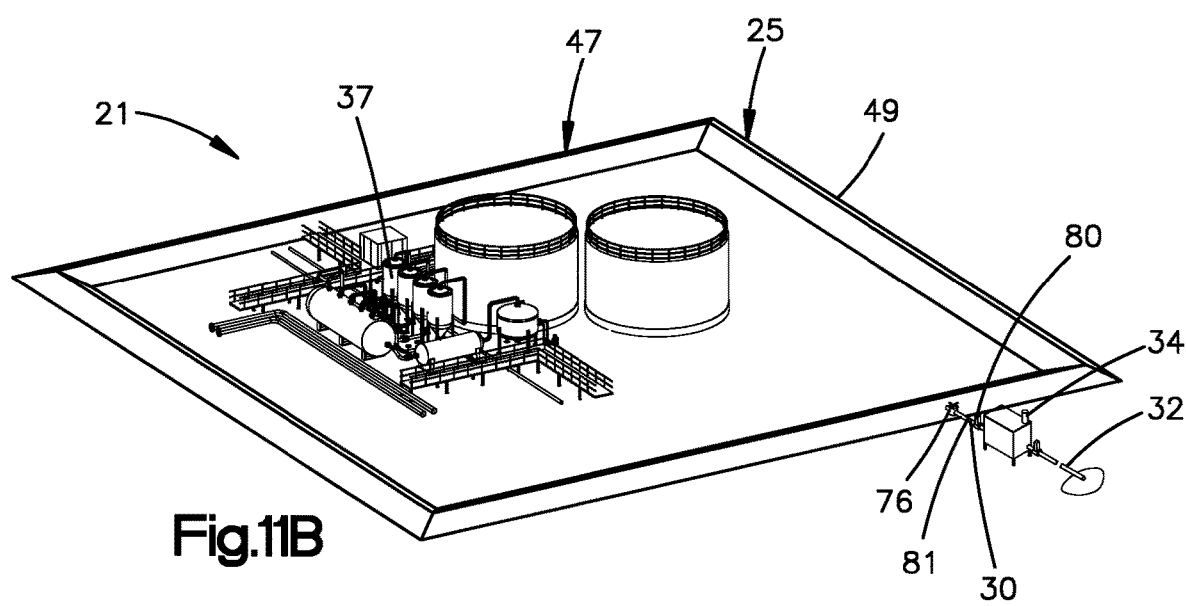
FIG. 11B is a schematic perspective view of an oil processing facility including a containment area and the monitoring system operatively coupled to the containment area.
Figure 11C:
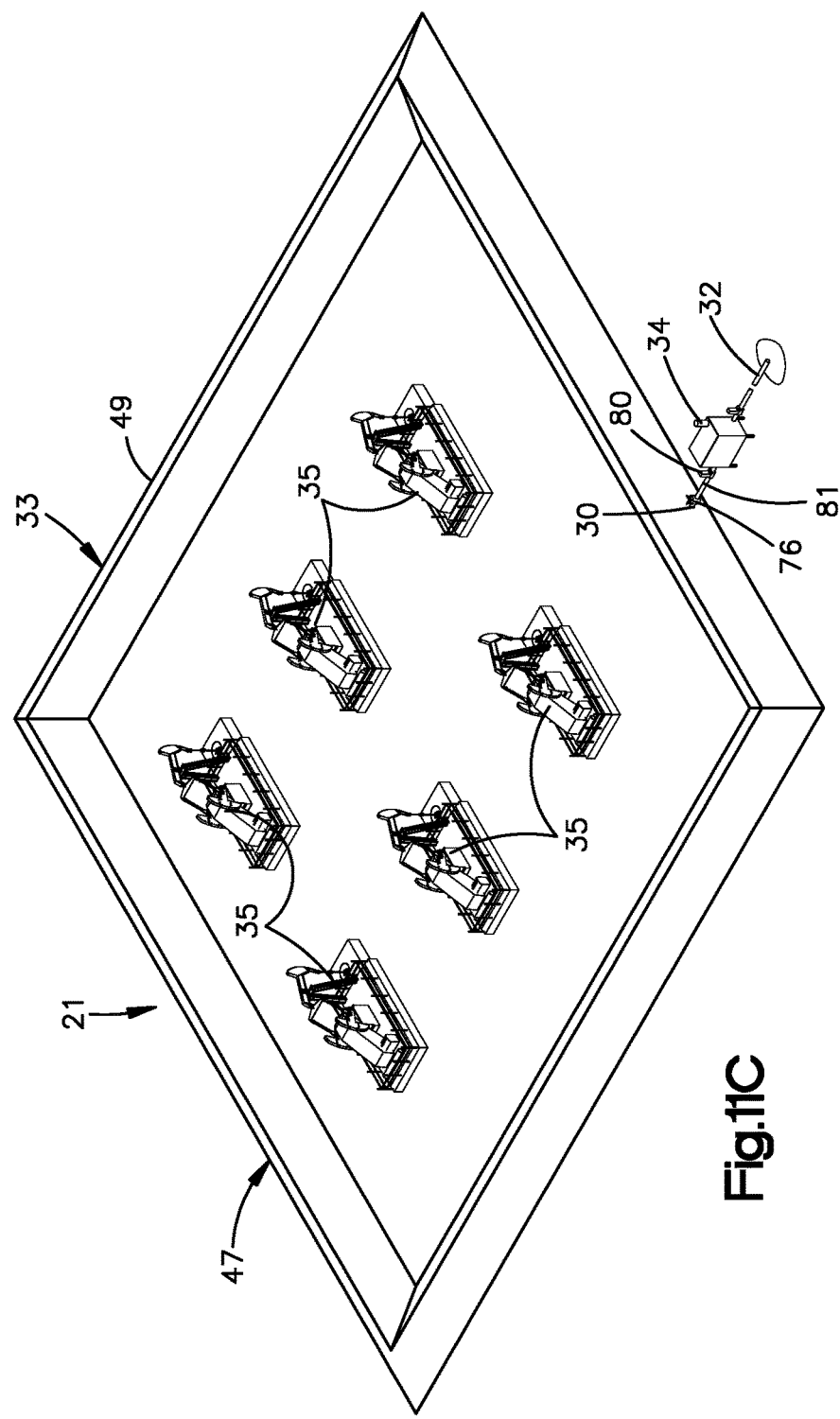
FIG. 11C is a schematic perspective view of an oil mining facility including a containment area and the monitoring system operatively coupled to the containment area.

Referring now to FIGS. 11A-11C, and as described above, the monitoring system 20 is configured to detect the presence of the selected group of hydrocarbons in a fluid 22 to be discharged from any desirable location of an oil handling facility 21. The oil handling facility 21 can be in the form of at least one of a petroleum storage facility 23, an oil processing facility 25, such as a refinery 37, and an oil mining facility 33 that includes one or more oil wells 35. Oil handling facilities can include containment areas 47, such as dikes 49, that are configured to contain fluids 22 such as storm water run off that may be contaminated with hydrocarbons, and thus not suitable to be introduced into the ambient environment. Such containment areas are typically lined with an impervious barrier to prevent the seepage of the contained fluids into the earth. It is desired to discharge the fluids from the containment area to a location outside the oil handling facility, where they are often returned to the earth. However, it is desired to ensure that the fluids being discharged do not contain environmentally harmful levels of hydrocarbons. Thus, the location of the oil handling facility can be configured as a containment area. The containment area 47 can surround individual oil handling apparatus, such as individual petroleum storage tanks 26 or individual oil wells 35. Alternatively, the containment area can surround a plurality of oil handling apparatus, such as a plurality of petroleum storage tanks 26 or a plurality of oil wells 35.

The monitoring system 20 can include the oil handling facility, including one or more of the petroleum storage facility 23, including the petroleum storage tank, the oil processing facility 25, and the oil mining facility 33. The monitoring system can further include the fluid flow separation chamber 28, the first or an inlet conduit 30 that extends from the containment area 47 of the oil handling facility to an inlet 29 (see FIGS. 5A, 13A, 14A, and 15A) of the fluid flow separation chamber 28. For instance, the inlet conduit 30 can be in fluid communication with a drain that extends through the dike 49 and into the containment area 47, such that fluid disposed in the containment area 47 can flow into the inlet conduit 30. The drain can be a side drain that extends through the side wall of the dike 49. For instance, the side drain can be located at a lower end of the side wall of the dike 49. Alternatively, the drain can be a bottom drain that causes fluid accumulated in the containment area 47 to flow through the bottom drain and into the inlet conduit 30. As discussed above, the fluid disposed in the containment area 47 can be storm water run off from the various apparatus of the oil handling facility that is surrounded by the dike 49. The monitoring system 20 can include a pump as desired to induce pressure that drives the fluid to flow from the containment area 47 into the inlet conduit 30. The inlet conduit 30 is configured to deliver the fluid 22 that is discharged from the containment area 47 to the fluid flow separation chamber 28, as described above, and into the ambient environment when the sensor does not detect the threshold presence of petroleum in the fluid.

Figure 12A:
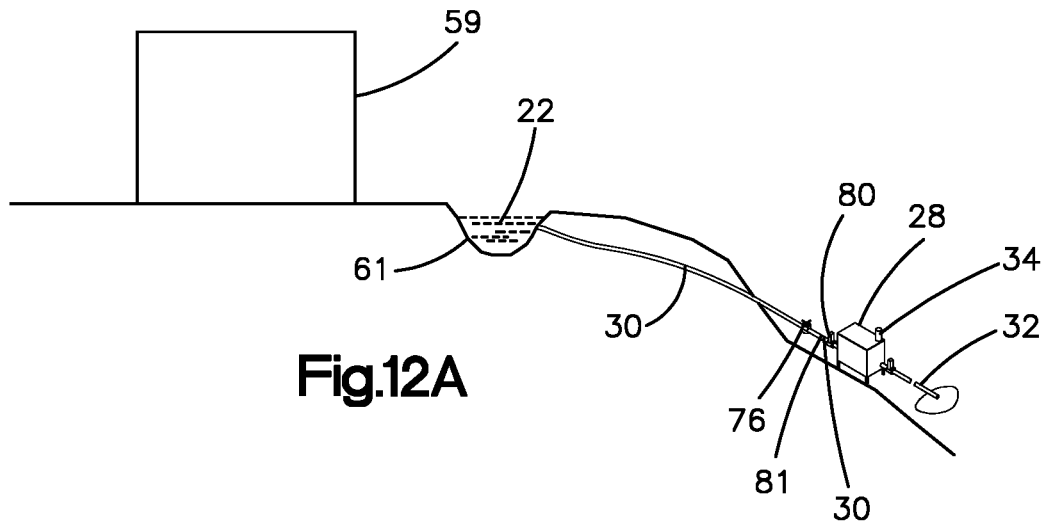
FIG. 12A is a schematic side elevation view of a retention pond, showing the monitoring system operatively coupled to the retention pond in accordance with one embodiment.
Figure 12B:
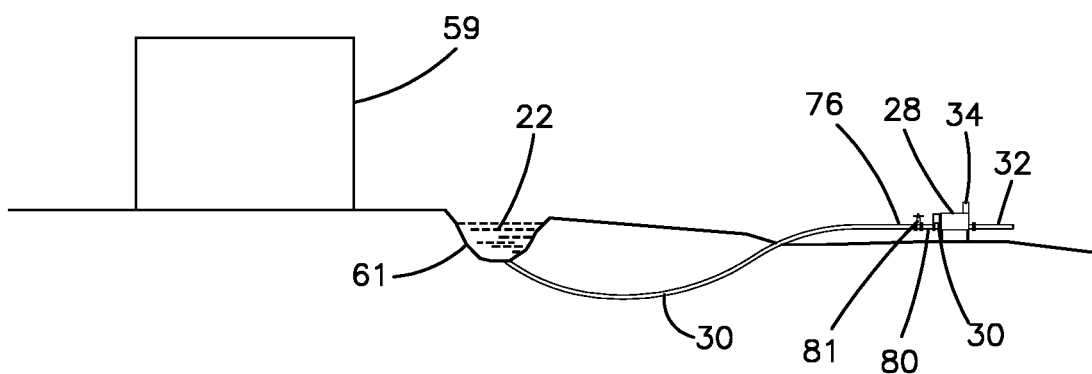
FIG. 12B is a schematic side elevation view of the retention pond illustrated in FIG. 12A, but showing the monitoring system operatively coupled to the retention pond in accordance with another embodiment.

Referring now to FIGS. 12A-B, it is recognized that oil handling facilities can often include a storm water run off retention pond 61. The storm water run off retention pond 61 is positioned to receive run off from various apparatus of the oil handling facility 10. For instance, when the retention pond 61 is disposed in the containment area 47, the run off can flow from the oil handling facility into the retention pond in the containment area 47, for instance under gravitational forces. In this regard, the retention pond 61 can be disposed at a sufficiently low elevation such that run off is directed into the retention pond 61 under gravitational forces. It is recognized that retention ponds 61 can exist outside the containment area 47, so long as they are sufficiently sealed to prevent the flow of the fluid contained in the retention pond 61 from traveling into the ambient environment. Thus, whether the retention pond 61 is disposed inside or out of the containment area 47, the retention pond 61 can be sealed from the soil to prevent potentially contaminated run off from entering the groundwater. The monitoring system 20 can further include the fluid flow separation chamber 28, the first or an inlet conduit 30 that extends from the retention pond 61 of the oil handling facility to the inlet 29 (see FIGS. 5A, 13A, 14A, and 15A) of the fluid flow separation chamber 28. For instance, the inlet conduit 30 can be in fluid communication with a drain that is in fluid communication with the retention pond 61, such that fluid disposed in the retention pond 61 can flow into the inlet conduit 30. As discussed above, the fluid disposed in the retention pond 61 can be storm water run off from the various apparatus of the oil handling facility. Thus, the location of the oil handling facility can be configured as the retention pond 61. The inlet conduit 30 is configured to deliver the fluid 22 that is discharged from the containment area 47 to the fluid flow separation chamber 28, as described above.

As illustrated in FIG. 12A in particular, the fluid flow separation chamber 28 can be disposed at a lower elevation than the drain of the retention pond 61. Accordingly, fluid in the retention pond 61 can flow from the retention pond 61 through the drain and into the fluid flow separation chamber 28 under gravitational forces. In accordance with this embodiment, the drain can be disposed at an upper end of the retention pond 61. As a result, the drain is positioned such that the fluid level in the retention pond 61 is unlikely to reside above the drain. When the fluid level in the retention pond 61 rises to the level of the drain, fluid can cascade through the drain and flow through the inlet conduit 30 and into and into the fluid flow separation chamber 28 under gravitational forces. A portion up to all of the inlet conduit 30 can extend along the ground, or can be buried underground. Alternatively or additionally, a pump can be induce a pressure that forces the fluid in the retention pond 61 to flow into the inlet conduit 30 and into the fluid flow separation chamber 28. The pump can be disposed in the inlet conduit 30 or in the retention pond 61. It may be desirable, for instance, to empty the retention pond 61. Thus, the pump can draw the fluid from an input conduit that has a free end proximate to the base of the retention pond 61. Further, it may be desirable to operate the pump during normal operation of the monitoring system 20. Alternatively or additionally still, a fluid flow regulator can limit the volumetric flow rate of the fluid that travels from the retention pond 61 to the fluid flow separation chamber 28.

Alternatively, as illustrated in FIG. 12B, the drain of the retention pond 61 can be a bottom drain, and thus disposed at the bottom of the retention pond 61. As a result, the drain is positioned such that as fluid 22 accumulates within the retention pond 61, the fluid flows through the bottom drain. It is envisioned that the fluid 22 can rise to a level above the drain in some circumstances. For instance, storm water run off can accumulate in the retention pond 61 at a rate faster than the rate at which storm water flows through the monitoring system 20. Thus, the fluid 22 in the retention pond 61 provides a fluid pressure that urges the fluid to flow out the drain, through the inlet conduit 30, and into the fluid flow separation chamber 28 as described above. It is understood that it may be desirable to regulate the flow of fluid to prevent the fluid pressure from causing the fluid 22 to flow at undesirably high volumetric flow rates into the fluid flow separation chamber. For instance, the fluid flow separation chamber 28 can be positioned at a higher elevation than that of the drain. In one example, the fluid flow separation chamber 28 can be positioned at a higher elevation than that of the retention pond 61. Accordingly, gravitational forces acting on the fluid 22 in the retention pond 61 can create pressure in the fluid 22 that causes the fluid 22 to travel through the inlet conduit 30 and through the fluid flow separation chamber 28. Alternatively or additionally, a pump can be disposed in the inlet conduit 30 or in the retention pond 61 that induces a pressure forcing the fluid in the retention pond 61 to flow into the inlet conduit 30 and into the fluid flow separation chamber 28. It may be desirable, for instance, to empty the retention pond 61. The pump can thereby draw the fluid from an input conduit that has a free end proximate to the base of the retention pond 61. Further, it may be desirable to operate the pump during normal operation of the monitoring system 20. Alternatively or additionally still, a fluid flow regulator can limit the volumetric flow rate of the fluid that travels from the retention pond 61 to the fluid flow separation chamber 28. It should be appreciated that one or both of the pump and the fluid flow regulator can also be present in the monitoring system 20 when the monitoring system 20 drains fluid from the roof of the storage tank in the manner described above.

Referring to FIGS. 2-12B in general, it should be appreciated that a method can be provided for assembling the monitoring system 20. The method can include the step of installing the first or automatic inlet valve 80 in the first or inlet conduit 30 that extends between the oil handling facility and a location external of the oil handling facility. In one example, the first or inlet conduit 30 can extend between the drain 44 in the floating roof 24 and a location external of the storage tank 26. In another example, the first or inlet conduit 30 can extend between a containment area and a location external of the containment area. In still another example, the first or inlet conduit 30 can extend between a fluid retention pond and a location remote from the fluid retention pond. As described above, the inlet valve 80 is configured to selectively permit and prevent fluid from flowing through the first conduit past the valve 80. The method can further include the step of attaching the inlet conduit 30 to the inlet 29 of the fluid flow separation chamber 28. The method can further include the step of placing the hydrocarbon sensor 34 in operative communication with the interior 53 of the fluid flow separation chamber 28 at a location proximate to the outlet 31, such that the sensor 34 is configured to sense a presence of hydrocarbons at the location proximate to the outlet 31. For instance, the hydrocarbon sensor 34 can be aimed so as to detect hydrocarbons in the form of a sheen on the top surface of the fluid.

The method can further include the step of installing the second or automatic outlet valve 86 in the second or outlet conduit 32 that extends out from the outlet 31 of the separation chamber 28. The automatic outlet valve 86 is configured to selectively permit and prevent the fluid 22 from flowing through the outlet conduit 32 past the outlet valve 86. The method can further include the step of installing a feedback mechanism that is configured to cause the inlet valve 80 to close in response to sensed petroleum at the sensor 34. The feedback mechanism can further be configured to cause the outlet valve 86 to close in response to sensed petroleum at the sensor 34. The feedback mechanism can be further configured to activate at least one of the audio alarm 62, the visual alarm 64, and the remote alarm signal 66. The feedback mechanism can be in the form of a controller or other like apparatus that receives an indication from the sensor that the presence of hydrocarbons has been detected.

The method can further include the step of placing the absorbent media 68 in at least one of the fluid flow channels 56 of the separation chamber 28. The method can further include the step of placing a plurality of the absorbent media 68 in a corresponding plurality up to all of the fluid flow channels 56 of the separation chamber 28. For instance, the method can include the step of encasing the absorbent media 68 in the water permeable cage 72. The method can further include the step of installing the P-trap in the outlet conduit 32 at a location downstream of the outlet 31 of the separation chamber 28 with respect to the fluid flow. The method can further include the step of attaching a drainage tube to the P-trap. The method can further include the step of mounting the at least one magnet 74 to the separation chamber 28 at a location in at least one of the fluid flow channels 56. The method can further include the step of attaching the bypass conduit 92 to the inlet conduit 30 at a location upstream of the inlet valve 80 with respect to fluid flow, so as to selectively direct the fluid 22 to flow from the inlet conduit 30 to the bypass conduit 92 when the inlet valve 80 is in the closed position.

With continuing reference to FIGS. 1-15B generally, it should be appreciated that a method can be provided for monitoring for a presence of hydrocarbons in the fluid 22 drained from a location of an oil handling facility. The method can include the step of directing the fluid 22 from the location of an oil handling facility and into the fluid flow separation chamber 28. In one example, the location of the oil handling facility is a storage tank 26, and in particular the floating roof 24. Thus, the directing step can include the step of directing the fluid from the floating roof 24 through the drain 44 and into the fluid flow separation chamber 28, for instance through the inlet 29. In another example, the location of the oil handling facility is a containment area, and the directing step can include the step of directing the fluid from the containment area, through the dike, and into the fluid flow separation chamber 28, for instance through the inlet 29. In still another example, the location of the oil handling facility is a retention pond, and the directing step can include the step of directing the fluid from the retention pond under gravitational forces or fluid pressure from fluid pressure in the pond, and into the fluid flow separation chamber 28, for instance through the inlet 29. The method can further include the step of causing the fluid 22 to flow from the inlet 29 of the fluid flow separation chamber 28 to the outlet 31 of the fluid flow separation chamber 28. The method can further include the step of sensing the fluid 22 proximate to the outlet 31 of the fluid flow separation chamber for the presence of hydrocarbons. When the sensing step detects the presence of a threshold amount of hydrocarbons in the fluid 22, the method can further include the step of closing the inlet valve 80 at a location between the roof 24 and the outlet 31 of the fluid flow separation chamber 28, thereby preventing further flow of the fluid 22 from the oil handling facility to the outlet 31 of the fluid flow separation chamber 28.

During the directing step, the fluid 22 can flow from the location of the oil handling facility to the fluid flow separation chamber 28 at a first velocity, and during the causing step, the fluid 22 can flow through the fluid flow separation chamber 28 at a second velocity less than the first velocity. For instance, the method can further include the step of, in the fluid flow separation chamber 28, converting a turbulent flow of the fluid 22 entering the inlet 29 of the fluid flow separation chamber 28 to a laminar flow at the outlet 31 of the fluid flow separation chamber 28. Therefore, the method can further include the step of, in the fluid flow separation chamber 28, causing a quantity of hydrocarbons present in the fluid 22 to rise to an upper surface of the fluid 22 disposed in the fluid flow separation chamber 28, for instance as a sheen. The causing step can further include the step of directing the fluid 22 sequentially through the plurality of channels 56 in respective opposite directions. The fluid 22 in the fluid flow separation chamber 28 can extend from the base 40 of the separation chamber 28 to an upper surface of the fluid 22 along a vertical direction, and the opposite directions are perpendicular to the vertical direction.

The causing step can include the step of causing the fluid 22 to flow from the inlet 29 in the fluid flow separation chamber 28 through a first one of the fluid flow channels 56, such as an upstream-most one of the fluid flow channels 56, and through a second one of the fluid flow channels 56, such as a downstream-most one of the fluid flow channels 56, to the outlet 31 of the fluid flow chamber 28. The causing step further can further include the step of causing the fluid to travel from the first one of the fluid flow channels 56 to the second one of the fluid flow channels 56. The causing step can further include causing the fluid travel within a fluid flow channel 56 to be restricted by a flow-restricting wall 55 disposed in the fluid flow channel 56. When the sensing step detects the presence of the threshold amount of hydrocarbons in the fluid 22, the method can further include the step of activating an alarm state indicating the presence of the threshold amount of hydrocarbons in the fluid 22. For instance, the activating step can include at least one of activating the audio alarm 62, activating the visual alarm 64, and sending an alarm signal to a remote location.

When the sensing step detects the presence of the threshold amount of hydrocarbons in the fluid 22, the method can include the step of closing the inlet valve 80 at a location upstream of the outlet 31 of the fluid flow separation chamber 28 with respect to the direction of fluid flow, thereby preventing further flow of the fluid 22 from the floating roof 24 to the outlet 31 of the fluid flow separation chamber 28. For instance, the method can include the step of closing the inlet valve 80 at a location upstream of the inlet 29 of the fluid flow separation chamber 28 with respect to the direction of fluid flow, thereby preventing further flow of the fluid 22 from the floating roof 24 to the inlet 29 of the fluid flow separation chamber 28. Further, when the sensing step detects the presence of the threshold amount of hydrocarbons in the fluid 22, the method can include the step of closing the outlet valve 86 at a location downstream of the outlet 31 of the fluid flow separation chamber 28 with respect to the direction of fluid flow, thereby preventing further flow of the fluid 22 from the location of the oil handling facility to the outlet 31 of the fluid flow separation chamber 28.

The method can further include the step of directing the fluid 22 from the outlet 31 of the separation chamber through the P-trap. The method can further include the step of causing a volume of the fluid 22 to flow into the P-trap that is at least equal to a volume of the fluid 22 disposed between the inlet valve 80 and the P-trap when the inlet valve 80 is closed. The method can further include the step of draining the fluid from the P-trap after the outlet valve 86 has been closed. The method can further include the step of directing the fluid 22 to the bypass conduit 92 at a location upstream of the inlet valve 80 once the inlet valve 80 has been closed.

The causing step can include the step of causing the fluid 22 to flow through the absorbent media in the separation chamber 28 at a location upstream from the sensor 34. The causing step can further include the step of causing the fluid 22 to flow over the at least one magnet 74 that is configured to attach to ferrous particulates from the storm water-based fluid 22 in the separator chamber 28.

Further, a method can be provided for installing the monitoring system 20. The method can include the steps of installing the first or automatic valve 80 in the first or inlet conduit 30. The inlet conduit 30 can extend from a drain that is open to an interior of the containment area 47 that is contained by a dike. The drain can extend through the dike, or can extend over or under the dike. Alternatively, the inlet conduit 30 can extend from a drain of the retention pond 61. The valve 80 can be configured to selectively permit and prevent fluid from flowing through the first conduit past 30 the valve 80. The method can further include the step of attaching the first conduit 30 to the inlet 29 of the fluid flow separation chamber 28. The method can further include the step of placing the hydrocarbon sensor 34 in operative communication with the interior 53 of the fluid flow separation chamber 28 at a location proximate to the outlet 31, such that the sensor 34 is configured to sense a presence of hydrocarbons at the location proximate to the outlet 31. As described above, the sensor 34 is configured to sense the presence of hydrocarbons that are among a group of hydrocarbons that includes, but is not necessarily limited to, diesel/fuel oil, lube oil, motor oil, hydraulic oil, jet fuel, mineral oil, and crude oil. For instance, the hydrocarbon sensor 34 can be aimed so as to detect hydrocarbons in the form of a sheen on the top surface of the fluid.

The method can further include the step of installing the second or automatic outlet valve 86 in the second or outlet conduit 32 that extends out from the outlet 31 of the separation chamber 28. The second valve 86 is configured to selectively permit and prevent fluid from flowing through the second conduit 32 past the second valve 86, as described above. The method can further include the step of installing a feedback mechanism that is configured to cause the inlet valve 80 to close in response to sensed petroleum at the sensor 34. The feedback mechanism can further be configured to cause the outlet valve 86 to close in response to sensed petroleum at the sensor 34. The feedback mechanism can be further configured to activate at least one of the audio alarm 62, the visual alarm 64, and the remote alarm signal 66. The feedback mechanism can be in the form of a controller or other like apparatus that receives an indication from the sensor that the presence of hydrocarbons has been detected.

The method can further include the step of placing the absorbent media 68 in at least one of the fluid flow channels 56 of the separation chamber 28. For instance, the method can include the step of encasing the absorbent media 68 in the water permeable cage 72. The method can further include the step of installing the P-trap in the outlet conduit 32 at a location downstream of the outlet 31 of the separation chamber 28 with respect to the fluid flow. The method can further include the step of attaching a drainage tube to the P-trap. The method can further include the step of mounting the at least one magnet 74 to the separation chamber 28 at a location in at least one of the fluid flow channels 56. The method can further include the step of attaching the bypass conduit 92 to the inlet conduit 30 at a location upstream of the inlet valve 80 with respect to fluid flow, so as to selectively direct the fluid 22 to flow from the inlet conduit 30 to the bypass conduit 92 when the inlet valve 80 is in the closed position.

In another example, the oil handling facility can have a plurality of pumps and associated floats that cause the pumps to operate when the floats have reached a predetermined level, indicative of a potential flood condition. Operation of the pump can drain the accumulated fluid. Certain situations that can cause the floats to raise to the predetermined level include the presence of rainwater or runoff water. Accordingly, the separation chamber 28 can be attached to the outlet of the pump so as to allow the drainage of the liquid when the threshold amount of hydrocarbons is detected, but prevent the drainage when the threshold amount of hydrocarbons is not detected.

Referring now to FIGS. 16 to 19, the monitoring system 20 can further include a filter system 100. The filter system 100 can be configured to be placed in fluid communication with the second or outlet conduit 31 of the fluid flow separation chamber 28. For example, the filter system 100 can be configured to be placed downstream of the fluid flow separation chamber 28 with respect to the direction of flow from the fluid flow separation chamber 28. The filter system 100 is configured to prevent hydrocarbons from flowing to the ambient environment in the event that the sensor 34 malfunctions. Thus, the filter system 100 can be considered to be a backup system when placed in fluid communication with the second or outlet conduit 31.

The filter system 100 can include a filter chamber body 102 that defines a chamber inlet 104 and a chamber outlet 106. The filter chamber body 102 can include a base 101, and at least one chamber wall 103 that extends up from the base 101 so as to define a cavity therein. The at least one wall 103 can be an outer wall. At least one, such as both, of the chamber inlet 104 and the chamber outlet 106 can extend through the chamber body 102, such as through the chamber wall 103. The chamber inlet 104 is configured to be placed in fluid communication with the outlet 31 of the fluid flow separation chamber 28. For instance, a conduit 105 can extend from the outlet 31 of the fluid flow separation chamber 28 to the chamber inlet 104. In some examples, the chamber outlet 106 can have a cross-sectional area that is greater than the chamber inlet 104 such that the chamber outlet 106 does not limit a speed of the flow from the chamber inlet 104. The chamber outlet 106 can extend through the at least one chamber wall 103 below a midpoint of the at least one chamber wall 103, such as adjacent to the base 101. As such, the filter chamber body 102 is configured to drain remaining fluid out the chamber outlet 106 when fluid is not flowing into the chamber inlet 104.

An isolation valve 107 can be disposed in the conduit 105 that is configured to move between an open position and a closed position. When in the open position, the isolation valve 107 permits the fluid 22 to flow therethrough and into the filter chamber body 102, and when in the closed position, the isolation valve 107 prevents the fluid 22 from flowing therethrough and into the filter chamber body 102. In one example, the isolation valve 107 can be configured as a manual valve of the type described above. Alternatively, the isolation valve 107 can be configured as an automatic valve of the type described above. The isolation valve 107 can be selectively closed to isolate the filter system 100 from the fluid flow separation chamber 28, such as during maintenance or replacement of one or both of the fluid flow separation chamber 28 and the filter system 100. Note that closing the isolation valve 107 during operation of the monitoring system 20 as fluid is flowing through the fluid flow separation chamber 28 could cause the fluid to fill up within in the fluid flow separation chamber 28, and possibly overflow the at least one outer wall 52 of the fluid flow separation chamber 28. Therefore, the isolation valve 107 can be a normally open valve.

The chamber outlet 106 can be attached to an outlet conduit as desired so as to deliver the fluid to the ambient environment. Alternatively, the filter chamber body 102 can be positioned in the ambient environment and outlet the fluid directly from the chamber outlet 106 to the ambient environment. The filter system 100 can define at least one fluid flow path 108 that extends between the chamber inlet 104 to the chamber outlet 106. Thus, the fluid that exits the fluid flow separation chamber 28 can travel into the chamber inlet 104, through the at least one chamber fluid flow path 108, and out the chamber outlet 106.

The filter system 100 can include at least one hydrocarbon filter 110 disposed in the chamber body 102. Each hydrocarbon filter 110 can disposed in a chamber fluid flow path 108 in the chamber body 102. Each fluid flow path 108 defines a path that extends to or through a respective one of hydrocarbon filters 110. Accordingly, the fluid that enters the filter chamber body 102 from the fluid flow separation chamber 28 travels through the at least one hydrocarbon filter 110. The hydrocarbon filter 110 includes filtration media that is configured to remove and retain hydrocarbons from the fluid. Accordingly, during normal operation, the fluid that enters the filter chamber body 102 from the fluid flow separation chamber 28 is free of hydrocarbon contaminants. Thus, the fluid travels through the at least one hydrocarbon filter 110 and out the chamber outlet 106.

However, in the event that the hydrocarbon sensor 34 malfunctions and allows hydrocarbon-containing fluid to exit the separation chamber 28, the at least one hydrocarbon filter 110 can remove and retain the hydrocarbons from the fluid. Accordingly, the fluid that exits the chamber outlet 106 can be free from hydrocarbons. It is recognized that, as the hydrocarbon filter 110 accumulates hydrocarbons from the fluid, the filter 110 becomes less pervious to fluid flow therethrough. In the event that the filtration media becomes saturated with hydrocarbons, the filtration media of the filter 110 is configured to create a barrier that prevents any fluid to pass through the filter 110. Thus, when each of the hydrocarbon filters 110 is saturated with hydrocarbons, the fluid is prevented from travelling through the respective fluid flow path 108 to the chamber outlet 106. Further, when all of the hydrocarbon filters 110 are saturated with hydrocarbons, the fluid is preventing from traveling to all of the fluid flow paths 108 to the chamber outlet 106. Thus, as fluid continues to pass from the fluid flow separation chamber 28 into the filter system 100, the fluid level in the filter chamber body 102 rises until the chamber body 102 is filled with fluid. Once the filter chamber body 102 is filled, the fluid pressure will cause the fluid level to rise in the fluid flow separation chamber 28.

Figure 20:
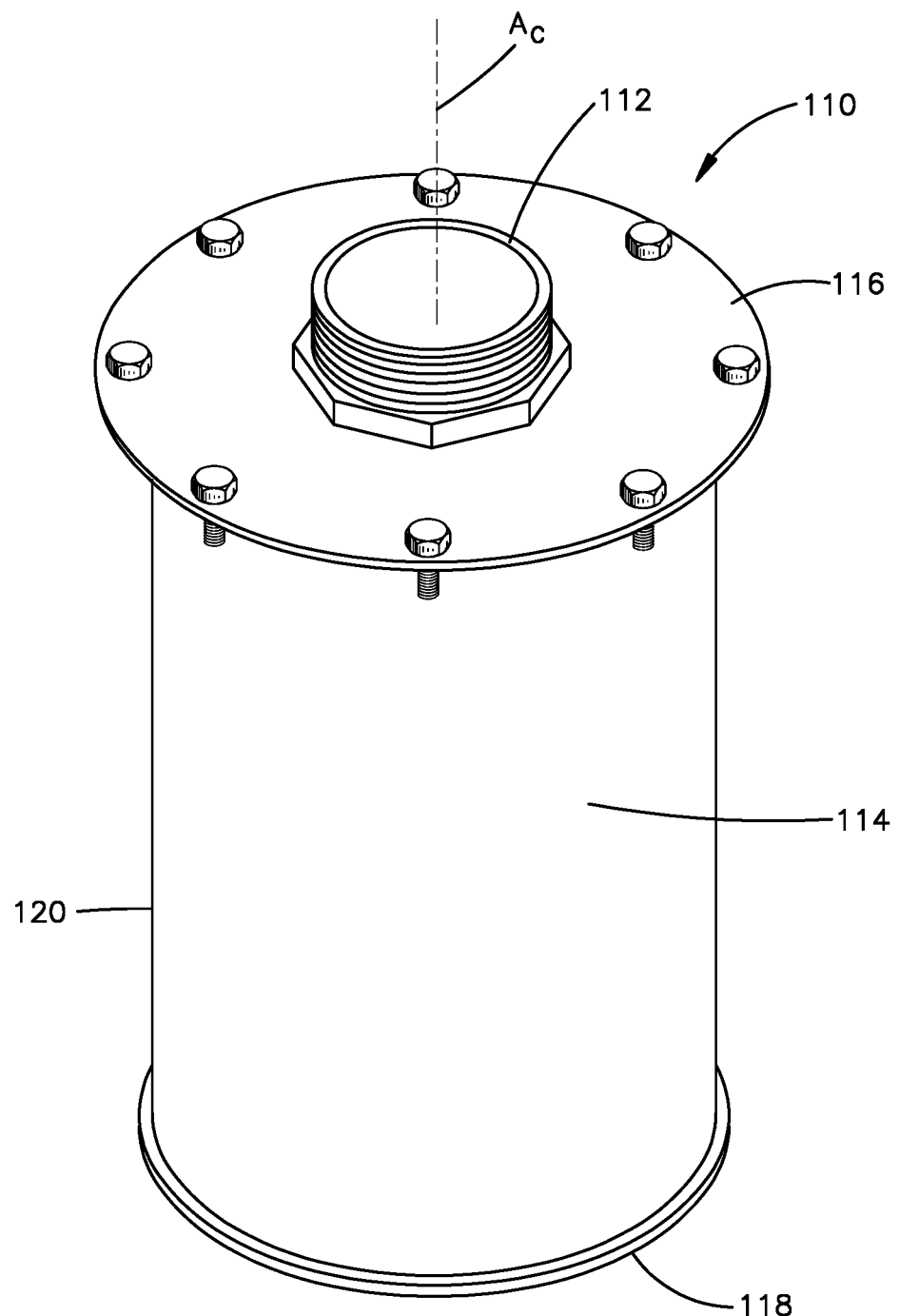
FIG. 20 is a perspective view of one of the filters of the filter system of FIG. 16.

It should be appreciated that any suitable filter can be used. In one example, the hydrocarbon filter 110 can be configured as a VIPOR 100 filter commercially available from C.I Agent Solutions® having a place of business in Louisville, Ky. FIG. 20 shows an example hydrocarbon filter 110. The hydrocarbon filter 110 has a filter inlet 112 that is configured to be placed in fluid communication with the chamber inlet 104. The hydrocarbon filter 110 has a filtration media 114 that is in fluid communication with the filter inlet 112. The filter inlet 112 can be configured to direct the fluid flow from the chamber inlet 104 into an interior of the filtration media 114. For example, the filter inlet 112 can define an opening that is open to the interior of the filtration media 114. The filter inlet 112 can define a central axis $A_C$. The filter inlet 112 can be configured to direct the fluid to flow into an interior of the filtration media 114 along the central axis $A_C$. In one example, the filter inlet 112 can include a conduit that defines the opening, although embodiments of the disclosure are not so limited.

The hydrocarbon filter 110 can have a first end 116, and a second end 118 offset the first end 116. The filter 110 can have at least one outer wall 120 that extends between the first end 116 and the second end 118. The filter inlet 112 can be disposed at the first end 116. The hydrocarbon filter 110 can have an outlet that can be defined by one or both of the at least one outer wall 120 and the second end 118. Thus, the hydrocarbon filter 110 can be configured to discharge the fluid out one or both of (i) the at least one outer wall 120 and (ii) the second end 118. For example, the hydrocarbon filter 110 can be configured such that fluid flows from the filter inlet 112 to the filtration media 114, and then out of the at least one outer wall 120 of the hydrocarbon filter 110 that extends between the first and second ends 116 and 118 of the hydrocarbon filter 110. In at least one such example, the filtration media 114 can define the at least one outer wall 120 of the hydrocarbon filter 110. The hydrocarbon filter 110 can additionally, or alternatively, be configured such that the fluid flows out of the second filter end 118. For example, the hydrocarbon filter 110 can be configured such that fluid flows from the filter inlet 112 to the filtration media 114, through the filtration medial 114, and then out of an outlet at the second end 118 of the filter hydrocarbon 110. In at least one such example, the hydrocarbon filter 110 can include a housing that defines the at least one outer wall 120 and a cavity therein that houses the filtration media 114.

The first and second ends 116 and 118 can be offset from one another along a central axis $C_A$. Thus, the hydrocarbon filter 110 can be configured such that the fluid flows out of the hydrocarbon filter 110 along at least one of (i) a radial direction that extends radially out from the central axis $A_C$ in the case that the fluid flows out of the at least one outer wall 120 and (ii) an axial direction that extends along the central axis $A_c$ in the case that the fluid flows out of the second end 118. In alternative embodiments, the hydrocarbon filter 110 can define a non-linear path from the first end 116 to the second end 118. Thus, the hydrocarbon filter 110 can be configured to discharge fluid along a direction that is aligned with the axial direction or along a direction that is angularly offset from the axial direction.

Returning to FIGS. 16 to 19, the monitoring system 20 can include at least one fluid level sensor 122. The at least one fluid level sensor 122 can be disposed in at least one of the filter chamber body 102 and the fluid flow separation chamber 28. For example, the at least one fluid level sensor 122 can include a fluid level sensor that is disposed in the filter chamber body 102. Additionally, or alternatively, the at least one fluid level sensor 122 can include a fluid level sensor that is disposed in the fluid flow separation chamber 28. In one example, each fluid level sensor 122 can be configured as a float that remains at the top surface of the fluid in the at least one of the filter chamber body 102 and the fluid flow separation chamber 28. When the fluid level sensor 122 senses that the fluid level has exceeded a predetermined threshold level, the sensor 122 can output an alarm signal. The alarm signal can be transmitted over a hard wire, or wirelessly as desired. The alarm signal can be received by a processor that, in response to the alarm signal, sends command signals to one or more peripheral devices, for instance to close a valve that at least reduces or halts the flow of the fluid through the fluid flow separation chamber 28. For instance, the valve can be defined by the automatic inlet valve 80 described above. When the valve is closed, fluid is prevented from entering the fluid flow separation chamber 28. The command signals can be communicated over a hard wire, or wirelessly as desired. Alternatively, the peripheral devices can include a processor that receives the signal directly from the fluid level sensor 122 and, in response to the signal, activates an alarm condition. For instance, the peripheral devices can include at least one audio alarm 62 (labeled in FIG. 9), at least one visual alarm 64 (labeled in FIG. 9), and at least one remote transmitter 66 (labeled in FIG. 9) configured to transmit a remote alarm. The audio alarm 62 can be disposed local to the fluid flow separation chamber 28. Alternatively, the audio alarm 62 can be located remote from the fluid flow separation chamber 28, for instance in a control room.

It is recognized that, as the filters 110 entrap hydrocarbons, the fluid flow rate through the filters 110 can be reduced. Thus, the fluid level can reach the predetermined filters 110 even though fluid is flowing from the chamber inlet 104 to the chamber outlet 106 through the filters 110. Accordingly, in one example, when the fluid level sensor 122 senses that the fluid level has exceeded the predetermined threshold, the valve 80 can be actuated toward the closed position but not closed, thereby reducing the flow of fluid into the fluid flow separation chamber 28, and consequently reducing the fluid flow level in the fluid flow separation chamber 28. As the volume of hydrocarbons accumulates in the filters 110, the monitoring system 20 can continue to close the valve 80 to reduce the fluid level until the filters 110 have become saturated with hydrocarbons, at which point the valve 80 can be completely closed. It should be appreciated that, instead of moving the valve 80 only towards the closed position to reduce the fluid flow into the fluid flow separation chamber 28, the valve 80 can alternatively be selectively modulated between the fully open position and the fully closed position as the fluid level rises and lowers so as to control the fluid flow rate into the fluid flow separation chamber 28.

In one example, the filter system 100 can include a plurality of fluid flow paths 108 in the filter chamber body 102. Further, the filter system 100 can include a hydrocarbon filter 110 disposed in each of the fluid flow paths 108 in the manner described above. Each fluid flow path 108 can define a direction of fluid flow into and through a respective one of the hydrocarbon filters 110. At least portions of the fluid flow paths 108, such as the portions that extend into the inlets of the hydrocarbon filters 110, can be arranged substantially in parallel with each other. For example, the inlets of the hydrocarbon filters 110 can have central axes $A_c$ that are parallel to one another. However, embodiments of the disclosure are not so limited.

The filter system 100 can direct the fluid to flow from the chamber inlet 104 to a first subset of at least one fluid flow paths 108, and hence into the hydrocarbon filters 110 of the fluid flow paths 108 of the first subset. It will be understood that, as used herein, a "subset" can include as few refer as one flow path 108 (i.e., a singleton or unit set), or include more than one flow path 108. The filter system 100 can be configured such that once each hydrocarbon filter 110 of the first subset has become saturated with hydrocarbons, each hydrocarbon filter 110 of the first subset prevents the fluid from flowing therethrough so as to divert the fluid to flow to a second subset of at least one of the fluid flow paths 108. Once each hydrocarbon filter 110 of the second subset has become saturated with hydrocarbons, each hydrocarbon filter 110 of the second subset prevents the fluid from flowing therethrough, and the system 100 can divert the fluid to flow to a third subset of at least one of the fluid flow paths 108 or the chamber outlet 106. Hence, the filter system 100 can be configured such that the fluid flow is diverted to a subsequent subset of at least one of the fluid flow paths 108 when each hydrocarbon filter 110 of a preceding subset of at least one of the fluid flow paths 108 is saturated with hydrocarbons. Note that the subsets can be disjoint sets such that each subset excludes the fluid flow paths 108 of the other subsets. In some situations, such as when the flow rate of the fluid to a preceding subset of at least one of the fluid flow paths 108 exceeds the flow rate that can be processed through the at least one hydrocarbon filter of the preceding subset, the excess fluid flow could be diverted to a subsequent subset of at least one of the fluid flow paths 108. Thus, in some situations, such as when the fluid flow rate is relatively high, the fluid could flow to two or more, up to all, of the subsets of fluid flow paths 108.

The fluid flow can continue to be diverted from a current at least one fluid flow path 108 to another at least one fluid flow path 108 when the at least one hydrocarbon filter 110 of the current at least one fluid flow path 108 becomes saturated with hydrocarbons. The fluid flow paths 108, and hence the filter system 100, can be configured in any suitable manner to sequentially divert the fluid flow from each at least one current fluid flow path 108 to each at least one subsequent fluid flow path 108. Directing the fluid to only a subset of the hydrocarbon filters 110 at a time, before directing the fluid to the remaining filters 110, can prevent the remaining hydrocarbon filters 110 from becoming saturated with hydrocarbons before the subset of hydrocarbons filters 110 is saturated with hydrocarbons. Once all hydrocarbon filters 110 of all fluid flow paths 108 become saturated with hydrocarbons, the fluid level in the filter chamber body 102 and the fluid flow separation chamber 28 can rise in the manner described above. The fluid level sensor 122 can be positioned in a final set of one or more of the fluid flow paths 108. Thus, once the fluid level in the final set of one or more of the fluid flow paths reaches the threshold, the sensor 122 can send the alarm signal to the processor or peripheral device in the manner described above.

Figure 17:
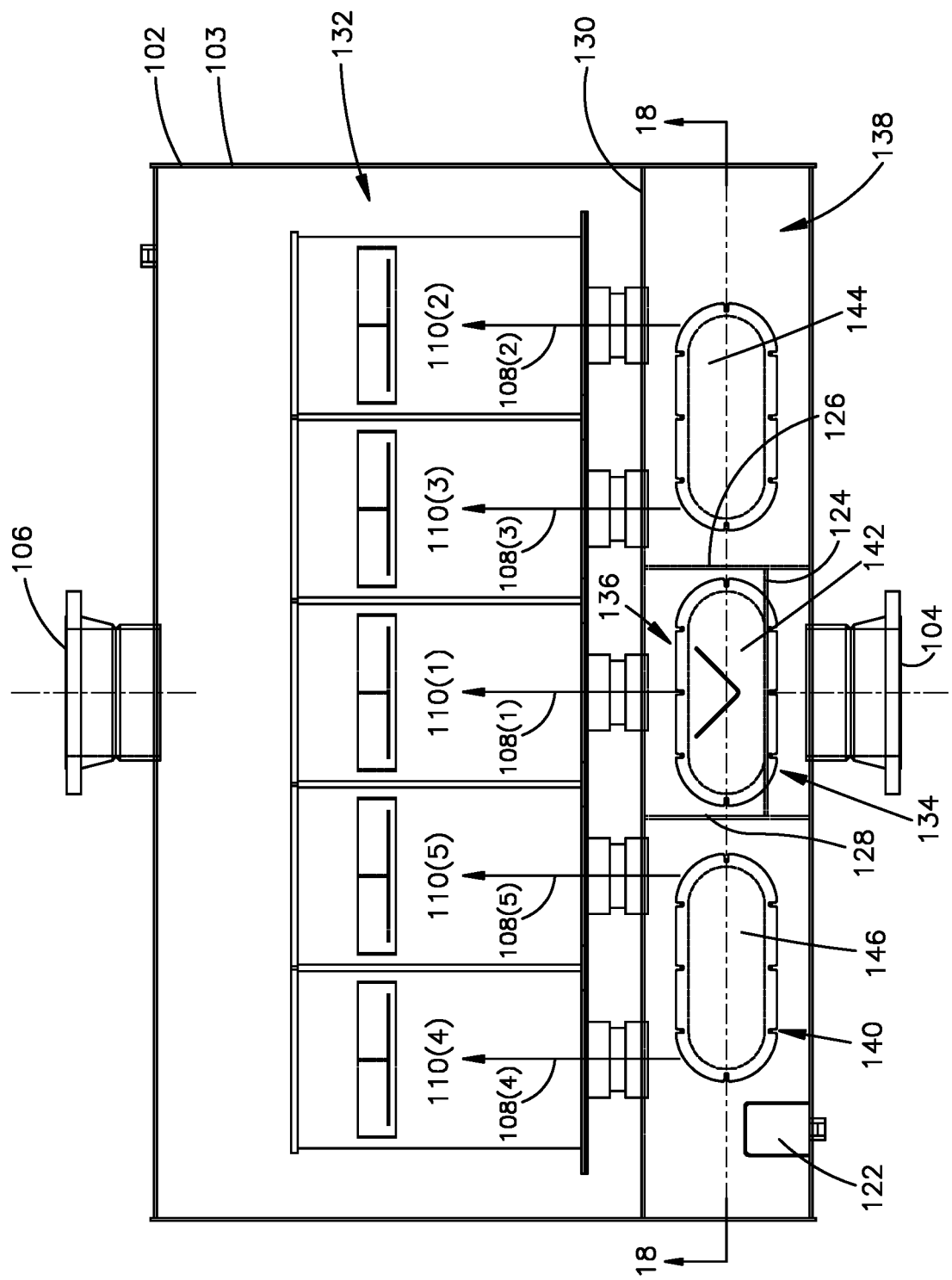
FIG. 17 is a top plan view of a filter chamber of the filter system of FIG. 16.
Figure 18:
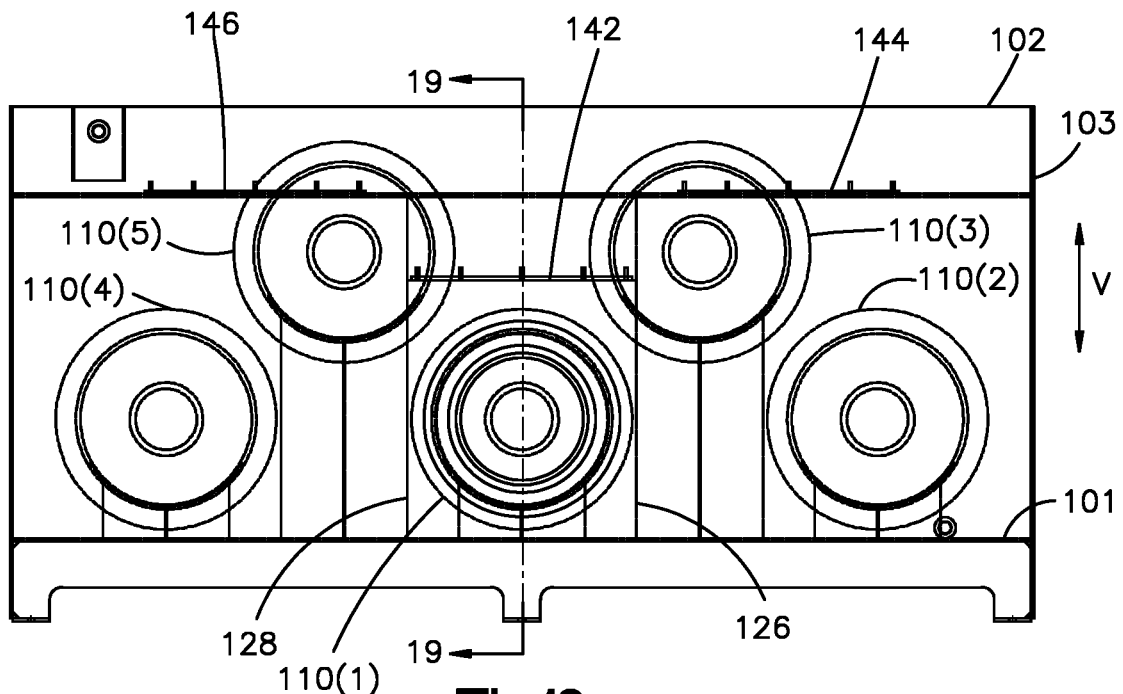
FIG. 18 is a cross-sectional view of the filter chamber of FIG. 17 along the line 18-18.
Figure 19:
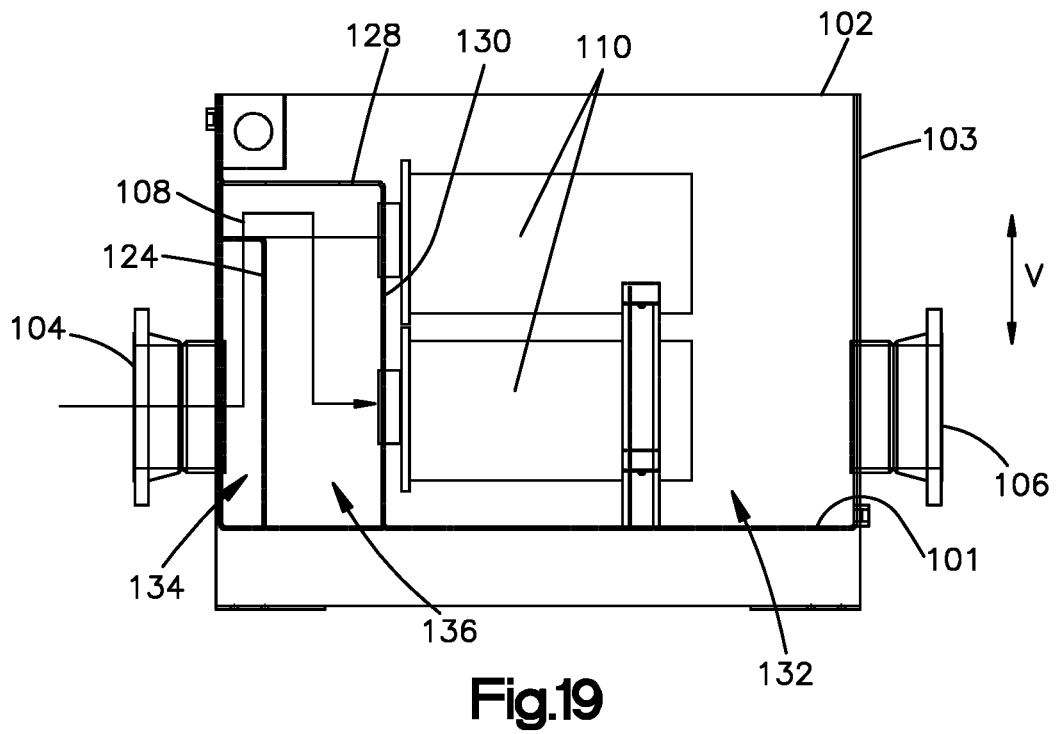
FIG. 19 is a cross-sectional view of the filter chamber of FIG. 18 along the line 19-19.

Referring more specifically to FIGS. 17 to 19, one example is shown in which the filter system 100 is configured to direct fluid sequentially to each subsequent subset of fluid flow paths 108 from a preceding subset of fluid flow paths 108. It will be understood that the filter system 100 can be configured in any suitable alternative manner to direct fluid sequentially to each subsequent fluid flow path 108 from a preceding fluid flow path 108. To direct fluid sequentially to the fluid flow paths 108, the filter chamber system 100 can define at least one, such as a plurality, of channels (e.g., 132, 134, 136, and 138) in the filter chamber body 102. The channels can at least partially define the fluid flow paths 108.

The filter system 100 can include at least one, such as a plurality, of baffles (e.g., 124, 126, 128, and 130) that at least partially define the at least one channel. In one example, the at least one baffle can extend from the base 101 of the filter chamber body 102 toward the top of the filter chamber body 102. At least some of the baffles can terminate below the ceiling to allow for fluid to be diverted from the current channel to the another one of the channels. In particular, the fluid can cascade over one or more of the baffles so as to divert from the current channel to the another channel. In one example, the fluid level in the current channel can rise to a level above the baffle that divides the current channel from the another channel. Thus, the fluid can travel into the another channel. It should be appreciated that the baffles can be configured to direct the fluid to flow into the another channel at a location upstream of the respective hydrocarbon filter 110. Thus, none of the fluid is able to travel to the chamber outlet 106 without first flowing through one of the hydrocarbon filters 110.

Additionally, or alternatively, to the at least one channel, one or more of the hydrocarbon filters 110 can be offset from one or more others of the hydrocarbon filters 110 with respect to a vertical direction V. The filter system 100 can be configured to direct the fluid to flow to the one or more lower filters 110 before directing the fluid to a subset one or more higher filters 110. Once the one or more lower filters 110 become saturated with hydrocarbons, the fluid level rises in the chamber body 102 to the one or more higher filters 110. For example, as illustrated in FIG. 18, a lower filter 110(2) can be offset below a subsequent higher filter 110(3) such that fluid flows to the lower filter 110(2) before flowing to the subsequent higher filter 110(3). Once the lower filter 110(2) is saturated with hydrocarbons, the fluid level can rise within the filter chamber body 102 to the subsequent higher filter 110(3) such that the fluid flows to the subsequent higher filter 110(3). Similarly, a lower filter 110(4) can be offset below a subsequent higher filter 110(5) such that fluid flows to the lower filter 110(4) before flowing to the subsequent higher filter 110(5). Once the lower filter 110(4) is saturated with hydrocarbons, the fluid level can rise within the filter chamber body 102 to the subsequent higher filter 110(5) such that the fluid flows to the subsequent higher filter 110(5).

The plurality of channels, and hence the filter system 100, can define at least one outlet channel in the filter chamber body 102. The filter system 100 can include at least one outlet baffle 130 that at least partially defines the outlet channel 132. The outlet channel 132 can be in communication with the chamber outlet 106. The outlets of each of the at least one hydrocarbon filter 110 can be in fluid communication with, such as open to, the outlet channel 132. For example, one or both of the at least one outer wall 120 (labeled in FIG. 20) and the second end 118 (labeled in FIG. 20) can be disposed in the outlet channel 132. Thus, each of the at least one hydrocarbon filters 110 can be positioned to discharge the fluid to the outlet channel 132.

The filter system 100 can define at least one inlet channel, such as a plurality, of inlet channels in the filter chamber body 102. The at least one outlet baffle 130 can separate the at least one outlet channel 132 from the at least one inlet channel. Each of the at least one inlet channel can be in fluid communication with at least one hydrocarbon filter 110. For example, the at least one inlet channel can include a first inlet channel 136 that is configured to direct the fluid to flow to a first subset of at least one of the fluid flow paths 108. The first inlet channel 136 can be in fluid communication with each hydrocarbon filter 110 of the first subset of at least one of the fluid flow paths 108. The inlet of each hydrocarbon filter 110 of the first subset can be open to the first inlet channel 136. The first subset can include a first fluid flow path 108(1) that includes a first hydrocarbon filter 110(1). Thus, the filter system 100 can define a first fluid flow path 108(1), at least a portion of which extends from the first inlet channel 136 to the hydrocarbon filter 110(1) of the first fluid flow path 108(1). It will be understood that the first subset could include additional fluid flow paths (not shown), and hence additional hydrocarbon filters 110, in addition to the first fluid flow path 108(1).

The first inlet channel 136, and hence the filter system 100, can be configured to direct the fluid flow to the first subset of fluid flow paths 108 before the fluid is directed to another subsets of fluid flow paths 108. In other words, the system 100 can be configured to direct the fluid to flow to other subsets of fluid flow paths 108 only after each hydrocarbon filter 110 of the first subset has become saturated with hydrocarbons. For example, the system 100 can be configured such that the fluid flow is directed to the hydrocarbon filter 110(1) of the first fluid flow path 108(1) before the fluid is directed to the hydrocarbon filters of other fluid flow paths 108(2), 108(3), 108(4), and 108(5). Note that, in alternative embodiments, the filter system 100 can include a plurality of hydrocarbon filters 110 that are in fluid communication with, such as open to, the first inlet channel 136. In such embodiments, the plurality of hydrocarbon filters 110 can be vertically aligned with one another such that the first inlet channel 136 directs the fluid to the plurality of hydrocarbons 110 concurrently, or can be vertically offset from one another such that the first inlet channel 136 directs the fluid to each lower hydrocarbon filter 110 of the plurality before flowing to each higher hydrocarbon filter 110 of the plurality.

The at least one inlet channel can include a second inlet channel 138 that is adjacent the first inlet channel 136. The first and second inlet channels 136 and 138 can be separated by a first inlet baffle 126. Thus, the first inlet baffle 126 can disposed between the first and second inlet channels 136 and 138. The second inlet channel 138 can be in fluid communication with each hydrocarbon filter 110(2) of a second subset of at least one of the fluid flow paths 108(2). For example, the second inlet channel 138 can be configured to direct the fluid to flow to the second subset of at least one of the fluid flow paths 108(2). Thus, the second inlet channel 138 can be in fluid communication with each hydrocarbon filter 110(2) of the second subset of at least one of the fluid flow paths 108(2). The inlet of each hydrocarbon filter 110(2) of the second subset can be open to the second inlet channel 138. The second subset can include a second fluid flow path 108(2) that includes a second hydrocarbon filter 110(2). Thus, the filter system 100 can define a second fluid flow path 108(2), at least a portion of which extends from the second inlet channel 138 to the hydrocarbon filter 110(2) of the second fluid flow path 108(2). It will be understood that the second subset could include additional fluid flow paths (not shown), and hence additional hydrocarbon filters 110, in addition to the second fluid flow path 108(2).

The filter system 100 can be configured to divert the fluid flow to the second subset of at least one of the fluid flow paths 108 once each hydrocarbon filter 110 of the first subset is saturated with hydrocarbons. In particular, once each hydrocarbon filter 110 of the first subset is saturated with hydrocarbons, the first inlet channel 136 can fill with fluid until the fluid cascades over the first inlet baffle 126 to the second inlet channel 138. The fluid can then flow to each hydrocarbon filter 110 of the second subset. It will be noted that, in some situations, such as when the flow rate of the fluid to the at least one hydrocarbon filter 110(1) in the first subset of at least one of the fluid flow paths 108 exceeds the flow rate that can be processed through the at least one hydrocarbon filter 110(1), the first inlet channel 136 can fill with the fluid until the fluid cascades over the first inlet baffle 126 to the second inlet channel 138.

The second inlet channel 138 can be in fluid communication with each hydrocarbon filter 110(3) of another subset of at least one of the fluid flow paths 108(3). The inlet of each hydrocarbon filter 110(3) of the another subset can be open to the second inlet channel 138. The filter system 100 can be configured to divert the fluid flow to the another subset of the fluid flow paths 108(3) once each hydrocarbon filter 110(2) of the second subset of the fluid flow paths 108(2) is saturated with hydrocarbons. For example, the another subset can include at least one higher hydrocarbon filter 110(3) that is disposed higher than each hydrocarbon filter 110(2) of the second subset of the fluid flow paths 108(2) with respect to the vertical direction V. Once each hydrocarbon filter 110(2) of the second subset is saturated with hydrocarbons, the second inlet channel 138 can fill with fluid until the fluid level in the second inlet channel 138 reaches the inlet of each higher hydrocarbon filter 110(3) of the another subset of the fluid flow paths 108(3). The fluid can then flow to each hydrocarbon filter 110(3) of the another subset of the fluid flow paths 108(3). Thus, the filter system 100 can define another fluid flow path 108(3), at least a portion of which extends from the second inlet channel 138 to the hydrocarbon filter 110(3) of the another fluid flow path 108(3).

As shown, the another fluid flow path 108(3) can be disposed between the first and second fluid flow paths 108(1) and 108(2). Thus, the higher filter 110(3) of the another fluid flow path 108(3) can be disposed between the filter 110(1) of the first fluid flow path 108(1) and the lower filter 110(2) of the second fluid flow path 108(2). However, in alternative embodiments, the second fluid flow path 108(2) can be disposed between the first fluid flow path 108(1) and the another fluid flow path 108(3). Thus, the lower filter 110(2) of the second fluid flow path 108(2) can be disposed between the filter 110(1) of the first fluid flow path 108(1) and the higher filter 110(3) of the another fluid flow path 108(3). In still other embodiments, the higher and lower filters 110(3) and 110(2) of the subsets can be interspersed with one another. In yet still other embodiments, the filter 110(2) of the second fluid flow path 108(2) can be aligned with the filter 110(3) of the another fluid flow path 108(3) respect to the vertical direction V.

Similarly, the at least one inlet channel can include a third inlet channel 140. The third inlet channel 140 can be adjacent the first inlet channel 136, opposite the second inlet channel 138. Thus, the first inlet channel 136 can be disposed between the second and third inlet channels 138 and 140. In other words, the first inlet channel 136 can be disposed such that the second and third inlet channels 138 and 140 are disposed on opposed sides of the first inlet channel 136, and thus between the first inlet channel 136 and each of the sides of the filter chamber body 102. The first and third inlet channels 136 and 140 can be separated by a second inlet baffle 128. Thus, the second inlet baffle 128 can disposed between the first and third inlet channels 136 and 140. The third inlet channel 140 can be in fluid communication with each hydrocarbon filter 110 of a third subset of at least one of the fluid flow paths 108(4). For example, the third inlet channel 140 can be configured to direct the fluid to flow to the third subset of at least one of the fluid flow paths 108. Thus, the third inlet channel 140 can be in fluid communication with each hydrocarbon filter 110(4) of the third subset of at least one of the fluid flow paths 108(4). The inlet of each hydrocarbon filter 110(4) of the third subset can be open to the third inlet channel 140. The third subset can include a third fluid flow path 108(4) that includes a third hydrocarbon filter 110(4). Thus, the filter system 100 can define a third fluid flow path 108(3), at least a portion of which extends from the third inlet channel 140 to the hydrocarbon filter 110(4) of the third fluid flow path 108(4). It will be understood that the third subset could include additional fluid flow paths (not shown), and hence additional hydrocarbon filters 110, in addition to the third fluid flow path 108(4).

The filter system 100 can be configured to divert the fluid flow to the third subset of at least one of the fluid flow paths 108(4) once each hydrocarbon filter 110(4) of the third subset is saturated with hydrocarbons. In particular, once each hydrocarbon filter 110(4) of the third subset is saturated with hydrocarbons, the first inlet channel 136 can fill with fluid until the fluid cascades over the second inlet baffle 128 to the third inlet channel 140. The fluid can then flow to each hydrocarbon filter 110(4) of the fourth subset.

The third inlet channel 140 can be in fluid communication with each hydrocarbon filter 110(5) of yet another subset of at least one of the fluid flow paths 108(5). The inlet of each hydrocarbon filter 110(5) of the yet another subset can be open to the third inlet channel 140. The filter system 100 can be configured to divert the fluid flow to the yet another fluid flow path 108(5) once each hydrocarbon filter 110(4) of the third subset of the fluid flow paths 108(4) is saturated with hydrocarbons. For example, the yet another subset can include at least one higher hydrocarbon filter 110(5) that is disposed higher than each hydrocarbon filter 110(4) of the third subset of the fluid flow paths 108(4) with respect to the vertical direction V. Once each hydrocarbon filter 110(4) of the third subset is saturated with hydrocarbons, the third inlet channel 140 can fill with fluid until the fluid level in the third inlet channel 140 reaches the inlet of each higher hydrocarbon filter 110(5) of the yet another subset of the fluid flow paths 108(5). The fluid can then flow to each hydrocarbon filter 110(5) of the yet another subset of the fluid flow paths 108(5). Thus, the filter system 100 can define yet another fluid flow path 108(5), at least a portion of which extends from the third inlet channel 140 to the hydrocarbon filter 110(5) of the yet another fluid flow path 108(5).

As shown, the yet another fluid flow path 108(5) can be disposed between the first and third fluid flow paths 108(1) and 108(4). Thus, the higher filter 110(5) of the yet another fluid flow path 108(5) can be disposed between the filter 110(1) of the first fluid flow path 108(1) and the lower filter 110(4) of the third fluid flow path 108(4). However, in alternative embodiments, the third fluid flow path 108(4) can be disposed between the first fluid flow path 108(1) and the yet another fluid flow path 108(5). Thus, the lower filter 110(4) of the third fluid flow path 108(4) can be disposed between the filter 110(1) of the first fluid flow path 108(1) and the higher filter 110(5) of the yet another fluid flow path 108(5). In still other embodiments, the higher and lower filters 110(5) and 110(4) of the subsets can be intersperse with one another. In yet still other embodiments, the filter 110(4) of the third fluid flow path 108(4) can be aligned with the filter 110(5) of the yet another fluid flow path 108(5) respect to the vertical direction V.

It is recognized that the fluid can be directed to flow through the fluid flow paths 108 in any alternative manner as desired. For instance, the filter system 100 can alternatively direct the fluid through a plurality of the fluid flow paths 108, such as all of the plurality of the fluid flow paths 108, in parallel as desired. Thus, respective portions of the fluid can flow simultaneously through different ones of the hydrocarbon filters 110. It should thus be appreciated that the fluid can flow sequentially through the fluid flow paths 108. Alternatively, the fluid can flow in parallel through the fluid flow paths 108 as desired.

Figure 21:
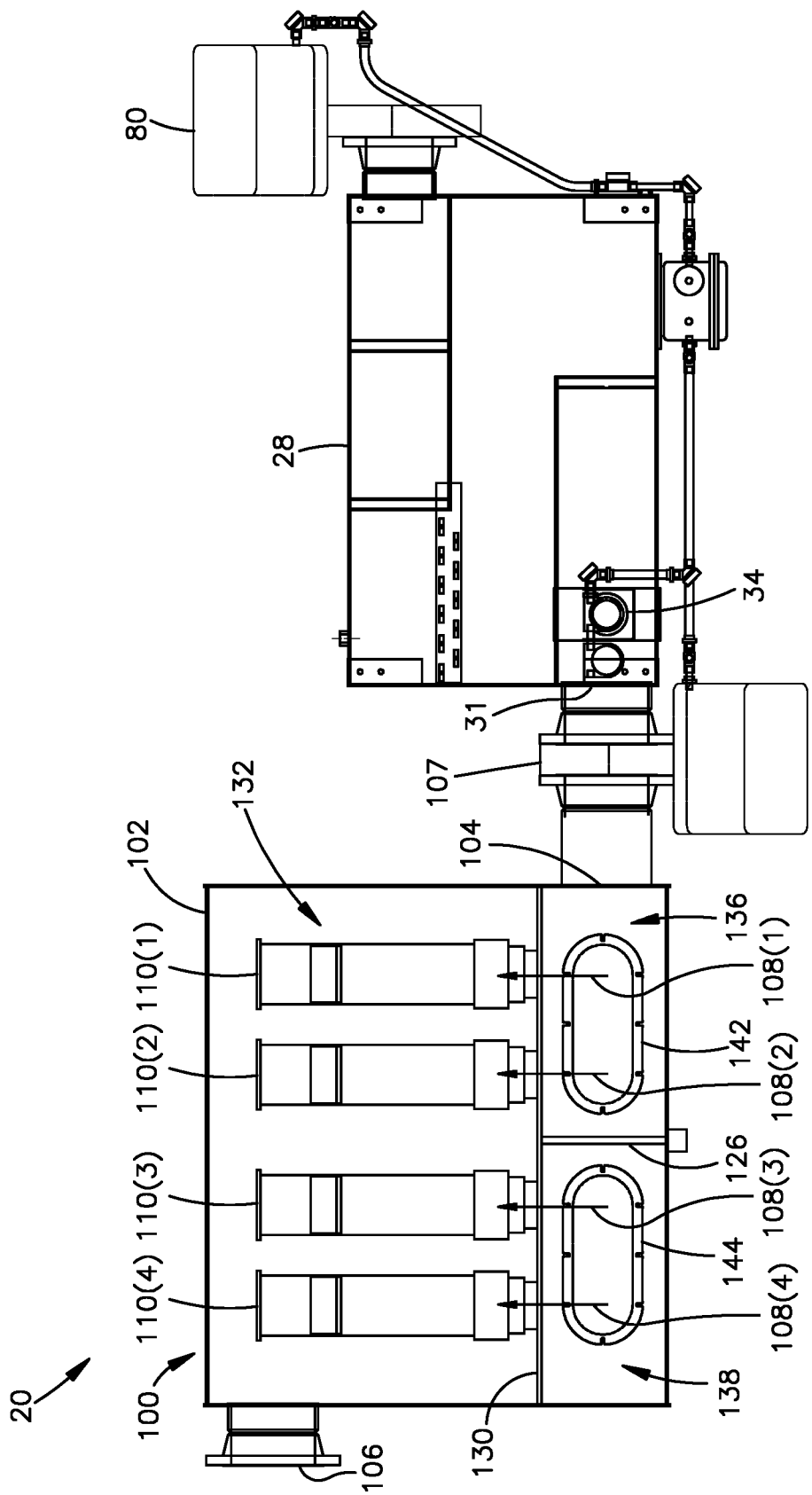
FIG. 21 is a top plan view of a monitoring system constructed in accordance with an alternative example.
Figure 22:
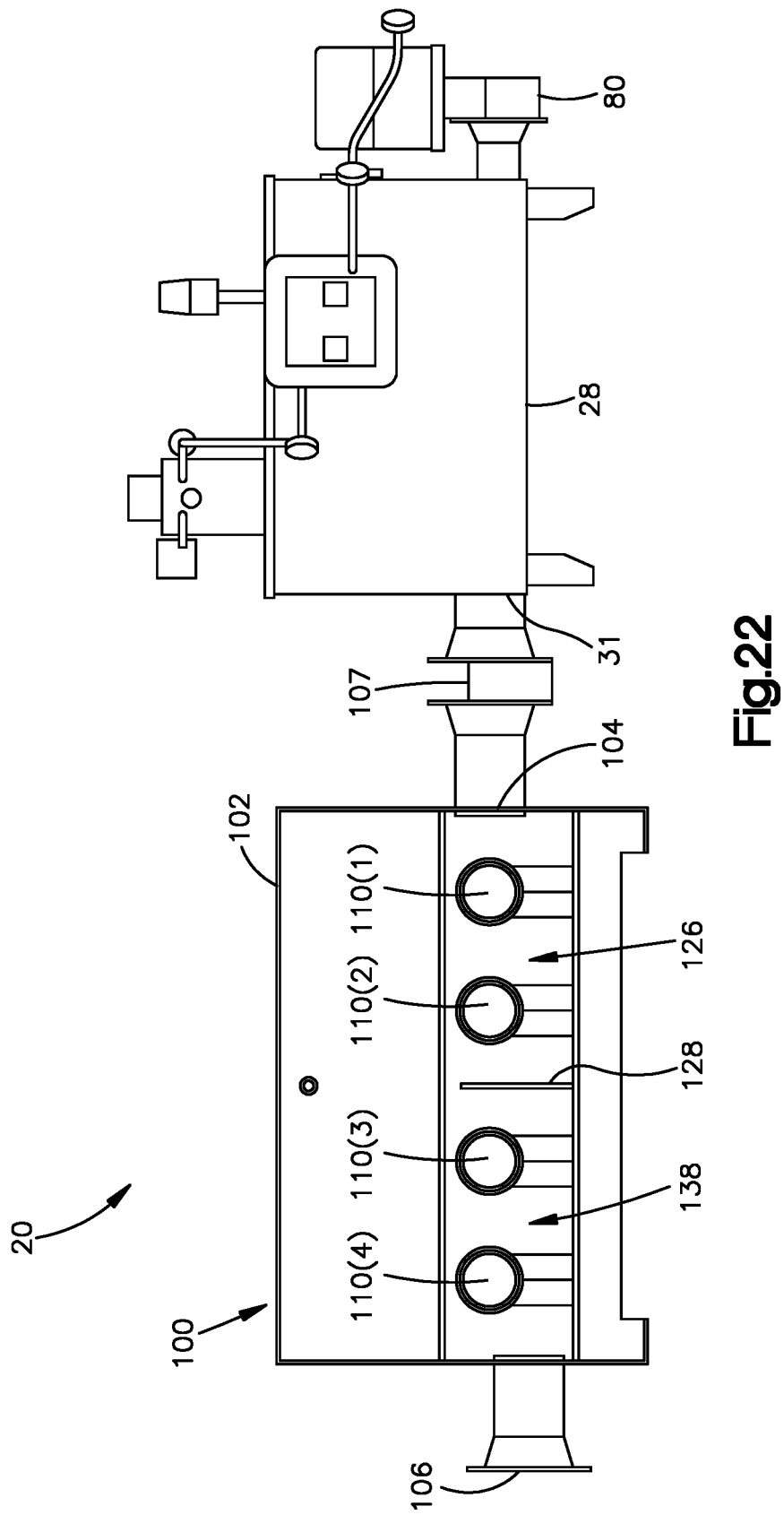
FIG. 22 is a side elevation view of the filter system of FIG. 21 with a wall of the filter chamber hidden to show an interior of the filter chamber.

Turning briefly to FIGS. 21 and 22, in an alternative example, a first subset of at least one of the fluid flow paths 108(1), 108(2) can be disposed at one side of the filter chamber body 102, and one or more subsequent subsets of at least one of the fluid flow paths 108(3), 108(4) can be disposed adjacent the first subset in sequential order in a direction towards the other side of the filter chamber body 102. The filter system 100 can include a first inlet channel 136 that can be disposed at one side of the filter chamber body 102, and one or more subsequent channels 138 that can be disposed adjacent the first inlet channel 136 in sequential order in a direction towards the other side of the filter chamber body 102. The first inlet channel 136 and second inlet channel 138 can be separated by a first inlet baffle 126.

The filter system 100 can be configured such that the fluid flows from the chamber inlet 104 to the first fluid channel 136, and from the first fluid channel 136 along the at least one of the fluid flow paths 108(1), 108(2) of the first subset. The filter system 100 shown in FIG. 21 defines first and second fluid flow paths 108(1) and 108(2) that extend from the first inlet channel 136. However, in alternative embodiments, the system 100 can have more than or fewer than two fluid flow paths 108 that extend from the first inlet channel 136. Moreover, the hydrocarbon filters 110(1), 110(2) in communication with the first inlet channel 136 can be vertically aligned with one another or offset vertically from one another in a manner similar to that described above with regards to hydrocarbon filters 110(2) and 110(3) in FIGS. 16 to 19.

Once each hydrocarbon filter 110(1), 110(2) of the first subset of the fluid flow paths 108(1), 108(2) becomes saturated with hydrocarbons and the first inlet channel 136 becomes filled, the fluid flows over the first inlet baffle 126 to the second inlet channel 138, and from the second inlet channel 138 to a second subset of at least one of the fluid flow paths 108(3), 108(4). For example, the filter system 100 shown in FIG. 21 defines third and fourth fluid flow paths 108(3) and 108(4) that extend from the second inlet channel 138. However, in alternative embodiments, the system 100 can have more than or fewer than two fluid flow paths 108 that extend from the second inlet channel 138. Moreover, the hydrocarbon filters 110(3), 110(4) in communication with the second inlet channel 138 can be vertically aligned with one another or offset vertically from one another in a manner similar to that described above with regards to hydrocarbon filters 110(2) and 110(3) in FIGS. 16 to 19.

Although not shown, the filter system 100 can have at least one subsequent inlet channel adjacent the second inlet channel 138 such that the second inlet channel 138 is between the first inlet channel 136 and the subsequent inlet channel. In such examples, a subsequent inlet baffle can be between the second inlet channel 138 and the at least one subsequent inlet channel. When the hydrocarbon filters 110(3), 110(4) becomes saturated with hydrocarbons and the second inlet channel 138 becomes filled, the fluid flows over the subsequent inlet baffle to the at least one subsequent inlet channel and to a subsequent subset of at least one of the fluid flow paths.

Returning to FIGS. 17 to 19, the monitoring system 20 can further include at least one particulate filter (e.g., 142, 144, 146) that is configured to remove coarse particulates, such as silt, from the fluid in order to avoid clogging the at least one hydrocarbon filter 110 with silt. In one example, the at least one particulate filter can be positioned in the fluid flow separation chamber 28 proximate to the inlet to capture silt in the fluid prior to directing the fluid into any of the at least one hydrocarbon filter 110. Additionally, or alternatively, the at least one particulate filter can be disposed in the filter chamber body 102. For instance, the at least one particulate filter can be positioned adjacent the chamber inlet 104 so as to direct the fluid through the at least one particulate filter prior to directing the fluid flow into the at least one hydrocarbon filter 110.

In one example, as shown in FIG. 17, the at least one particulate filter can include a first particulate filter 142 disposed over the first inlet channel 136. The filter system 100 can be configured to direct the fluid to flow through the particulate filter 142 to the first inlet channel 136. For example, the filter system 100 can define a channel 134 in the filter chamber body 102 that is configured to direct the fluid to flow to the particulate filter 142. The channel 134 can be at least partially defined by a baffle 124 that separates the channel 134 from the first inlet channel 136. The filter system 100 can be configured such that, when the channel 134 is filled with the fluid from the chamber inlet 104, the fluid flows over the baffle 124 onto the particulate filter 142, and through the particulate filter 142 to the first inlet channel 136. In an alternative embodiment, the filter system 100 can be devoid of the baffle 124, and the chamber inlet 104 can be disposed higher than the particulate filter 142 such that the fluid flows from the chamber inlet 104 onto the particulate filter 142.

The at least one particulate filter can include a second particulate filter 144 disposed above the second inlet channel 138. The filter system 100 can be configured such that, when the first inlet channel 136 is filled with the fluid, the fluid flows over the first inlet baffle 126 onto the second particulate filter 144, and through the second particulate filter 144 to the second inlet channel 138. The at least one particulate filter can include a third particulate filter 146 disposed above the third inlet channel 140. The filter system 100 can be configured such that, when the first inlet channel 136 is filled with the fluid (or the second inlet channel 138 in the case that the second inlet channel 138 is between the first and third inlet channels 136 and 140 as described in the alternative above), the fluid flows over the second inlet baffle 128 onto the third particulate filter 146, and through the third particulate filter 146 to the third inlet channel 140.

The embodiments described in connection with the illustrated embodiments have been presented by way of illustration, and the present invention is therefore not intended to be limited to the disclosed embodiments. Furthermore, the structure and features of each the embodiments described above can be applied to the other embodiments described herein. Accordingly, those skilled in the art will realize that the invention is intended to encompass all modifications and alternative arrangements included within the spirit and scope of the invention, as set forth by the appended claims.

What is claimed:
1. A filter system, comprising:
a filter chamber body having a chamber base, and at least one chamber wall that extends up from the chamber base;
a chamber inlet that extends through the filter chamber body, wherein the filter chamber body is configured to receive a fluid through the chamber inlet;
a chamber outlet that extends through the filter chamber body at a location downstream of the chamber inlet with respect to a direction of fluid flow through the filter chamber body, wherein the filter chamber body is configured to expel the fluid through the chamber outlet;
a plurality of fluid flow paths that extend between the chamber inlet and the chamber outlet, the plurality of fluid flow paths including first and second subsets, each including at least a respective one of the fluid flow paths;

a plurality of hydrocarbon filters disposed in the filter chamber body such that each hydrocarbon filter is disposed in a respective different one of the plurality of fluid flow paths, and each hydrocarbon filter is configured to remove and retain hydrocarbons from the fluid;

a first inlet channel within the filter chamber body and in fluid communication with an inlet of each hydrocarbon filter of the first subset; and a second inlet channel within the filter chamber body and separated from the first inlet channel by a first baffle, the second inlet channel being in fluid communication with an inlet of each hydrocarbon filter of the second subset, wherein the filter system is configured such that, once each hydrocarbon filter of the first subset is saturated with hydrocarbons, the first inlet channel fills with fluid until the fluid cascades over the first baffle to the second inlet channel.

2. The filter system of claim 1, wherein the filter system is configured such that, once each hydrocarbon filter of the first subset becomes saturated with hydrocarbons, the filter system diverts the fluid to additionally flow to a third subset of the plurality of fluid flow paths, the third set including at least a respective one of the fluid flow paths.

3. The filter system of claim 2, wherein the first subset is between the second subset and the third subset.

4. The filter system of claim 1, wherein the filter system is configured such that, once each hydrocarbon filter of the second subset becomes saturated with hydrocarbons, the filter system diverts the fluid to flow to another subset of the plurality of fluid flow paths, the another subset including at least a respective one of the fluid flow paths.

5. The filter system of claim 4, wherein the second subset is between the first subset and the another subset.

6. The filter system of claim 4, wherein the another subset is between the first subset and the second subset.

7. The filter system of claim 1, wherein the filter system comprises at least one baffle that extends up from the base so as to define a plurality of channels in the filter chamber body that at least partially define the plurality of fluid flow paths.

8. The filter system of claim 7, wherein the plurality of channels includes at least one outlet channel and at least one inlet channel that are separated from one another by at least one of the baffles, the at least one inlet channel being in fluid communication with the chamber inlet, and the at least one outlet channel being in fluid communication with the chamber outlet.

9. The filter system of claim 8, wherein each of the hydrocarbon filters has a filter inlet and a filter outlet, each filter inlet being in fluid communication with the at least one inlet channel, and each filter outlet being in fluid communication with the at least one outlet channel.

10. The filter system of claim 1, comprising a third inlet channel that is separated from the first inlet channel by a second baffle and that is in fluid communication with an inlet of each hydrocarbon filter of a third subset of the plurality of fluid flow paths, wherein the filter system is configured such that, once each hydrocarbon filter of the first subset is saturated with hydrocarbons, the first inlet channel fills with fluid until the fluid cascades over the second inlet baffle to the third inlet channel.

11. The filter system of claim 1, comprising a third inlet channel that is separated from the second inlet channel by a second baffle and that is in fluid communication with an inlet of each hydrocarbon filter of a third subset of the plurality of fluid flow paths, wherein the filter system is configured such that, once each hydrocarbon filter of the second subset is saturated with hydrocarbons, the second inlet channel fills with fluid until the fluid cascades over the second inlet baffle to the third inlet channel.

12. The filter system of claim 1, wherein the plurality of hydrocarbon filters comprises one or more lower hydrocarbon filters and one or more higher hydrocarbon filters that are offset from one another with respect to the vertical direction, wherein the filter system is configured such that, once the one or more lower hydrocarbon filters is saturated with hydrocarbons, a level of the fluid within the filter chamber body rises to the one or more higher hydrocarbon filters.

13. The filter system of claim 1, comprising at least one fluid level sensor disposed in the filter chamber body, wherein the filter system is configured to at least partially close a normally open valve upstream of the filter system when the fluid level sensor senses that a level of the fluid exceeds a predetermined threshold.

14. A monitoring system, comprising:

a fluid flow separation chamber comprising an inlet and an outlet, the fluid flow separation chamber including one or more flow-restricting features configured to slow a flow of the fluid within the fluid flow separation chamber so as the fluid flows from the inlet to the outlet so as to cause hydrocarbons to rise to an upper surface of the fluid;

a sensor configured to detect a presence of a threshold amount of hydrocarbons in the fluid while the fluid flows from the inlet to the outlet; and the filter system of claim 1, wherein the chamber inlet of the filter system is configured to be placed downstream of the outlet of the fluid flow separation chamber.

15. The monitoring system of claim 14, comprising a normally open valve configured to be placed in fluid communication with the inlet, wherein the monitoring system is configured to close the normally open valve when the presence of the threshold amount of hydrocarbons in the fluid is detected.

16. The monitoring system of claim 15, comprising at least one fluid level sensor disposed in at least one of the filter chamber body and the fluid flow separation chamber, wherein the monitoring system is configured to close the normally open valve when the fluid level sensor senses that a level of the fluid exceeds a predetermined threshold.

17. A method, comprising:

directing a fluid to flow to a chamber inlet of a filter system and through the chamber inlet into a filter chamber body of the filter system;

causing the fluid to flow through a first inlet channel within the filter chamber body along a first subset of a plurality of fluid flow paths to a chamber outlet of the filter system, the first subset including at least one respective fluid flow path, and each fluid flow path of the first subset including a respective hydrocarbon filter configured to remove and retain hydrocarbons from the fluid, wherein the first inlet channel is in fluid communication with an inlet of each hydrocarbon filter of the first subset; and diverting, once each hydrocarbon filter of the first subset becomes saturated with hydrocarbons, the fluid flow to a second subset of the plurality of fluid flow paths, the second subset including at least one respective fluid flow path, and each fluid flow path of the second subset including a respective hydrocarbon filter configured to remove and retain hydrocarbons from the fluid, wherein the filter system includes a baffle that separates the first inlet channel from a second inlet channel within the filter chamber body, the second inlet channel being in fluid communication with an inlet of each hydrocarbon filter of the second subset, wherein the diverting step comprises causing the fluid to cascade over the baffle to the second inlet channel.

18. The method of claim 17, comprising, before the directing step:

causing the fluid to flow from an inlet of a fluid flow separation chamber to an outlet of the fluid flow separation chamber, the outlet being in fluid communication with the chamber inlet, such that the fluid flow separation chamber causes the flow rate of the fluid to decrease, thereby causing the hydrocarbons to rise to an upper surface of the fluid in the fluid flow separation chamber; and sensing the fluid in the fluid flow separation chamber to detect a presence of a threshold amount of hydrocarbons in the fluid while the fluid flows from the inlet to the outlet.

19. The method of claim 18, comprising closing a normally open valve that is in fluid communication with the inlet when the presence of the threshold amount of hydrocarbons in the fluid is detected.

\* \* \* \* \*